United States Patent
Kaufman et al.

(10) Patent No.: US 10,403,043 B2
(45) Date of Patent: Sep. 3, 2019

(54) SYSTEM AND METHOD FOR GENERATING A PROGRESSIVE REPRESENTATION ASSOCIATED WITH SURJECTIVELY MAPPED VIRTUAL AND PHYSICAL REALITY IMAGE DATA

(71) Applicant: The Research Foundation for the State University of New York, Albany, NY (US)

(72) Inventors: Arie Kaufman, Plainview, NY (US); Qi Sun, Centereach, NY (US); Li-Yi Wei, Redwood City, CA (US)

(73) Assignee: The Research Foundation for The State University of New York, Albany, NY (US)

(*) Notice: Subject to any disclaimer, the term of this patent is extended or adjusted under 35 U.S.C. 154(b) by 0 days.

(21) Appl. No.: 15/564,145

(22) PCT Filed: Apr. 14, 2017

(86) PCT No.: PCT/US2017/027603
§ 371 (c)(1),
(2) Date: Oct. 3, 2017

(87) PCT Pub. No.: WO2017/180990
PCT Pub. Date: Oct. 19, 2017

(65) Prior Publication Data
US 2019/0051051 A1    Feb. 14, 2019

Related U.S. Application Data

(60) Provisional application No. 62/322,393, filed on Apr. 14, 2016.

(51) Int. Cl.
*G06T 19/00*    (2011.01)
*G06F 3/00*    (2006.01)
(Continued)

(52) U.S. Cl.
CPC ............ *G06T 19/006* (2013.01); *G01C 21/32* (2013.01); *G02B 27/0172* (2013.01); *G06F 3/00* (2013.01);
(Continued)

(58) Field of Classification Search
CPC .............................. G06T 19/006; G06F 3/011
See application file for complete search history.

(56) References Cited

U.S. PATENT DOCUMENTS 6,050,822 A    4/2000 Faughn
2009/0237564 A1    9/2009 Kikinis et al.
(Continued)

FOREIGN PATENT DOCUMENTS

WO    2015/077718 A1    5/2015

OTHER PUBLICATIONS

Nescher, Thomas, Ying-Yin Huang, and Andreas Kunz. "Planning redirection techniques for optimal free walking experience using model predictive control." 3D User Interfaces (3DUI), 2014 IEEE Symposium on. IEEE, 2014. (Year: 2014).*
(Continued)

*Primary Examiner* — Ryan McCulley
(74) *Attorney, Agent, or Firm* — Hoffmann & Baron, LLP

(57) ABSTRACT

A system of generating a progressive representation associated with virtual and physical reality image data is disclosed. The system receives virtual image data associated with a virtual scene map of a virtual scene, and receives physical image data from the image capturing device, associated with a physical environment of a real scene. Perimeter information of the physical environment is determined. Boundary information of an obstacle associated with the physical environment is determined. A real scene map associated with the physical environment including an obstacle and one or more free space areas is generated. A corresponding
(Continued)

virtual barrier is generated in the real scene map, the virtual barrier associated with the boundary information of the obstacle in the real scene map. A folding of the virtual scene map into the one or more free space areas of the real scene map is implemented, the free space areas surround or are adjacent the generated virtual barrier. A progressive representation to the wearable communication device is generated that is associated with virtual scene pixels of the virtual map corresponding to real scene points of the real scene map in a time interval.

A corresponding method and computer-readable device are also disclosed.

44 Claims, 45 Drawing Sheets

(51) Int. Cl.
| | |
|---|---|
| G06F 3/01 | (2006.01) |
| G09B 9/00 | (2006.01) |
| G06F 3/0481 | (2013.01) |
| G09B 9/06 | (2006.01) |
| G09B 9/30 | (2006.01) |
| H04N 13/344 | (2018.01) |
| H04N 13/117 | (2018.01) |
| G01C 21/32 | (2006.01) |
| G02B 27/01 | (2006.01) |

(52) U.S. Cl.
CPC .............. *G06F 3/01* (2013.01); *G06F 3/011* (2013.01); *G06F 3/04815* (2013.01); *G06T 19/003* (2013.01); *G09B 9/00* (2013.01); *G09B 9/06* (2013.01); *G09B 9/30* (2013.01); *H04N 13/117* (2018.05); *H04N 13/344* (2018.05); *G02B 2027/014* (2013.01); *G02B 2027/0138* (2013.01)

(56) References Cited

U.S. PATENT DOCUMENTS

| | | | | |
|---|---|---|---|---|
| 2010/0259539 | A1 | 10/2010 | Papanikolopoulos et al. | |
| 2014/0240351 | A1* | 8/2014 | Scavezze | G06F 3/011 345/633 |
| 2015/0193979 | A1* | 7/2015 | Grek | G06F 1/1694 345/633 |
| 2015/0279081 | A1* | 10/2015 | Monk | G06T 3/0031 345/419 |
| 2016/0027209 | A1 | 1/2016 | Demirli et al. | |
| 2018/0012074 | A1* | 1/2018 | Holz | G06K 9/00671 |

OTHER PUBLICATIONS

Peck, Tabitha C., Henry Fuchs, and Mary C. Whitton. "Improved redirection with distractors: A large-scale-real-walking locomotion interface and its effect on navigation in virtual environments." Virtual Reality Conference (VR), 2010 IEEE. IEEE, 2010. (Year: 2010).*

Steinicke, Frank, et al. "Real walking through virtual environments by redirection techniques." JVRB-Journal of Virtual Reality and Broadcasting 6.2 (2009). (Year: 2009).*

Suma, Evan A., et al. "Impossible spaces: Maximizing natural walking in virtual environments with self-overlapping architecture." IEEE Transactions on Visualization and Computer Graphics 18.4 (2012): 555-564. (Year: 2012).*

Suma, Evan A., et al. "Exploiting change blindness to expand walkable space in a virtual environment." Virtual Reality Conference (VR), 2010 IEEE. IEEE, 2010. (Year: 2010).*

Vasylevska, Khrystyna, et al. "Flexible spaces: Dynamic layout generation for infinite walking in virtual environments." 3D user interfaces (3DUI), 2013 IEEE Symposium on. IEEE, 2013. (Year: 2013).*

Vasylevska, Khrystyna, Iana Podkosova, and Hannes Kaufmann. "Walking in virtual reality: flexible spaces and other techniques." The Visual Language of Technique. Springer, Cham, 2015. 81-97. (Year: 2015).*

Zmuda, Michael A., et al. "Optimizing constrained-environment redirected walking instructions using search techniques." IEEE transactions on visualization and computer graphics 19.11 (2013): 1872-1884. (Year: 2013).*

International Search Report and Written Opinion issued in International Application No. PCT/US2017/027603 dated Jun. 26, 2017.

Bonnans, J. F., Gilbert, J. C., Lemaréchal, C., and Sagastizábal, C. A. 2006. Numerical Optimization: Theoretical and Practical Aspects (Universitext). Springer-Verlag.

Bouchard, S., Robillard, G., and Renaud, P. 2007. Revising the factor structure of the simulator sickness questionnaire. Annual Review of CyberTherapy and Telemedicine 5, 128-137.

Bowman, D. A., Gabbard, J. L., and Hix, D. 2002. A survey of usability evaluation in virtual environments: Classification and comparison of methods. Presence: Teleoper. Virtual Environ. 11,4 (Aug.), 404-424.

Bruder, G., Lubas, P., and Steinicke, F. 2015. Cognitive resource demands of redirected walking. IEEE Transactions on Visualization and Computer Graphics 21,4 (Apr.), 539-544.

Chen, R., and Weber, O. 2015. Bounded distortion harmonic mappings in the plane. ACM Trans. Graph. 34, 4 (Jul.), 73:1-73:12.

Cheng, L.-P., Roumen, T., Rantzsch, H., Köhler, S.,Schmidt, P., Kovacs, R., Jasper, J., Kemper, J., and Baudisch, P. 2015. Turkdeck: Physical virtual reality based on people. In UIST '15, 417-426.

Choi, S., Zhou, Q.-Y., and Koltun, V. 2015. Robust reconstruction of indoor scenes. In CVPR '15, 5556-5565.

Crassin, C., McGuire, M., Fatahalian, K., and Lefohn, A. 2015. Aggregate G-buffer anti-aliasing. In I3D '15, 109-119.

Cui, J., Rosen, P., Popescu, V., and Hoffmann, C. 2010. A curved ray camera for handling occlusions through continuous multiperspective visualization. IEEE Transactions on Visualization and Computer Graphics 16,6 (Nov.), 1235-1242.

Debevec, P. E., Taylor, C. J., and Malik, J. 1996. Modeling and rendering architecture from photographs: A hybrid geometry- and image-based approach. In SIGGRAPH '96, 11-20.

Febretti, A., Nishimoto, A., Mateevitsi, V., Renambot, L., Johnson, A., and Leigh, J. 2014. Omegalib: A multiview application framework for hybrid reality display environments. In Virtual Reality (VR), 2014 IEEE, 9-14.

Fu, X.-M., Liu, Y., and Guo, B. 2015. Computing locally injective mappings by advanced mips. ACM Trans. Graph. 34, 4 (Jul.), 71:1-71:12.

Gal, R., Sorkine, O., and Cohen-Or, D. 2006. Feature-aware texturing. In EGSR '06, 297-303.

Gray, A. 1996. Modern Differential Geometry of Curves and Surfaces with Mathematica, 1st ed. CRC Press, Inc.

Hodgson, E., Bachmann, E., and Waller, D. 2008. Redirected walking to explore virtual environments: Assessing the potential for spatial interference. ACM Trans. Appl. Percept. 8, 4 (Dec.), 22:1-22:22.

Hong, L., Muraki, S., Kaufman, A., Bartz, D., and He, T. 1997. Virtual voyage: Interactive navigation in the human colon. In SIGGRAPH '97, 27-34.

Huang, F.-C., Chen, K, and Wetzstein, G. 2015. The light field stereoscope: Immersive computer graphics via factored near-eye light field displays with focus cues. ACM Trans. Graph. 34, 4 (Jul.), 60:1-60:12.

Iwata, H., Yano, H., and Tomioka, H. 2006. Powered shoes. In SIGGRAPH '06 Emerging Technologies.

Jang, Y., Noh, S.-T., Chang, H. J., Kim, T.-K., and Woo, W. 2015. 3d finger cape: Clicking action and position estimation under self-occlusions in egocentric viewpoint. IEEE Transactions on Visualization and Computer Graphics 21, 4 (Apr.), 501-510.

(56) References Cited

OTHER PUBLICATIONS

Kennedy, R. S., Lane, N. E., Berbaum, K S., and Lilienthal, M. G. 1993. Simulator sickness questionnaire: An enhanced method for quantifying simulator sickness. The International Journal of Aviation Psychology 3, 3, 203-220.

Lévy, B., Petitjean, S., Ray, N., and Maillot, J. 2002. Least squares conformal maps for automatic texture atlas generation. ACM Trans. Graph. 21, 3 (Jul.), 362-371.

Li, H., Trutoiu, L, Olszewski, K, Wei, L., Trutna, T., Hsieh, R-L., Nicholls, A., and Ma, C. 2015. Facial performance sensing head-mounted display. ACM Trans. Graph. 34, 4 (Jul.), 47:1-47:9.

Maesen, S., Goorts, P., and Bekaert, P. 2013. Scalable optical tracking for navigating large virtual environments using spatially encoded markers. In VRST '13, 101-110.

McMillan, Jr., L. 1997. An Image-based Approach to Three-dimensional Computer Graphics. PhD thesis. UMI Order No. GAX97-30561.

Nescher, T., Huang, Y.-Y., and Kunz, A. 2014. Planning redirection techniques for optimal free walking experience using model predictive control. In 3DUI '14, 111-118.

Nilsson, N., Serafin, S., and Nordahl, R. 2014. Establishing the range of perceptually natural visual walking speeds for virtual walking-in-place locomotion. IEEE Transactions on Visualization and Computer Graphics 20, 4 (Apr.), 569-578.

Popescu, V., Rosen, P., and Adamo-Villani, N. 2009. The graph camera. ACM Trans. Graph. 28, 5 (Dec.), 158:1-158:8.

Poranne, R., and Lipman, Y. 2014. Provably good planar mappings. ACM Trans. Graph. 33, 4, 76:1-76:11.

Razzaque, S., Kohn, Z., and Whitton, M. C. 2001. Redirected Walking. In Eurographics 2001—Short Presentations, Eurographics Association.

Razzaque, S., Swapp, D., Slater, M., Whitton, M. C., and Steed, A. 2002. Redirected walking in place. In EGVE '02, 123-130.

Rudin, W. 1976. Principles of mathematical analysis, third ed. McGraw-Hill Book Co., New York. International Series in Pure and Applied Mathematics.

Schild, J., Laviola, J., and Masuch, M. 2012. Understanding user experience in stereoscopic 3d games. In CHI 12, 89-98.

Schuller, C., Kavan, L, Panozzo, D., and Sorkine-Hornung, O. 2013. Locally injective mappings. In SGP 13, 125-135.

Schwaiger, M., Thümmel, T., and Ulbrich, H. 2007. Cyberwalk: Implementation of a ball bearing platform for humans. In Human-Computer Interaction. Interaction Platforms and Techniques. Springer, 926-935.

Simeone, A. L., Velloso, E., and Gellersen, H. 2015. Substitutional reality: Using the physical environment to design virtual reality experiences. In CHI '15, 3307-3316.

Souman, J. L., Giordano, P. R., Schwaiger, M., Frissen, I., Hümmel, T., Ulbrich, H., Luca, A. D., Bülthoff, H. H., and Ernst, M. O. 2008. Cyberwalk: Enabling unconstrained omnidirectional walking through virtual environments. ACM Trans. Appl. Percept. 8, 4 (Dec.), 25:1-25:22.

Steinicke, F., Bruder, G., Jerald, J., Frenz, H., and Lappe, M. 2008. Analyses of human sensitivity to redirected walking. In VRST '08, 149-156.

Suma, E., Lipps, Z., Finkelstein, S., Krum, D., and Bolas, M. 2012. Impossible spaces: Maximizing natural walking in virtual environments with self-overlapping architecture. IEEE Transactions on Visualization and Computer Graphics 18, 4 (Apr.), 555-564.

Turk, G., and O'Brien, J. F. 2005. Shape transformation using variational implicit functions. In SIGGRAPH '05 Courses.

Usoh, M., Arthur, K., Whitton, M. C., Bastos, R., Steed, A., Slater, M., and Brooks, Jr., F. P. 1999. Walking > walking-in-place > flying, in virtual environments. In SIGGRAPH '99, 359-364.

Vasylevska, K., Kaufmann, H., Bolas, M., and Suma, E. 2013. Flexible spaces: Dynamic layout generation for Infinite walking in virtual environments. In 3DUI '13, 39-42.

Witmer, B. G., and Singer, M. J. 1998. Measuring presence in virtual environments: A presence questionnaire. Presence: Teleoper. Virtual Environ. 7, 3 (Jun.), 225-240.

Wong, R., 2015. Vr startups: Stop trying to make virtual reality treadmills a thing. http://mashable.com/2015/06/20/virtual-reality-treadmills/.

Yang, L., Tse, Y.-C., Sander, P. V., Lawrence, J., Nehab, D., Hoppe, H., and Wilkins, C. L. 2011. Image-based bidirectional scene reprojection. ACM Trans. Graph. 30, 6 (Dec.),150:1-150:10.

Zhang, R., and Kuhl, S. A. 2013. Human sensitivity to dynamic rotation gains in head-mounted displays. In SAP 13, 71-74.

Zmuda, M., Wonser, J., Bachmann, E., and Hodgson, E. 2013. Optimizing constrained-environment redirected walking instructions using search techniques. IEEE Transactions on Visualization and Computer Graphics 19, 11 (Nov.), 1872-1884.

\* cited by examiner

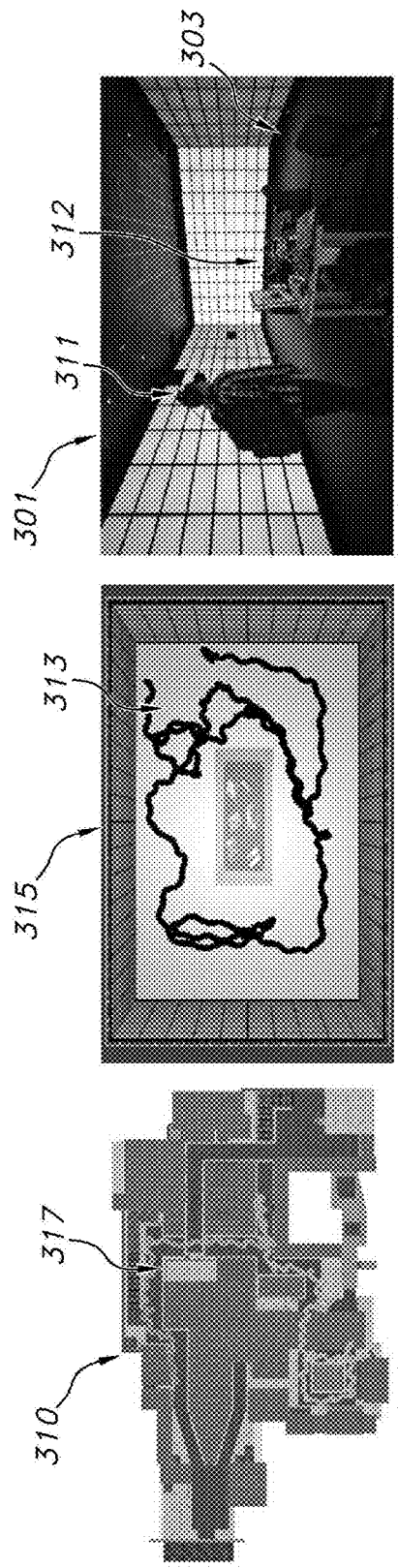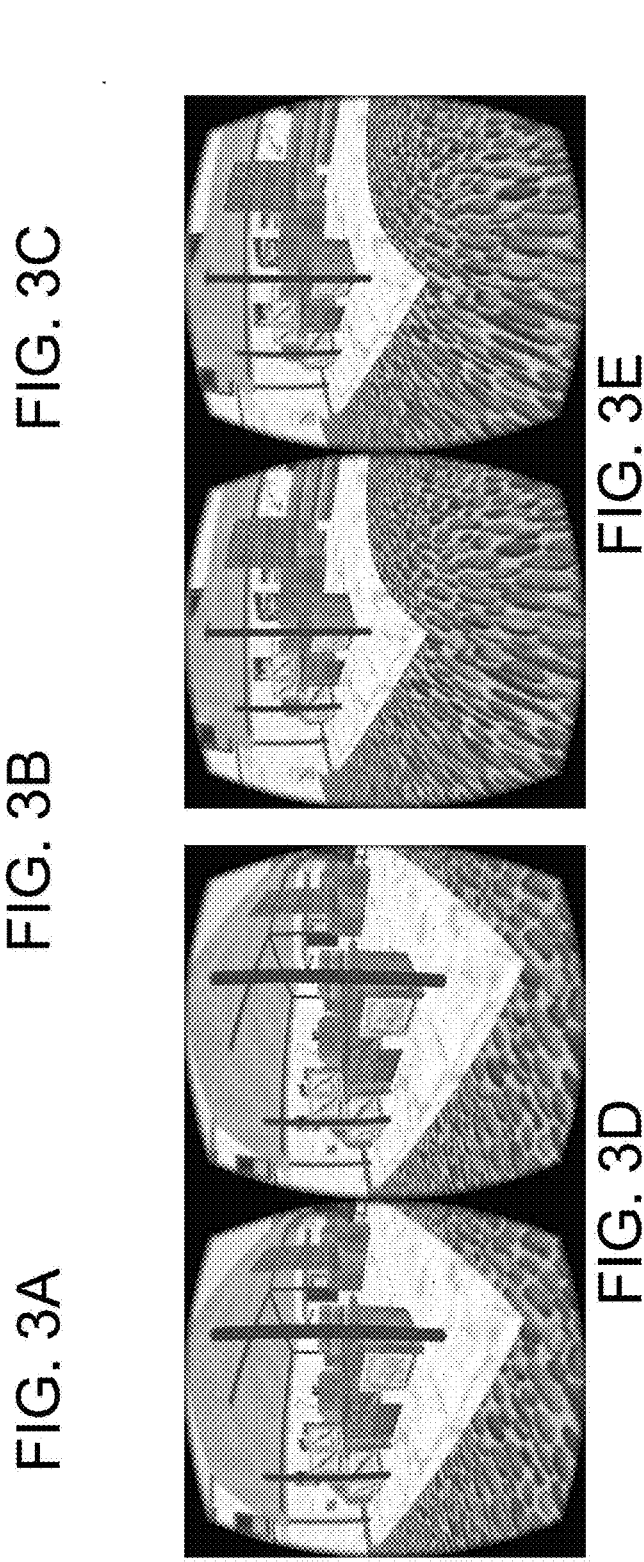
FIG. 3A
FIG. 3B
FIG. 3C
FIG. 3D
FIG. 3E

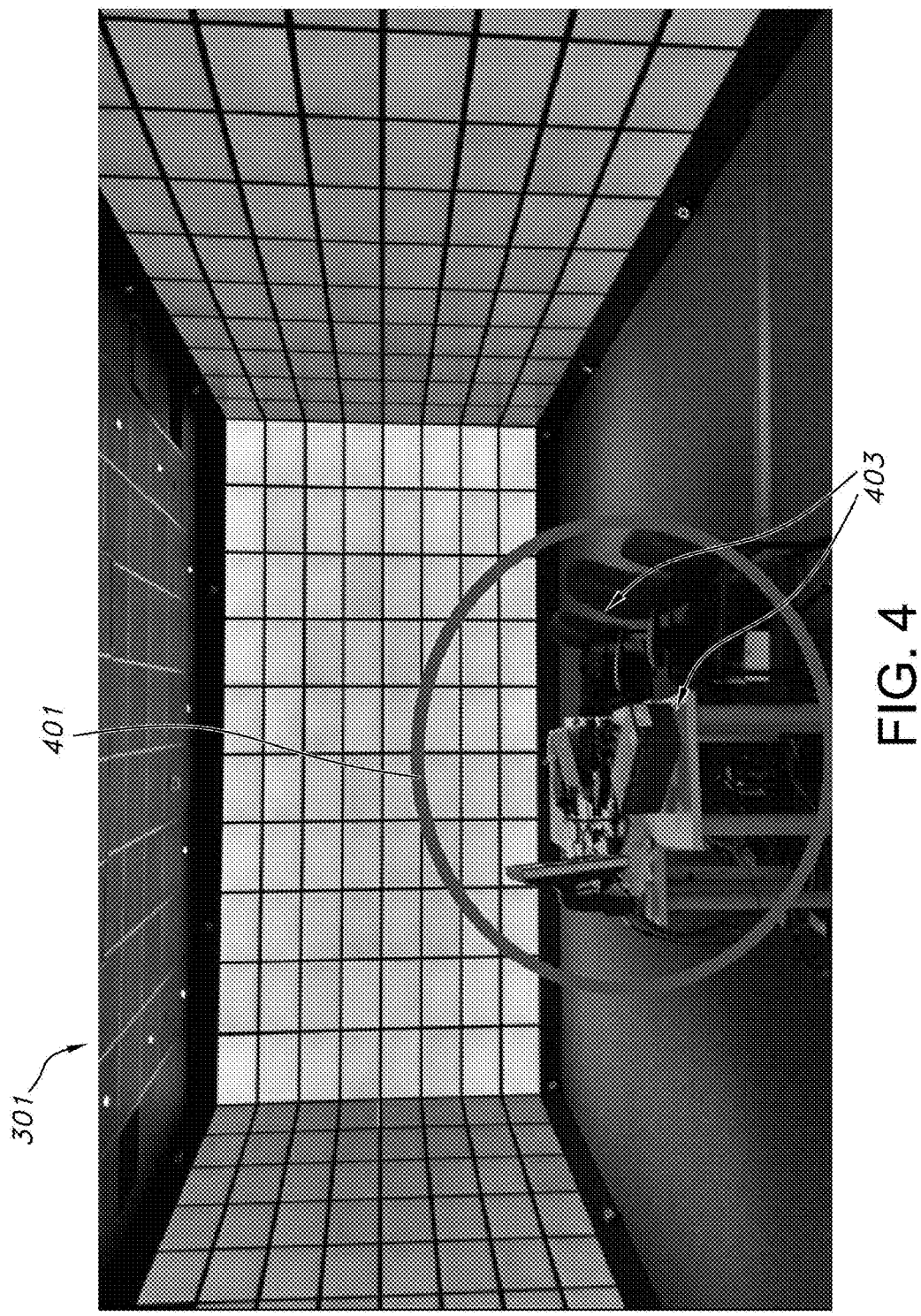

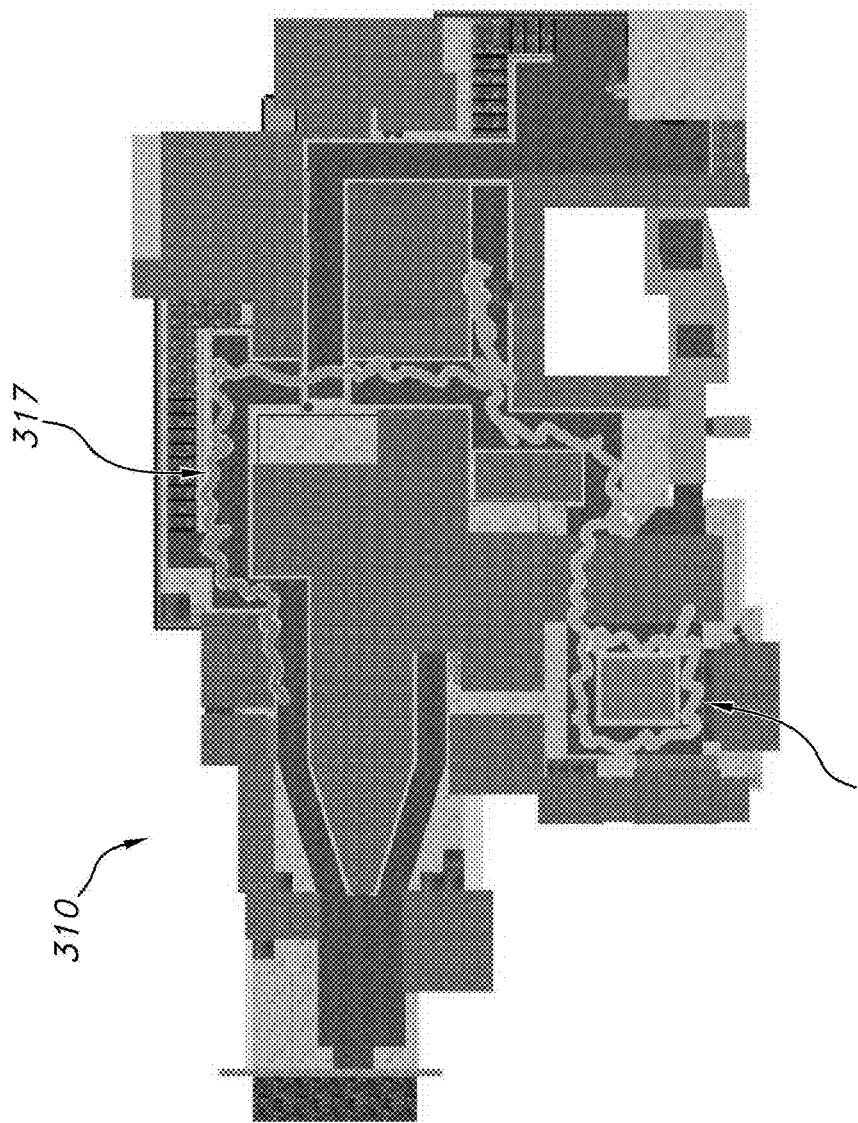

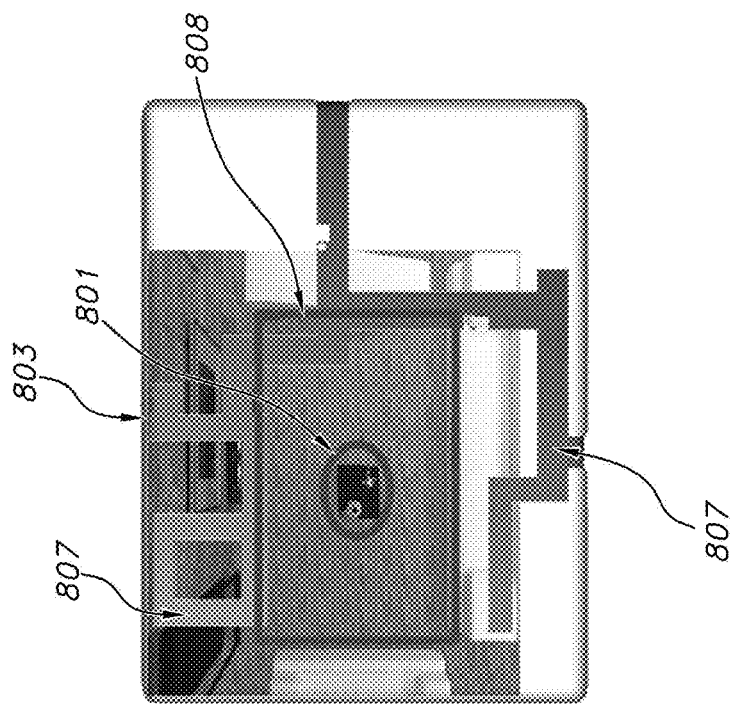
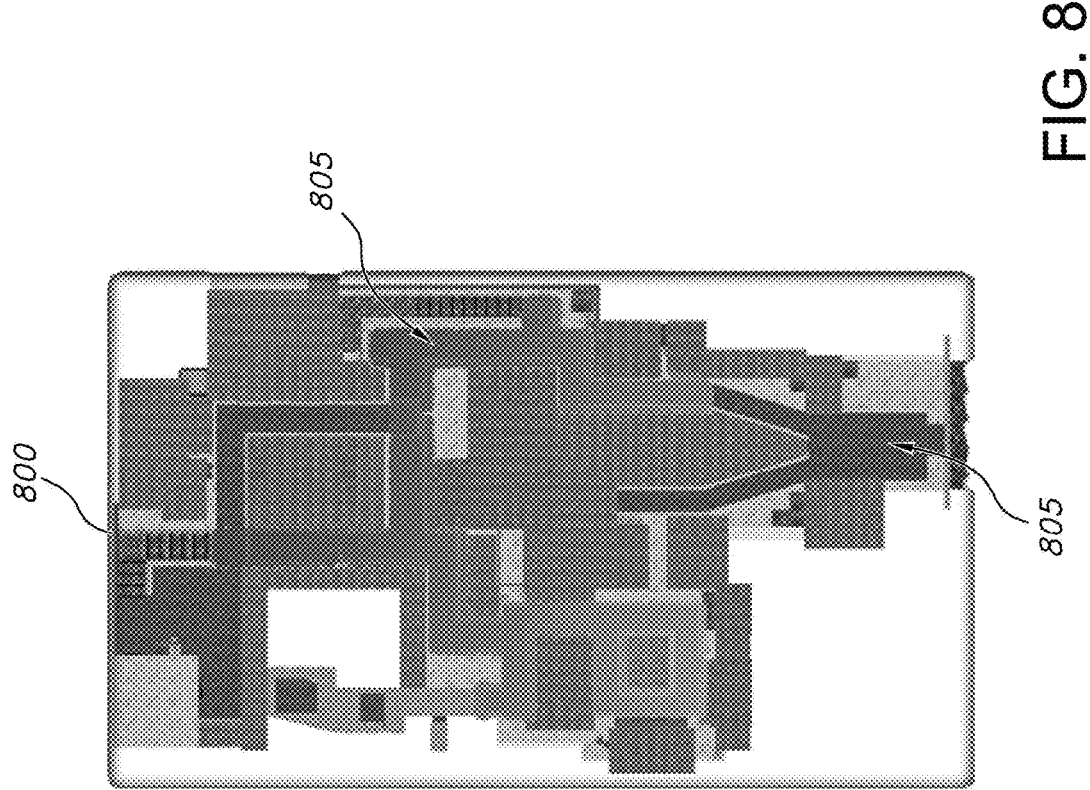
FIG. 8

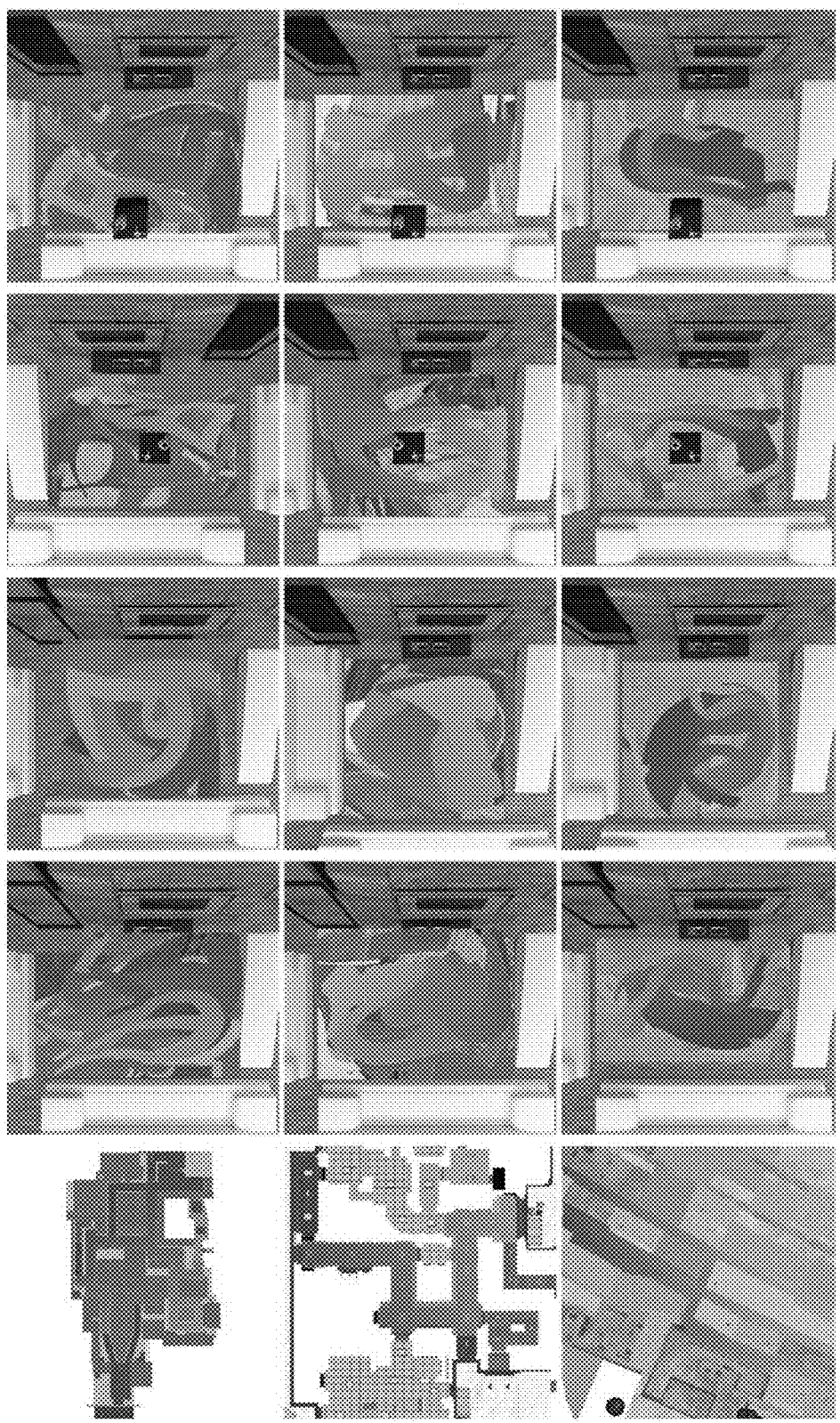

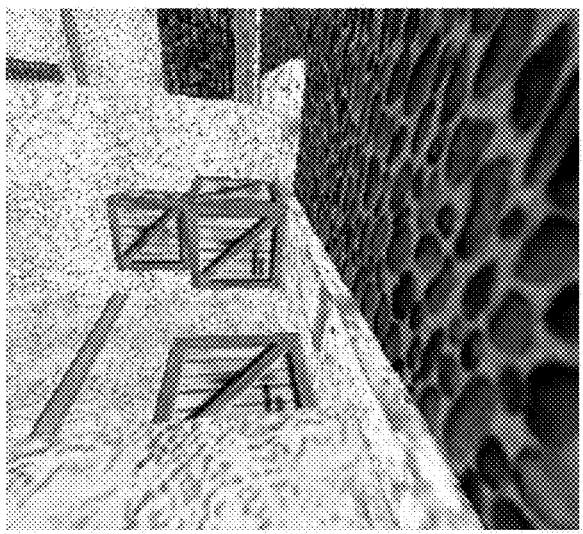
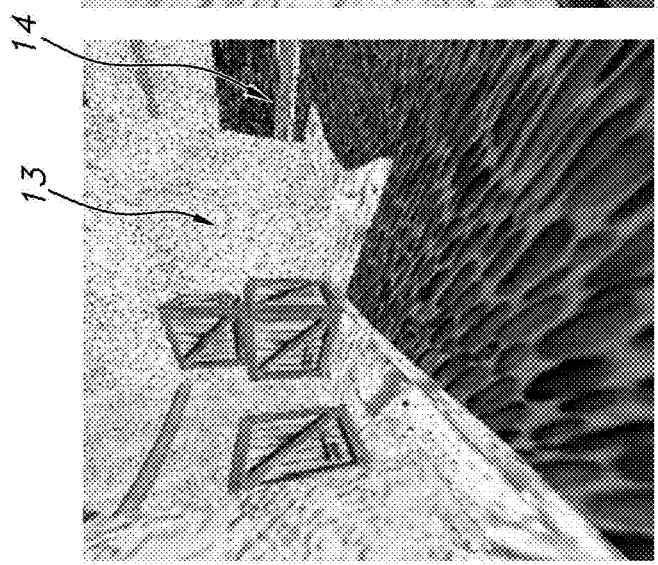
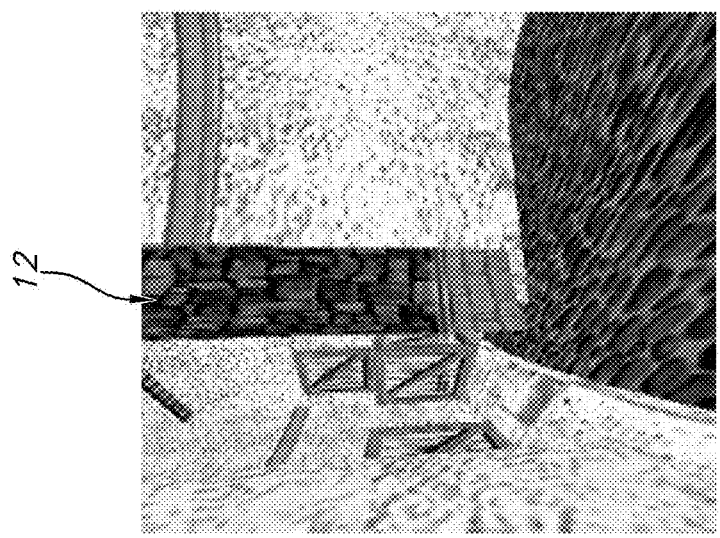
FIG. 12C
FIG. 12B
FIG. 12A

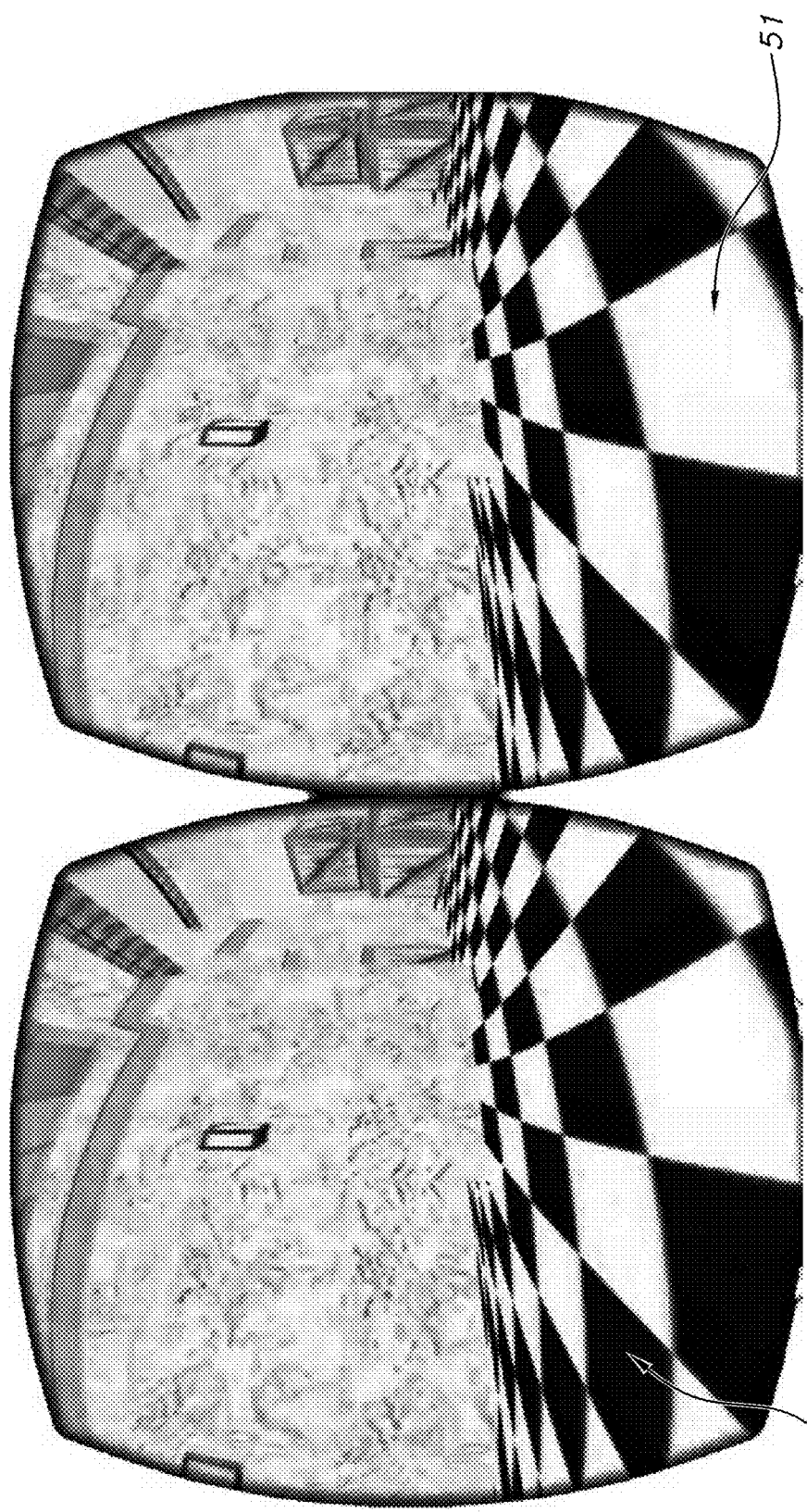

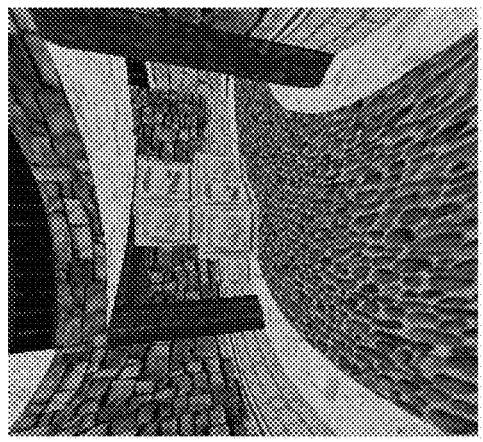
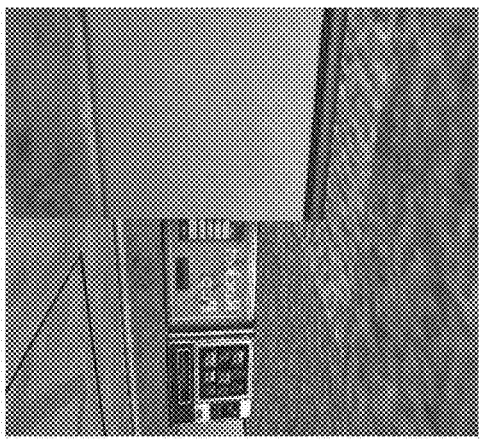
FIG. 19C
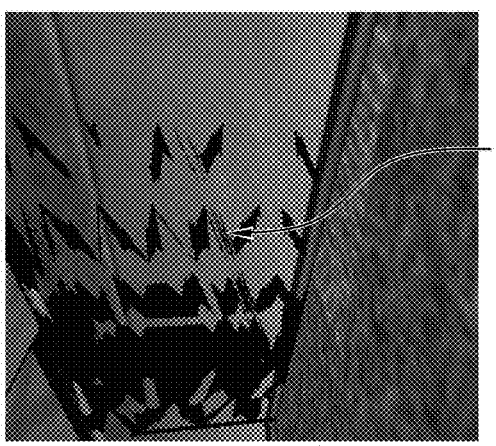
FIG. 19B
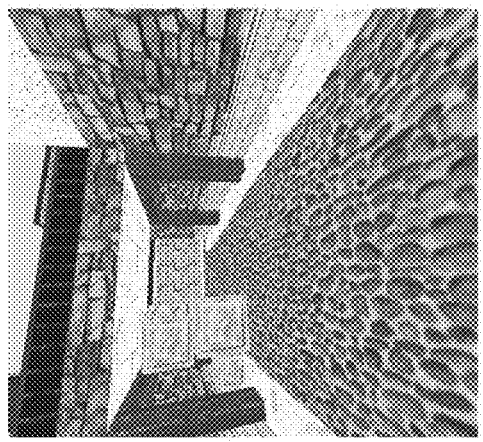
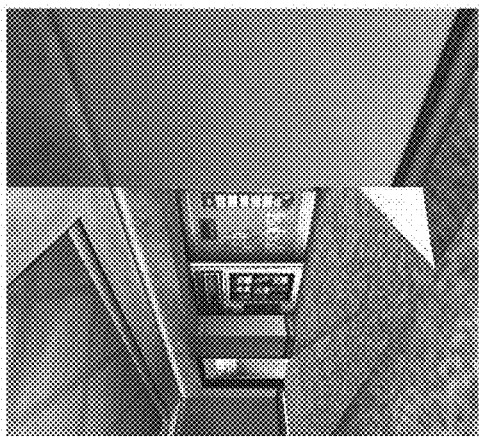
FIG. 19A

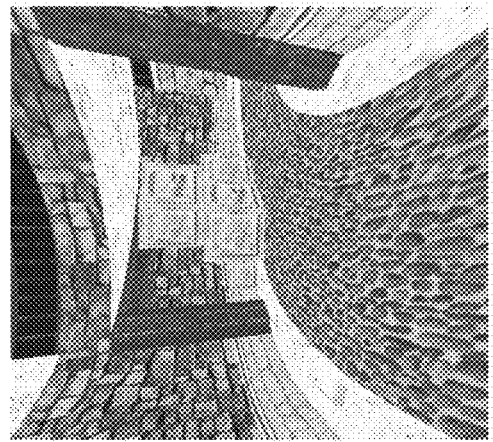
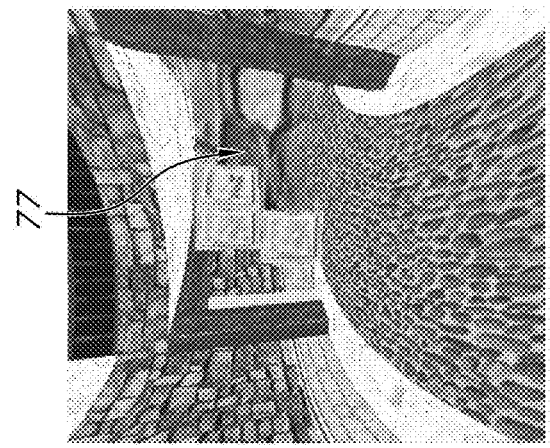
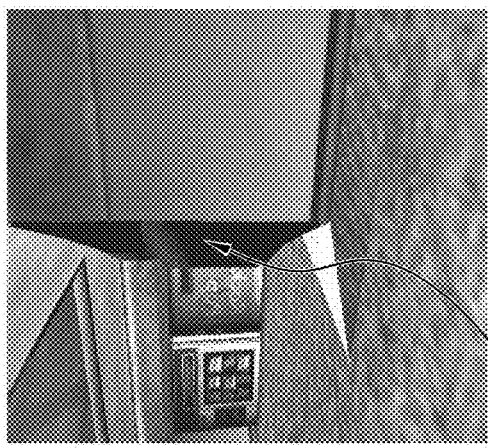
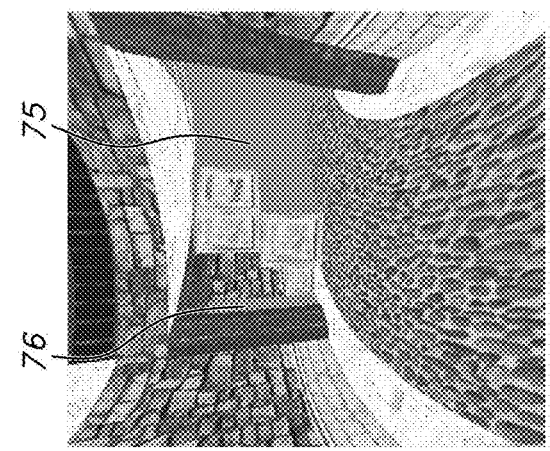
FIG. 19D  FIG. 19E  FIG. 19F

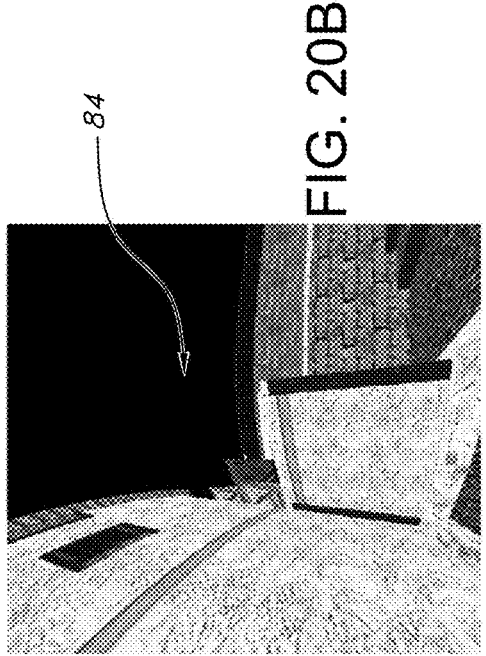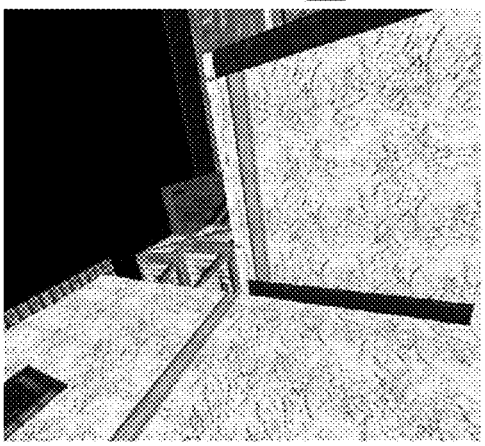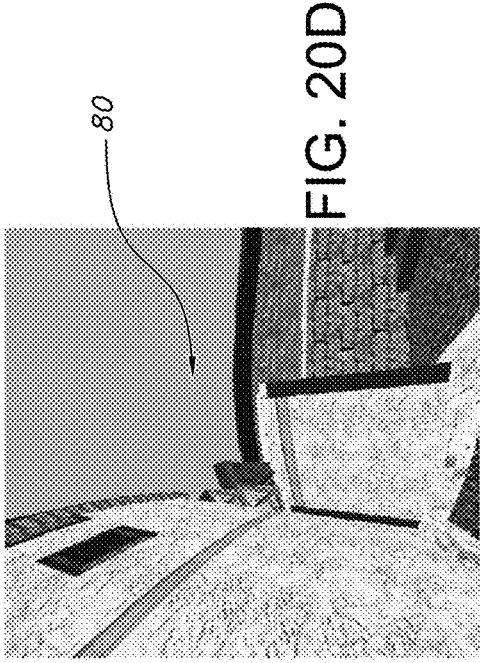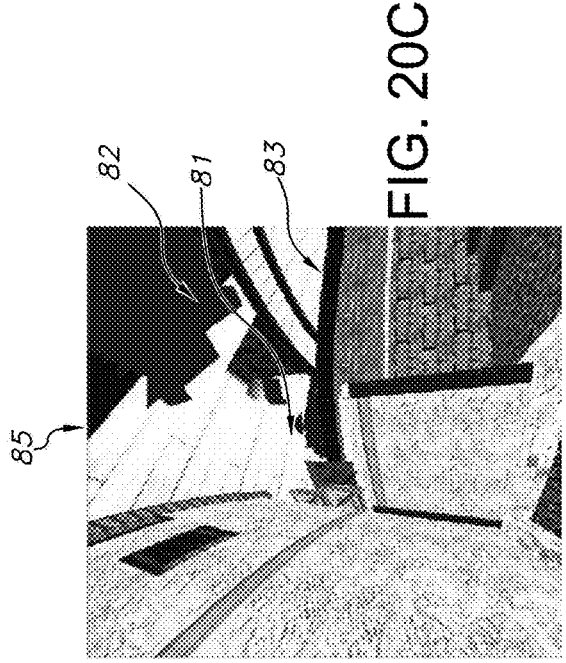
FIG. 20A
FIG. 20B
FIG. 20C
FIG. 20D

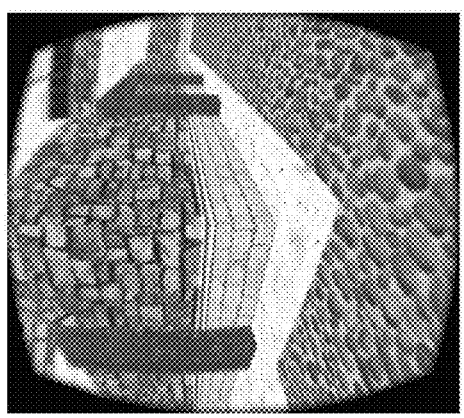 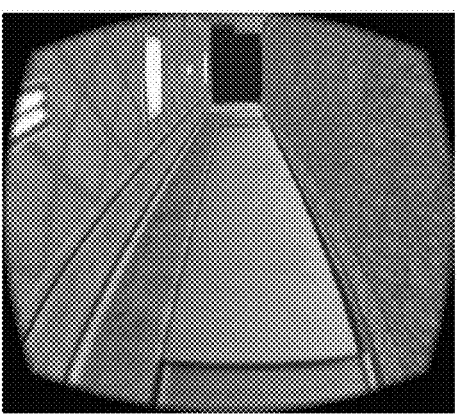
FIG. 22A
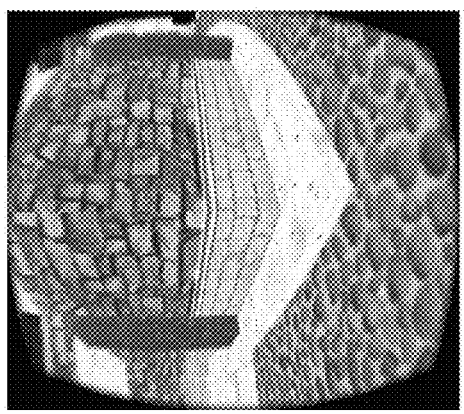 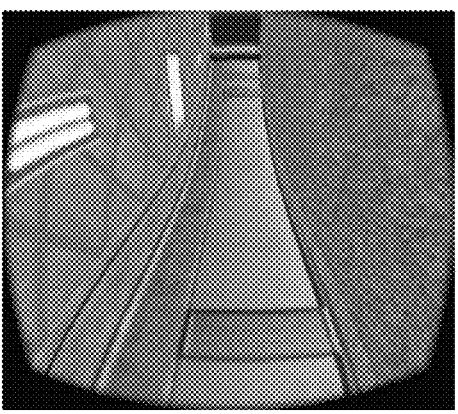
FIG. 22B
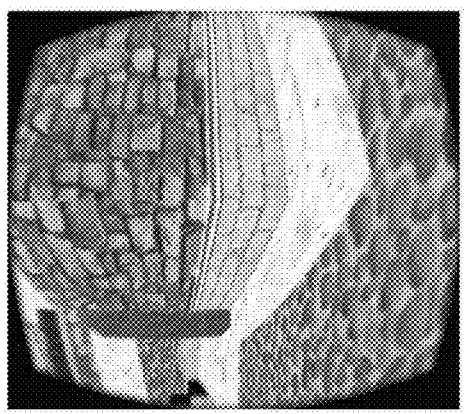 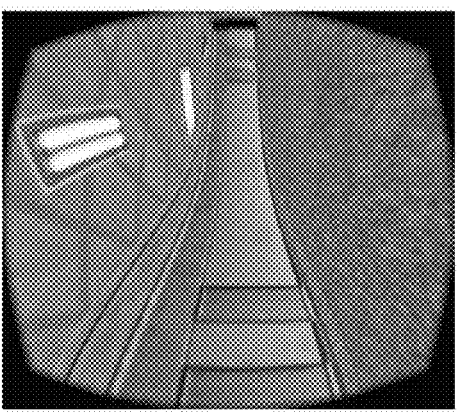
FIG. 22C
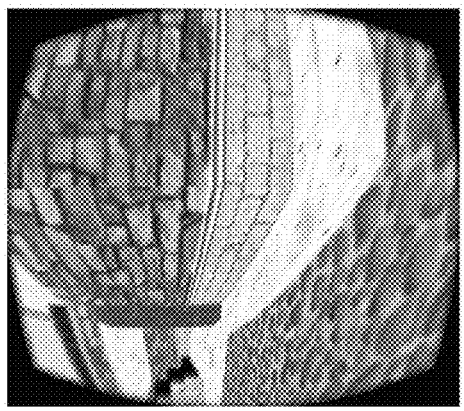 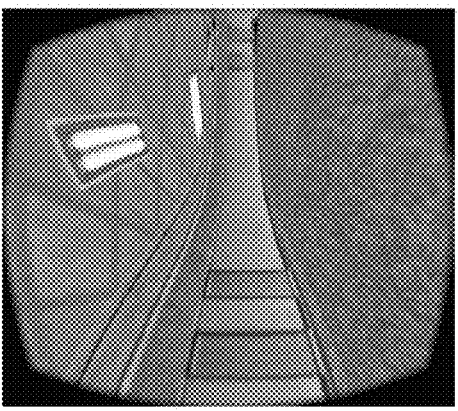
FIG. 22D

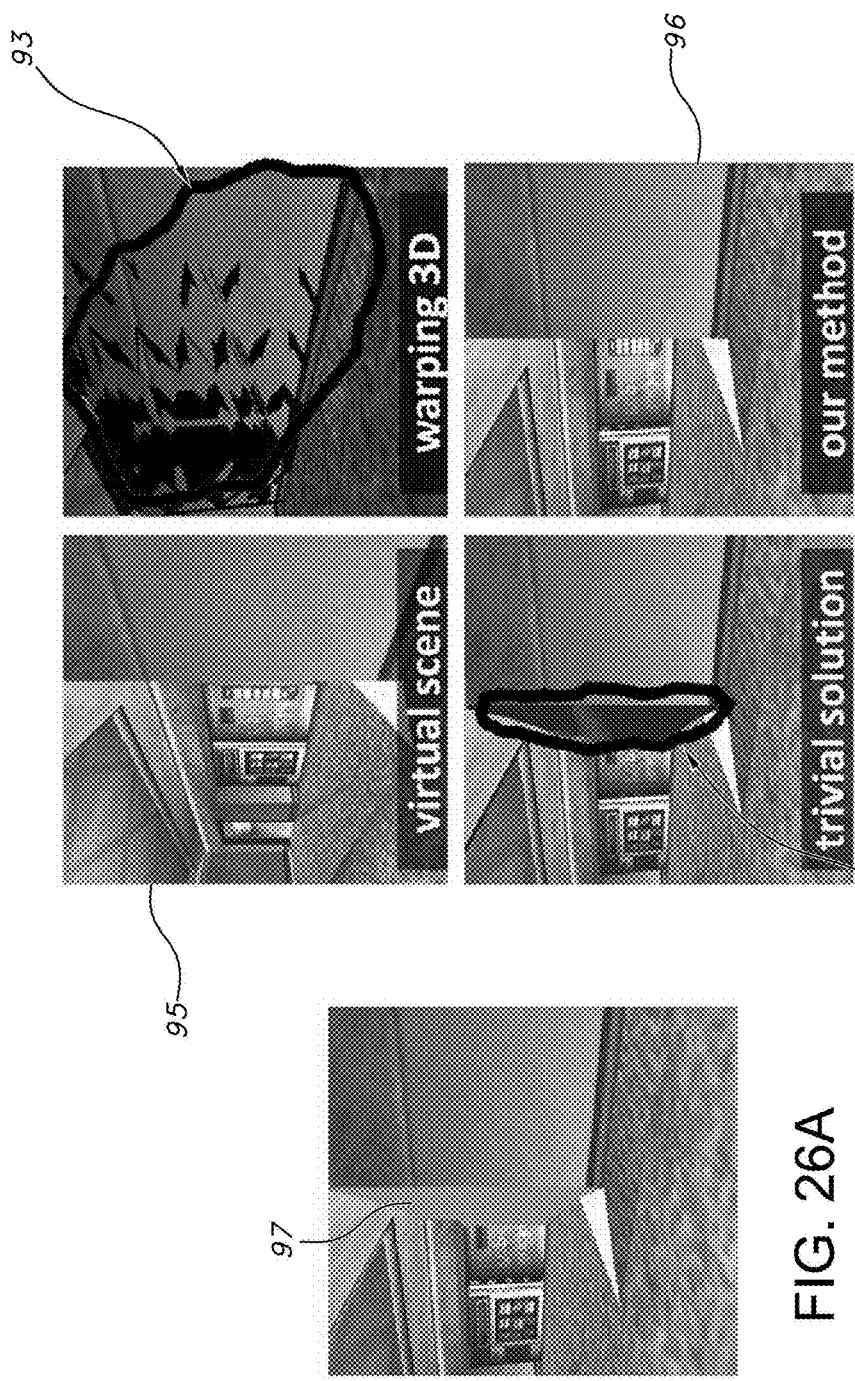

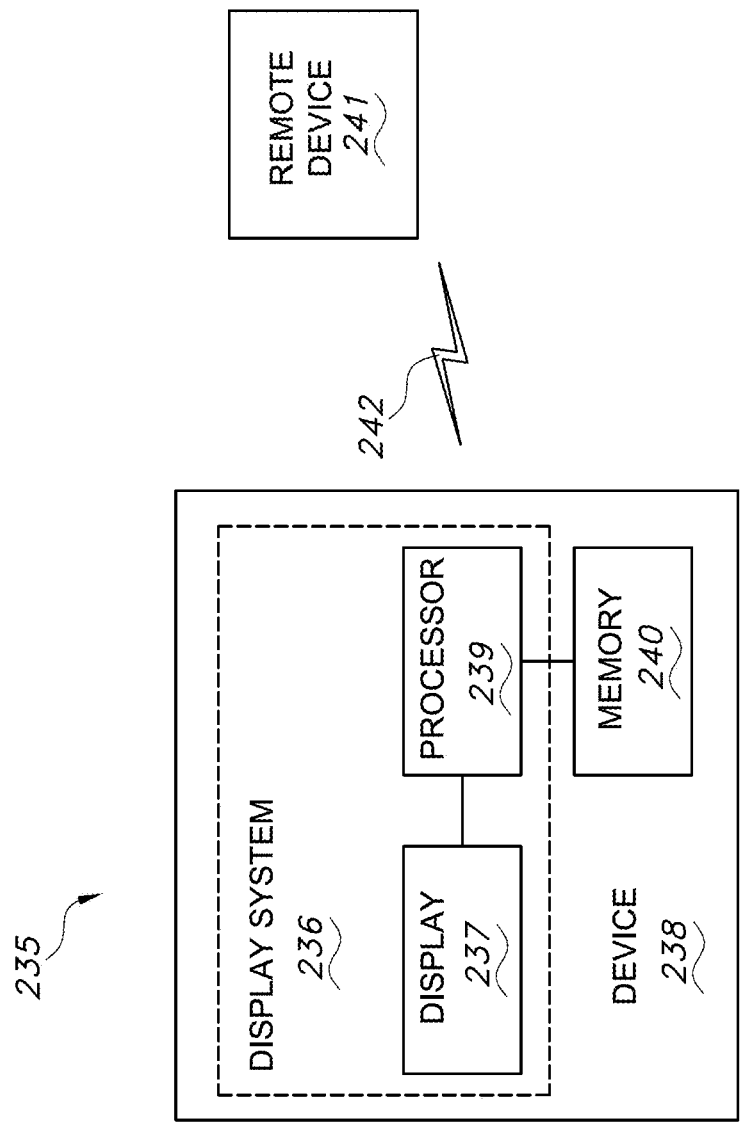

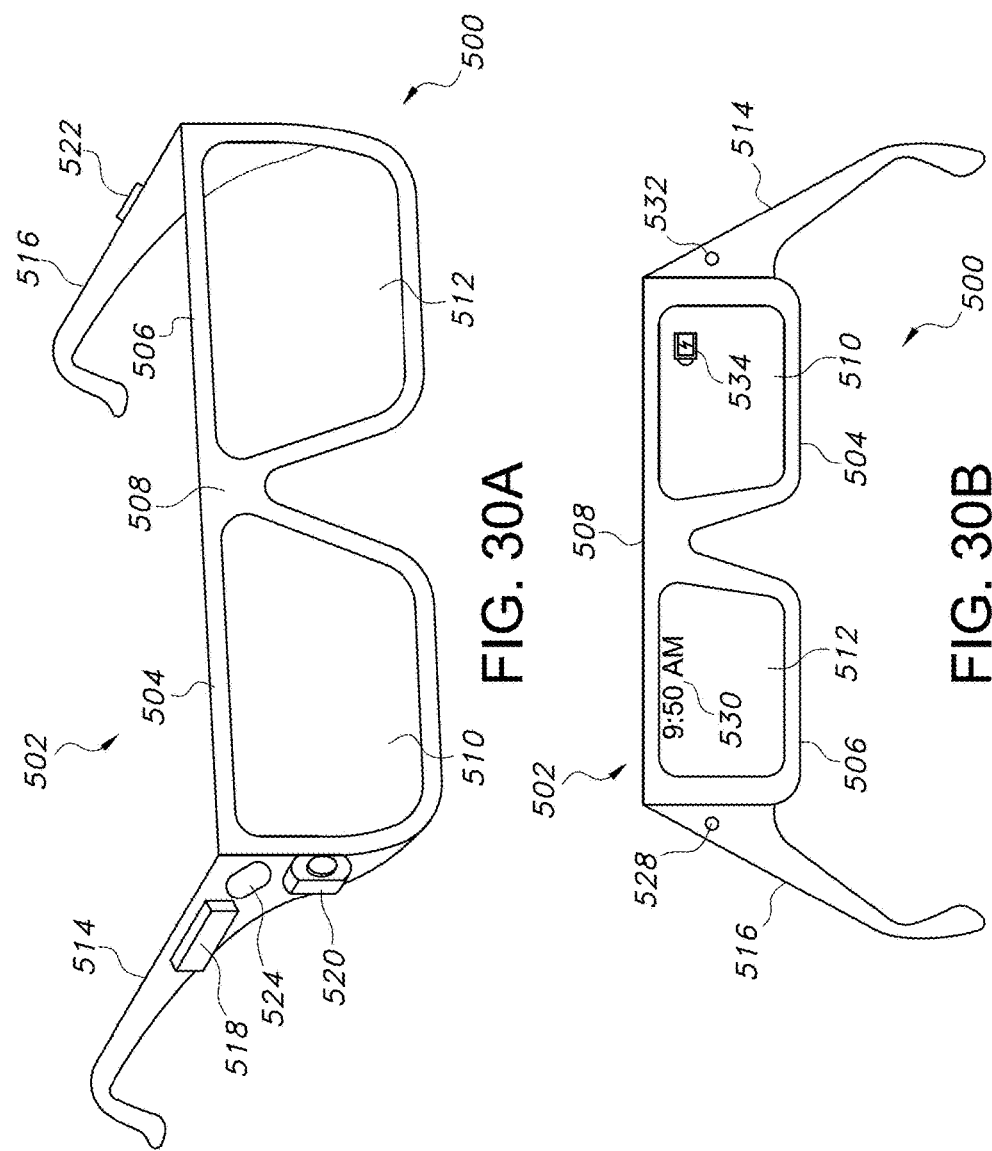

SYSTEM AND METHOD FOR GENERATING A PROGRESSIVE REPRESENTATION ASSOCIATED WITH SURJECTIVELY MAPPED VIRTUAL AND PHYSICAL REALITY IMAGE DATA

CROSS-REFERENCE TO RELATED APPLICATIONS

This application is the U.S. National Phase of International Patent Application No. PCT/US2017/027603, filed on Apr. 14, 2017, which claims the benefit of U.S. Provisional Application No. 62/322,393, filed on Apr. 14, 2016, the specifications of which are each incorporated by reference herein in their entireties for all purposes.

STATEMENT OF GOVERNMENT LICENSE RIGHTS

This invention was made with Government support under contract numbers CNS-0959979, IIP1069147 and CNS-1302246, awarded by the National Science Foundation. The Government has certain rights in the invention.

FIELD OF THE DISCLOSURE

The present disclosure relates to a system and method for generating a progressive representation associated with surjectively mapped virtual and physical reality image data. Even more particularly, the present invention relates to a system and method for immersion of a user into virtual reality allowing natural and safe human locomotion within a circumscribed physical environment.

BACKGROUND

Virtual reality (VR) is a computer-generated reality that creates an illusion in a user, (typically a human) that the user is in a virtual or an artificially created world. Virtual reality may stimulate naturally occurring senses such as for example, sight, sound, tactile, haptic, and/or movement. Actions of the user are translated by the computer into inputs that effect the virtual environment in which the user is in.

Virtual reality has been proven to be a useful and beneficial science and currently is being used to help people overcome the fear of heights, fear of flying, and as training devices for pilots of all kinds of vehicles; tanks, planes, helicopters, etc. For example, current VR systems are used to allow pilots of vehicles the increased ability to totally immerse into virtual environments (VEs). The three most critical senses required for total immersion are already built into the vehicle itself for such pilot training. Sight, sound, and tactile are considered the three most critical—smell and taste could also be considered but are considered a finer sensory stimulus and thus, considered as having a secondary level of impact on the human's immersion in virtual reality.

Virtual reality (VR) typically employs computer-generated stimulation of the human senses to simulate naturally occurring inputs such as sight and sound. Additional sensations which may be stimulated may include orientation, balance, and touch and force (haptic) feedback. A complete and immersive VR experience generally simultaneously stimulates a user with sight, sound, touch, and movement. However, a major limitation in current state-of-the-art VR is the inability to permit the user to safely navigate, for example via simple walking and running in a physical space that may be confined while experiencing the VR environment.

Navigation in such known systems is typically experienced as a disembodied center of consciousness which is directed by pointing, other gesture or by manipulation of a joystick, trackball, mouse, or similar device. The actual physical sensation of walking is limited to forms such as the user is restricted to a confined and immobile surface where tracking and signal generation are well-controlled, or the user is confined to a device such as a linear treadmill or wheelchair which simulates the user's linear motion from real space to virtual space. The conventional linear treadmill may include a movable track which may optionally be upwardly inclined. However, the linear track is only movable in one direction which restricts motion of the user to the direction of movement of the track as designed.

Such use of a linear treadmill in a virtual environment generally consists of one continuous moving track, and in conjunction with an external monitor or head mounted-display, permits a user to walk in a straight line. However, the user cannot step in arbitrary directions as s/he would be able to in real life. This limitation in navigation detracts from the immersive nature of the experience, and requires that the experience takes on more of a vehicular nature rather than that of free locomotion by freely walking and navigating body.

Another type of treadmill implemented in virtual reality environments is an omni-directional treadmill apparatus that allows a user, typically a person, to move, walk, run or crawl in any arbitrary direction. The apparatus has a frame for supporting the apparatus on a fixed surface. A track assembly mounted on the frame provides a user support that moves in a direction determined by directional orientation of the user on the track assembly. The track assembly has a user support movable in first direction by a first drive motor. The user support includes user support members rotatable about axes generally normal to the direction of movement of the support. It may also include a power driven endless belt, engages the user support members to rotate the user support members whereby the combined movement of the user support members and user supports results in omni-directional user movement. Controls on the user may be provided responsive to the directional orientation of the user which in turn controls the directional user movement to conform the orientation of the user on any such user supports.

However, a major limitation in such virtual reality systems is an inability for the system to allow natural human locomotion. Navigation is typically experienced as an unnatural and disembodied center of consciousness directed by for example, pointing, other gestures or by manipulation of a joystick, trackball, mouse, or similar device. The user, through the use of a head mounted display, is provided sensory information that the user is moving, but the user is located within the confines of a virtual reality pod, restraint or treadmill type system, and cannot physically move freely. Furthermore, disadvantageously, these known systems often cause discomfort, nausea, and even motion sickness in users.

Other virtual reality systems comprise a treadmill that is connected to a computer system. This treadmill approach is very similar to known virtual reality pods except that the user is allowed uni-directional movement only. The user can walk forward and the virtual reality will respond accordingly. However, the user is unable to move backwards or side to side. Again, such a system does not allow for natural human locomotion and causes disorientation and potentially nausea in some users.

Still other approaches implement using a treadmill that is able to move in both forward and reverse directions, as well as move from left to right. The user walks in a desired direction while sensors are positioned to detect which direction the user has walked. These sensors respond to signals transmitted from devices attached to the user's hands, waist, etc. The treadmill is then moved in the appropriate directions to continually bring the user back to the center of the treadmill. Motors are used that move the treadmill forward or backwards and left or right. Thus, the treadmill system senses movement and then reacts by moving the treadmill in such a manner to reposition the user in the center of the treadmill.

Oftentimes, expensive motors are required in such VR systems, and more importantly, the system must physically move the user resulting in a potentially "jerky" or even unsafe motion as the user is repositioned in the center of the treadmill. If the user moves too quickly, e.g. beyond the pace of a walk, the system may not react in time and the user may actually walk off of the treadmill or the system may attempt to quickly move the user back to the center of the treadmill and "jerk" the user. Again, as with other systems, this motion may cause disorientation and nausea in some users. Furthermore, if the user trips or loses his or her balance while using the treadmill, the user may experience falling and injury. Falling and loss of balance can occur in such systems since the user cannot actually "see" the physical treadmill, only the virtual world presented. Thus, if the user experiences any loss of balance, which is typical in such systems, the user has difficulty recovering balance and may fall.

Still other known virtual reality systems implement a user support that is rigidly secured above a sphere and supports a user on the exterior surface of the sphere and holds a center of mass of the user on a vertical axis passing through the sphere. Additionally, one or more sensors may be coupled to the base support to detect and measure a movement of the sphere. In addition, a harness and restraining support must be used in conjunction with the system to hold the user in position along one axis, while allowing for rotation when on the exterior surface of the sphere.

Yet other known virtual reality systems provide a system in which individuals can experience both visual and physical immersion into virtual environments by performing human locomotive characteristics such as walking, running, crawling, jumping, climbing, etc. in a stationary or confined space while visually interacting with a VR system and physically interacting with a mobility platform system. These devices may further provide a device designed to work in conjunction with a VR system where the user can navigate through different environments, while staying in one place, and view the changes in the environment commensurate with the amount of movement performed. Such systems again may allow a mode that would simulate locomotive functions (similar to treadmills) where one can endure locomotive exercise, yet remain in a relatively stationary position, safely. Such systems may include calibration strips with electromagnetic locomotion platforms to monitor foot movements albeit, in a stationary position. The drawback of such VR systems include side effects such as nausea and further, the inability of the user to move freely and safely in a physical environment.

Therefore, it is desirable to implement a system and method that permits real walking which results in higher immersive presence for virtual reality (VR) applications than alternative locomotive means such as walking-in-place and external control gadgets, but takes into account different room sizes, wall shapes, and surrounding objects in the virtual and real worlds. Despite perceptual study of impossible spaces and redirected walking, there are no known general methods that can effectively match and map a given pair of virtual and real scenes. Devising such mapping remains a drawback in existing VR display and navigation systems.

It is further desirable to implement a system and method in virtual reality (VR) applications, that permits real walking or jogging, rather than alternative locomotive means such as walking-in-place and/or external control devices. In order to offer a more immersive experience, real walking VR applications accommodate different room sizes, wall shapes, and surrounding objects in the virtual and real worlds. It is further desirable to implement a system and method that matches virtual and physical worlds thereby permitting immersive VR walk. The desired system and method enables free walking when users are using a known head-mounted display (HMD) while walking in a real space and display of a virtual space that the users perceive through the HMD. It is further desirable to implement a system and method that guides user navigation within the physical environment while retaining visual fidelity to the virtual environment.

It is yet further desirable to implement a system and method that preserves the virtual world appearance while the user is actually walking or navigating within the confines of the physical world geometry, yet retaining a comfortable balance between visual fidelity and navigation comfort. Such desired system and method may be utilized in applications ranging from medical applications such as training dementia patients, gaming such as first-person active gaming, educational such as architecture walkthrough, and other medical imaging applications. It is further desirable to implement a system and method that matches a given pair of virtual and physical worlds in a progressive and dynamic mapping system for immersive VR navigation.

It is further desirable to implement a system and method that can determine a planar map between the virtual and physical floor plans, that can minimize angular and distal distortions while conforming to the virtual environment goals and within the confines and any additional physical environment constraints. It is further desirable to implement a system and method that determines and designs maps that are globally surjective and permit the proper folding or compressing of large virtual scenes into smaller real scenes. It is further desirable to implement a system and method that is also locally injective to avoid locomotion ambiguity and intersecting virtual objects that exist in known virtual reality systems.

It is further desirable to implement a system and method that can implement these derived maps with an altered and progressive rendering to guide user navigation within the physical environment constraints and any confines, while retaining visual fidelity to the virtual environment.

It is further desirable to implement a system and method that effectively warps, folds and further refines the virtual world appearance as mapped into the real world geometry as mapped with greater visual and enhanced visual solutions and performance.

SUMMARY

In accordance with an embodiment or aspect, the present technology is directed to a system and method of generating a progressive representation associated with surjectively mapped virtual and physical reality image data. The system comprises a wearable communication device, an image capturing device, and a computing device.

The system and method includes a computing device that performs operations including receiving virtual image data associated with a virtual scene map of a virtual scene receiving physical image data from the image capturing device, the physical image data being associated with a physical environment of a real scene.

The system and method further includes determining perimeter information of the physical environment, determining boundary information of an obstacle associated with the physical environment, using the perimeter information and boundary information to generate a real scene map associated with the physical environment including an obstacle and one or more free space areas, and generating a corresponding virtual barrier in the real scene map, the virtual barrier associated with the boundary information of the obstacle in the real scene map.

The system and method further includes generating a folding of the virtual scene map into the one or more free space areas of the real scene map, the free space areas surrounding or adjacent the generated virtual barrier; and generating a representation to the wearable communication device, the representation being associated with virtual scene pixels of the virtual map corresponding to real scene points of the real scene map in a time interval.

In certain embodiments, the disclosed technology further includes the system and method of performing a stratified sampling of delineated sample points of the virtual map. The system and method may further add optimization constraints to the delineated sample points of the virtual map as folded in the real scene map. The stratified sampling may further including a stratum. The stratified sampling may further include a stratum comprising 0.025% pixels of the virtual map. In yet another embodiment, the stratified sampling may further include a set of stratified samples associated in which the stratified samples are located at a distance of at least 5× an average stratified sampling distance.

In some embodiments or aspects, the system and method generates a Gaussian based barrier for each obstacle associated with the physical environment. In yet another embodiment, the system and method generates a progressive representation that is progressively updated in a predetermined time interval. In yet another embodiment, the system and method adds a local bijective constraint to sample points of the virtual map. The system and method may further determine if fold-over is detected in a sampling of the virtual map. The system and method may further determine an updated physical position of a user associated with navigation of the physical environment. In yet a further embodiment, the system and method determines a corresponding virtual position of the user associated with the updated physical position of the user.

In some embodiments or aspects, the system and method determines a next virtual position of the user based on an estimated virtual direction of the user, the estimated virtual direction of the user being based on a Jacobian relation of respective mappings of the physical position and the virtual position of the user. In yet a further embodiment, the system and method progressively updates the virtual map based on a dynamic inverse mapping associated with the updated physical position of the user in the physical environment. In yet a further embodiment, the system and method generates progressive static representations of the virtual map based on the updated physical position of the user in the physical environment. In yet a further embodiment, the system and method surjectively maps each virtual scene pixel of the virtual scene map to each real scene point of the real scene map.

In some embodiments or aspects, the system and method generates the virtual map associated with a pathway of navigation of a user, the pathway of navigation overlaying the virtual map to form a virtual navigation map. Yet further, the system and method generates a folding of the virtual navigation map into the one or more free space areas of the real scene map. Yet further, the system and method generates a representation associated with the virtual navigation map to the wearable communication device.

In accordance with a further embodiment or aspect, a computer readable device is disclosed, storing instructions that, when executed by a processing device, performs operations. The operations include receiving virtual image data associated with a virtual scene map of a virtual scene, and receiving physical image data associated with a physical environment of a real scene. Furthermore disclosed are operations that include determining perimeter information of the physical environment, determining boundary information of an obstacle associated with the physical environment, and using the perimeter information and boundary information to generate a real scene map associated with the physical environment including an obstacle and one or more free space areas. Additional operations include generating a corresponding virtual barrier in the real scene map, the virtual barrier being associated with the boundary information of the obstacle in the real scene map. Generating a folding of the virtual scene map into the one or more free space areas of the real scene map, is further disclosed, with the free space areas surrounding or adjacent the generated virtual barrier. Further operations include generating a representation to a wearable communication device, the representation being associated with virtual scene pixels of the virtual map corresponding to real scene points of the real scene map in a time interval.

In certain embodiments, the operations further comprise surjectively mapping each virtual scene pixel of the virtual map to each real scene point of the real scene map.

These and other purposes, goals and advantages of the present application will become apparent from the following detailed description read in connection with the accompanying drawings.

BRIEF DESCRIPTION OF THE DRAWINGS

Some embodiments or aspects are illustrated by way of example and not limitation in the figures of the accompanying drawings in which:

FIGS. 3A-3E comprehensively illustrate an overview of an embodiment of the virtual mapping system and method. In particular, FIG. 3A individually illustrates an aerial view of the virtual world floor plan including the virtual pathway of navigation of the user. FIG. 3B individually illustrates an aerial view of the physical world floor plan including the pathway of navigation of the user. FIG. 3C individually illustrates the physical floor plan. FIG. 3D individually illustrates the virtual world appearance associated with the user's HMD view. FIG. 3E individually illustrates the virtual world appearance associated with the user's HMD view in a compatible format with the real world geometry.

FIG. 4 illustrates an embodiment of the virtual reality mapping system, in particular the boundary of an obstacle within the physical space that the user navigates within, is determined and delineated by the disclosed system and method, as shown.

FIG. 6A illustrates an aerial view of a set of virtual world floor plans provided as an input to the virtual mapping system, in accordance with an embodiment of the disclosed system and method.

FIG. 8 illustrates an example result of static mapping in which the virtual world is shown as curling up or folding into the smaller real space world map, in accordance with an embodiment of the disclosed system and method.

FIGS. 9A-9E provide a side-by-side overview of each of the panels as illustrated with greater particularity in corresponding FIGS. 9F-9J, in accordance with an embodiment of the disclosed system and method.

FIG. 9F illustrates three example original virtual scenes that each input to the system. FIGS. 9G and 9H illustrate the corresponding maps to real physical spaces with different sizes and shapes illustrated therein.

FIGS. 9I and 9J show the corresponding maps to real spaces with interior obstacles within and adjacent to the boundaries illustrated therein.

FIGS. 12A-12C illustrate example virtual scenes and their respective bijection characteristics, in accordance with an embodiment of the disclosed system and method.

FIGS. 16A and 16B illustrate an example method to minimize shape distortion in the final map using a geometric preserving visualization method applied to virtualized and optimized virtual maps.

FIGS. 19A-19F illustrate examples of various renderings in accordance with an embodiment of the disclosed system and method.

FIGS. 20A-20D illustrate example renderings of virtual and real camera views in example embodiment of using environment maps to remove environmental artifacts.

FIGS. 22A-22D illustrate side-by-side comparisons of different renderings possessing different virtual-real mixing weights w ranging from 0% to 100% and resultedly exhibiting varied renderings.

FIGS. 26A-26C illustrate example renderings in which dis-occlusion and artifacts present.

FIG. 27 illustrates a system block diagram including an example computer network infrastructure in accordance with an embodiment of the virtual mapping system.

FIGS. 30A-30D each illustrate an exemplary virtual mapping system that implements a head-mounted display and computing device, each FIG. 30A-30D in accordance with an embodiment of the virtual mapping system.

Figure 1:
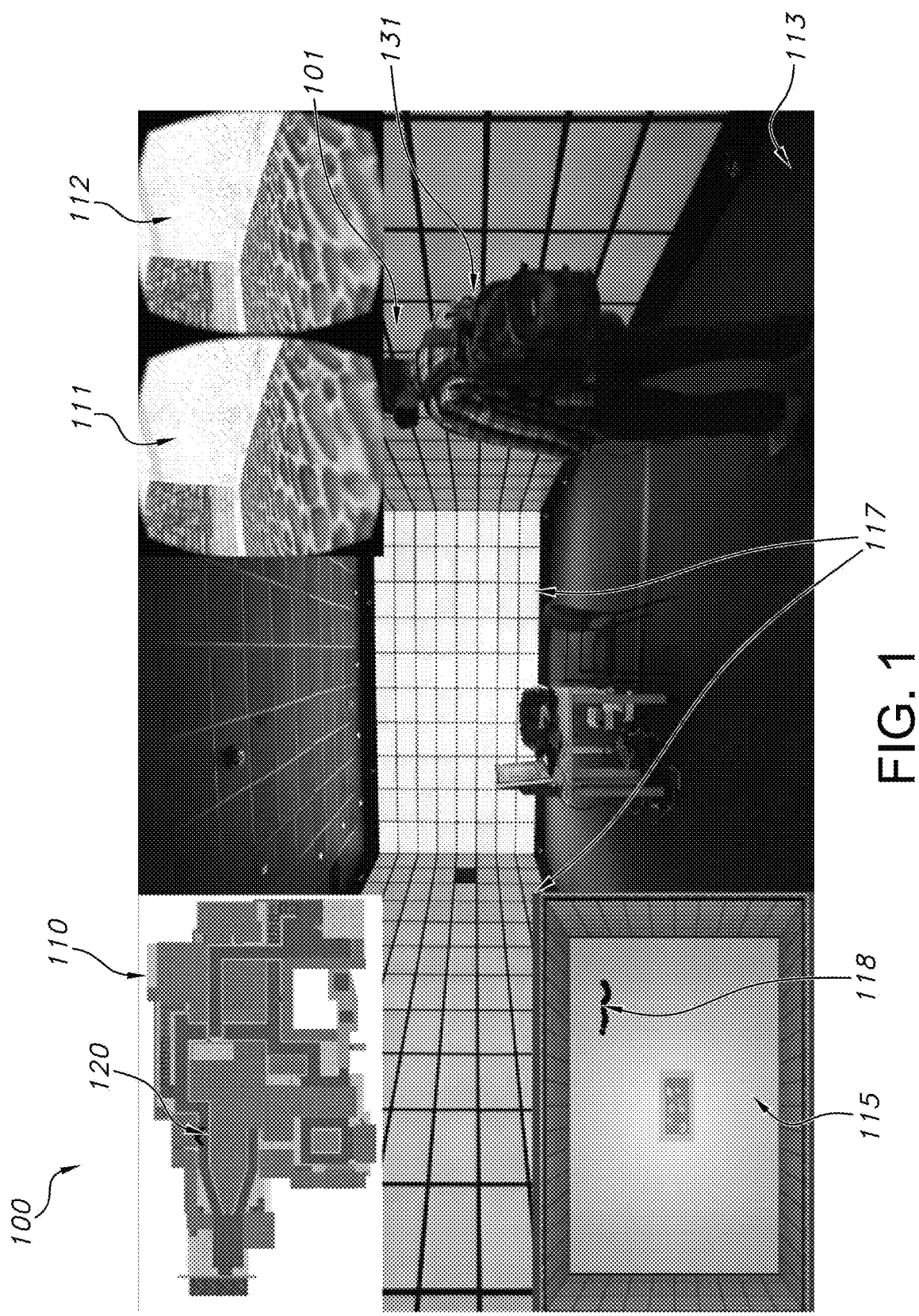
FIG. 1 is a diagram illustrating an embodiment of the system and method of mapping a virtual world to physical reality including a top view of the virtual floor plan, the real world floor plan, the confined physical environment, and a user's HMD view.

It is to be appreciated that elements in the figures are illustrated for simplicity and clarity. Common but well-understood elements, which may be useful or necessary in a commercially feasible embodiment, are not necessarily shown in order to facilitate a less hindered view of the illustrated embodiments.

DETAILED DESCRIPTION

A system and method of generating progressive representations of mapped virtual and physical reality within the boundaries and constraints of a physical environment are disclosed herein. In the following description, for the purposes of explanation, numerous specific details are set forth in order to provide a thorough understanding of example embodiments or aspects. It will be evident, however, to one skilled in the art, that an example embodiment may be practiced without all of the disclosed specific details.

With the confluence of virtual reality (VR) hardware and software developments, a variety of devices and setups are now offering different costs, features, and capabilities. Ideally, a VR environment should facilitate full immersion and natural movement. Current devices such as projected rooms (CAVEs) and head mounted displays (HMDs) can provide realistic rendering, but often require users to remain stationary or walk within a limited area due to hardware limitations (e.g., CAVE space or HMD cables) or navigation concerns (e.g., real environments not visible through HMD). Users thus need to employ less natural means such as gamepads and walk-in-place devices to control their movements, which can negatively impact their sense of presence compared with natural interaction and real walking.

Combining realistic VR displays and real walking has the potential for immersive presence and natural interaction. Free walking is already viable on the hardware side, as upcoming HMDs are equipped with low cost motion trackers (e.g., HTC Vive including motion trackers compared to more expensive models such as for example, OptiTrack motion capture). However, the problem remains that virtual and real worlds often differ significantly in sizes, shapes, and objects. Thus, proper mapping between the two is necessary in order to provide a credible and immersive presence in the virtual world and furthermore, result in feasible and safe navigation in the real world. As an example, a system and method is desirable in which users remain perceptually comfortable and without any danger of bumping into objects. Devising such effective mapping remains an important open problem in VR display and navigation between the virtual and physical worlds.

Techniques such as redirected locomotion [Razzaque et al. 2002; Hodgson et al. 2008], distorted space [Suma et al. 2012; Vasylevska et al. 2013], and physical props [Cheng et al. 2015] have shown promise for bridging the gap between virtual and real scenes. However, behavioral studies, such as [Steinicke et al. 2008; Nilsson et al. 2014; Bruder et al. 2015], have indicated the possibility of navigating a large-scale virtual environment, while physically remaining safely in a reasonably sized small real space. However, those existing methods use procedurally generated content for feasibility studies, but do not provide general methods to map effectively between a given pair of virtual and real environments. Since the virtual environment (e.g., a game or an architectural design) is usually orthogonal to the physical environment (which varies depending on the end users), a general method to bridge the two (e.g. virtual and physical environments and respective perception thereof) remains a challenge in existing systems for providing real immersive VR walkthrough in various applications (eg. medical, training, exercise, and gaming).

The disclosed technology is directed to a virtual reality mapping system and method that progressively and dynamically maps virtual reality within the constraints, obstacles and delineations of the physical space the user is navigating. The system and method maximizes the user's presence in a given virtual world and facilitates real walking or locomotion in a given physical world. For purposes of illustration, both virtual and physical worlds are represented as planar floor plans, and in certain embodiments implement an HMD including a camera embedded therein (for example, Oculus DK2) with the HMD connected to a notebook computer or other computing device, which operate as the VR device and allow free navigation. The disclosed system and method faithfully renders the virtual world inside the HMD but alters the camera projection for navigating the real environment, so that a user can retain perceptual comfort while being guided to stay within the boundary walls and away from potentially unsafe obstacles such as walls, objects, and/or furniture.

In virtual reality (VR) applications, real walking offers a higher immersive presence than alternative locomotive means such as walking-in-place and external control devices. In order to offer a more immersive experience, real walking VR applications accommodate different room sizes, wall shapes, and surrounding objects in the virtual and real worlds. Embodiments of the invention described herein include a system and method that matches virtual and physical worlds for immersive VR walk through. The system and method enables free walking when users are using a head-mounted display (HMD) while walking in a real space and display of a virtual space that the users perceive through the HMD.

Embodiments of the invention include computing a planar map between the virtual and physical floor plans to minimize angular and distal distortions while observing virtual environment goals and physical environment constraints. From these maps, an altered rendering is derived and displayed on an HMD to guide user navigation within the physical environment while retaining visual fidelity to the virtual environment. According to certain embodiments, virtual and real maps are designed to be globally surjective, e.g., to allow proper folding or compressing of large virtual scenes into smaller real scenes, but locally injective to avoid locomotion ambiguity and rendering intersected virtual objects, with sufficient quality and performance for VR walkthroughs. The system and method may be utilized in applications ranging from first-person gaming application, architecture walkthrough, and medical imaging.

Furthermore, embodiments of the invention described herein provide an HMD VR system, and method of operating the same, that allows real walking in a physical environment while perceiving a virtual, typically larger, environment. The system and method include a custom planar map that is globally surjective but locally injective between the virtual and physical floor plans to minimize angular and distal distortions for walkthrough. In addition, optimization methods are also provided to compute the planar maps as two parts: a static forward map that minimizes angle and distance distortions while avoiding obstacles and boundaries and a dynamic inverse map that guides natural locomotion and resolves local ambiguities. A rendering method is provided that preserves the virtual world appearance while walking inside the physical world geometry to balance between visual fidelity and navigation comfort.

Accordingly, a system and method for mapping virtual reality (VR) and physical reality on a head-mounted display (HMD) is provided. The system and method described herein includes: computing a static forward map. Computing the static forward map includes mapping each virtual scene pixel to a real scene point. The static forward map minimizes distance and angle distortion for VR walkthroughs. The method includes computing a dynamic reverse map. The dynamic reverse map minimizes perceptual angle and distance distortion during navigation. The method includes rendering a virtual scene and a real scene on the HMD. Utilizing this system and method, a user perceives the virtual scene while physically navigating in the real scene.

FIG. 1 is a diagram illustrating an embodiment of the system and method of mapping a virtual world to physical reality including a top view of the virtual floor plan, the real world floor plan, the confined physical environment, and a user's HMD view. The two-dimensional (2D) virtual floor plan 110 is the 2D floor plan or layout of the virtual world. The real world floor plan 115 is the corresponding 2D map of the physical space or environment 113 associated with the user 101 that is navigating freely therein, and in certain embodiments within the confines of physical outer perimeters or boundaries 117, such as walls or other obstacles within the physical environment. While the user 101 is walking or navigating typically via walking, in an embodiment, the disclosed system tracks the user's 101 physical position generally as (x,y) coordinate pairs and collects up to an $n^{th}$ value of maximum (x,y) coordinate data points for a given predetermined time interval t. The system and method projects the user's physical position onto virtual space, such as for example, as the navigation path as shown in the FIG. 1, 120 and as further shown in the real world floor plan 115, item 118. Such tracking is accomplished generally using known tracking sensors. A sensor is an electronic component, module, or subsystem whose purpose is to detect events or changes in its environment and send the data or information to other electronics, frequently a computer processor. A sensor is generally implemented and known for use with other electronics, including a computer or processor. Various known sensors that may be implemented in such systems are motion, proximity ultrasonic, sonar, laser, etc. The user 101 in the shown embodiment navigates with a computing device 131 located for example, in a backpack.

The disclosed system and method consists of two main components: a planar map between virtual and real world floor plans, and a camera projection derived from the planar map and scene content. The planar map aims to preserve both angle and distance between the virtual and real worlds for visual and locomotive consistence. The camera rendering aims to preserve the virtual world appearance and the real world geometry, while guiding user navigation to avoid physical obstacles and any vestibular discomfort.

Both planar maps [Poranne and Lipman 2014; Fu et al. 2015; Chen and Weber 2015] and projective rendering [McMillan 1997; Yang et al. 2011; Popescu et al. 2009] have been extensively studied in computer graphics. However, the disclosed VR method has different requirements from these known mapping systems. Prior planar maps often require bijectivity to avoid folds, but the disclosed method does not require any bijectivity as it seeks and accomplishes proper folding (for example, curling, compressing, contorting, perturbing and/or collapsing) of the virtual world plan 110 into the real world floor plan 115.

A bijection, bijective function, or one-to-one correspondence is a function between the elements of two sets, where each element of one set is paired with exactly one element of the other set (eg. virtual map to planar map), and each element of the other set is paired with exactly one element of the first set. There are no unpaired elements. In mathematical terms, a bijective function f: X→Y is a one-to-one (injective) and onto (surjective) mapping of a set X to a set Y.

It is known that a bijection from the set X to the set Y has an inverse function from Y to X. If X and Y are finite sets, then the existence of a bijection means they have the same number of elements. For infinite sets the picture is more complicated, leading to the concept of cardinal number, a way to distinguish the various sizes of infinite sets. A bijective function from a set to itself is also known as a permutation. Bijective functions are essential to many areas of mathematics including isomorphism, homeomorphism, diffeomorphism, permutation group, and projective maps.

In contrast to such bijective mathematical processing, the disclosed system and method instead optimizes the maps that can preserve angle, distance, and furthermore, can be efficiently computed for VR navigation implementations. Prior projective rendering methods focus on speed and realism. In addition, the disclosed system and method also relies on the projection to properly guide user locomotion and hide perceptual discrepancies between the virtual and real worlds. The camera projection is derived according to the planar map and scene content which creates a balance between visual realism, geometric consistency, and perceptual comfort.

Therefore, as described in greater detail hereinbelow, the disclosed system and method generates a custom planar map that is globally surjective, but locally injective between the virtual and physical floor plans in order to minimize angular and distal distortions for walkthroughs.

Optimization methods to compute the aforementioned planar maps are accomplished in an embodiment by first generating a static forward map that minimizes angular and distal distortions, while simultaneously avoiding obstacles and boundaries. Second, a dynamic inverse map is generated that guides natural locomotion and resolves local ambiguities. Such rendering method preserves the virtual world appearance while observing the physical world geometry to balance between visual fidelity and navigation comfort.

Figure 2:
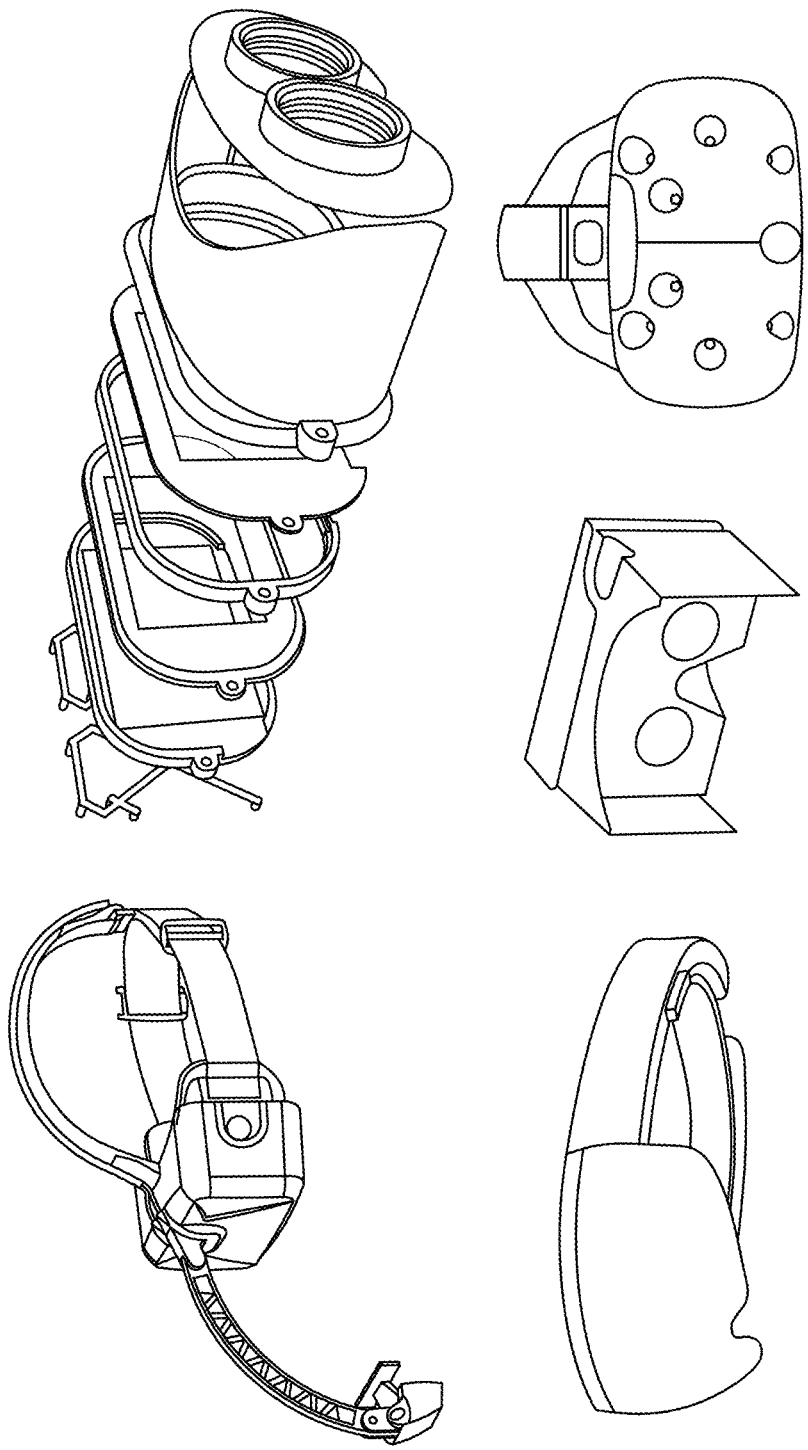
FIG. 2 is a diagram illustrating various types of known head-mounted display (HMD) devices, including associated computing devices, systems or processors that may be used in conjunction with a wearable computing platform such as shown for example, in FIG. 25B.

FIG. 2 illustrates various known head-mounted display devices (HMD) that are implemented in various embodiments of the disclosed system and method. However, other devices are contemplated, and the disclosed system and method is not limited to the implementation of an HMD but, serves as illustrative of certain disclosed embodiments as described herein.

An HMD is generally a display device, worn on the head or as part of a helmet, that has a small display optic in front of one (monocular HMD) or each eye (binocular HMD). A HMD has many uses including in gaming, aviation, engineering, and medicine. A typical HMD has one or two small displays, with lenses and semi-transparent mirrors embedded in eyeglasses (also termed data glasses), a visor, or a helmet. The display units are miniaturized and may include cathode ray tubes (CRT), liquid crystal displays (LCDs), liquid crystal on silicon (LCos), or organic light-emitting diodes (OLED). Some HMD models employ multiple micro-displays to increase total resolution and field of view.

HMDs differ in whether they can display only computer-generated imagery (CGI), or only live imagery from the physical world, or a combination. Most HMDs can display only a computer-generated image, sometimes referred to as a virtual image. Some HMDs can allow a CGI to be superimposed on a real-world view. This is sometimes referred to as augmented reality or mixed reality. Combining real-world view with CGI can be done by projecting the CGI through a partially reflective mirror and viewing the real world directly. This method is often called optical see-through. Combining real-world view with CGI can also be done electronically by accepting video from a camera and mixing it electronically with CGI. This method is often called video see-through. There is also an optical head-mounted display (OHMD), which is a wearable display that can reflect projected images and allows a user to see through it.

Research universities often use HMDs to conduct studies related to vision, balance, cognition and neuroscience. As of 2010, the use of predictive visual tracking measurement to identify mild traumatic brain injury was being studied. In visual tracking tests, a HMD unit with eye tracking ability shows an object moving in a regular pattern. For example, people unaffected by brain injury are able to track the moving object with smooth pursuit eye movements and correct trajectory.

There are various forms of immersive virtual environments. Some, such as rooms or cabins (CAVEs), that offer semi-immersive experiences in which users can see virtual worlds projected on physical displays. Others, such as head mounted displays (HMDs), have more compact setup and fuller immersion than CAVEs, and have gained recent popularity due to improvement in hardware and software (see e.g., [Huang et al. 2015; Li et al. 2015]). However, users' immersive experiences depend on, not only rendering/display performance but also interaction and navigation capabilities. HMDs alone can block perception of the surrounding real world with negative impacts on user interaction and navigation, such as hand motion [Jang et al. 2015], obstacle avoidance, and walking direction. Walking-in-place (WIP) techniques, such as omni-directional treadmills [Souman et al. 2008], robot tiles [Iwata et al. 2006], and motion carpets [Schwaiger et al. 2007], can reduce some of these issues, but have yet to gain popularity due to barriers in hardware and usability (see e.g., [Wong 2015]) including expense and overall bulkiness and constraints.

Studies have shown that real walking outperforms walking-in-place and other indirect means of VR navigation [Usoh et al. 1999]. However, real walking requires sufficiently large physical spaces, which are almost always in different (typically but not always smaller) sizes and shapes as distinguished from the corresponding virtual spaces (unless the latter are designed specifically based on the former, as in [Simeone et al. 2015]). Techniques such as physical props [Cheng et al. 2015], warped spaces [Suma et al. 2012; Vasylevska et al. 2013], and redirected walking [Razzaque et al. 2001; Maesen et al. 2013; Zmuda et al. 2013; Nescher et al. 2014] have been proposed to reconcile the virtual and physical worlds, and behavior studies have indicated that limited amounts of space distortion can be acceptable for VR navigation [Steinicke et al. 2008; Zhang and Kuhl 2013; Nilsson et al. 2014; Bruder et al. 2015]. However, existing methods implementing HMDs or other systems, are not able to map between a given pair of virtual and physical environments.

Various planar mapping methods have been proposed to achieve application-specific goals such as minimizing distortion and avoiding folding (see e.g., [Poranne and Lipman 2014; Fu, et al. 2015; Chen and Weber 2015] and the references therein). The disclosed system and method while also relying on planar mapping, has requirements beyond existing methods in order to provide a fully immersive virtual effect for users. For example, sparse constrained deformation [Schuller, et al. 2013] and convex SOCP optimization [Poranne and Lipman 2014] are not suitable for solving the problem. There is the need for local isometry for geodesics, rather than global isometry for distance-preserving techniques. Moreover, most traditional planar mapping and deformation applications are based on user manipulation. In the disclosed system and method, the output domain is generally pre-defined by the real space. Therefore, the disclosed system and method provide a custom planar mapping solution with application-specific objectives, constraints, and solvers, above and beyond the existing systems.

In addition, re-projective rendering has a long history in computer graphics, including image-based rendering [McMillan 1997], general camera models [Popescu et al. 2009], and shading reuse for acceleration [Yang et al. 2011]. The disclosed system and method, in accordance with embodiments described in greater detail hereinbelow, uses re-projective rendering for HMDs, but solves the existing unique challenge of combining the appearance of the virtual world and the geometry of the physical world to strike the right balance between visual fidelity and navigation comfort to improve the user's overall experience. In this regard, the disclosed system and method of mapping virtual reality using progressive technical processes, provides a solution by generating a custom re-projective rendering method to address the challenge as described in the foregoing.

Referring to FIGS. 3A-3E, comprehensively illustrated is an overview of an embodiment of the virtual mapping system and method. In particular, FIG. 3A individually illustrates an aerial view of the virtual world floor plan 310 including the virtual pathway 317 of navigation of the user. FIG. 3B individually illustrates an aerial view of the physical world floor plan 315 including the pathway 313 of navigation of the user 311. FIG. 3C individually illustrates the physical environment 301. Shown is the user 311 navigating a physical room 301 including boundaries 303 and obstacles 312 such as desk and chairs. FIG. 3D individually illustrates the virtual world appearance associated with the user's HMD view. FIG. 3E individually illustrates the virtual world appearance associated with the user's HMD view in a compatible format with the real world geometry. Typically the virtual world floor plan is larger than the real world floor plan. However, there are embodiments of the disclosed system in which the real world floor plan is larger.

Figure 3F:
FIG. 3F illustrates an embodiment of the virtual reality system, in particular the outer boundary or perimeter of the physical space that the user navigates within, as determined and delineated by the disclosed system and method, as shown.

In accordance with the disclosed system and method, as described in greater detail hereinbelow for at least FIGS. 3F-6C, the system enables the user to walk freely within the confines of the physical world floor plan 315 that is mapped and shown, in FIG. 3B, with the user's track of navigation associated with user locomotion within the physical room 301 and further, the user's path of navigation 313 being mapped as shown in FIG. 3B, 313. As the user navigates freely as shown in FIG. 3C, the computing system or processor and/or tracking sensors, or a GPS type system, either embedded in the HMD, on the user or alternatively, remotely or operatively connected thereto, is able to track the path of navigation in the physical room 301, collect the planar data points as (x,y) coordinates that correspond with such path, and correspond the data points to create the real world path 313 as shown in FIG. 3B and that is compatible to and corresponds with the virtual path 317 in FIG. 3A. The disclosed system and method renders the virtual word appearance shown in FIG. 3D (left and right panels) as viewed via the HMD in a way that is compatible with the real world geometry. In effect, the user can faithfully view the virtual word and comfortably navigate the real world geometry. Even though the user's view may be partially or entirely blocked by the HMD, the disclosed system and method guides the user away from the boundaries and obstacles 312 such as walls and furniture. In certain embodiments, tactile feedback may be delivered to the HMD to warn the user that an obstacle 312 is near and to halt any further movement in the particular direction of the user.

It is noted that while the user perceives the virtual wall which is generally matched by the virtual reality mapping system to where the actual physical wall exists or another physical obstacle in the physical environment, the user is thereby discouraged and is prevented from hitting the wall of the physical environment within which the user navigates. In other disclosed embodiments a wall corner may be displayed where an obstacle resides, for example, a table or chair. The disclosed system and method applies a process referred to as an exterior boundary constraint and an interior obstacle barrier which will be described in greater detail hereinbelow, to prevent the user from navigating into an obstacle. The disclosed system applies a low variance Gaussain as a barrier in the optimization system. It punishes the obstacle areas such that the mapped output in the real world domain is the ideal path users can safely follow.

FIG. 3F illustrates an embodiment of the virtual reality system, in particular the outer boundary or perimeter 303 of the physical space 301 that the user navigates within, as determined and delineated by the disclosed system and method, as shown and further explained hereinbelow. The user will navigate the physical space 301 but, the system in advance will determine the boundaries of the physical room or space as shown at 303 based for example on a geometry based tracking system which renders the dimensions of the physical room 301 to the system.

FIG. 4 illustrates an embodiment of the virtual reality mapping system, in particular the boundary of an obstacle that is determined by the system to reside within the physical space that the user navigates within. The boundary 401 is determined and delineated by the disclosed system and method, as shown. The disclosed system and method will delineate any obstacles 403 as shown in FIG. 4, circle 401 in the determination of boundaries 401 including any boundaries formed by walls. The obstacles 403 are generally designated by a circumscribed polygon or other shape. In the shown example, a circle 401, is shown as the boundary drawn by the system, within which all obstacles are contained therein. Other polygon shapes may be implemented by the VR system depending on the shape of the obstacle(s).

Figure 5:
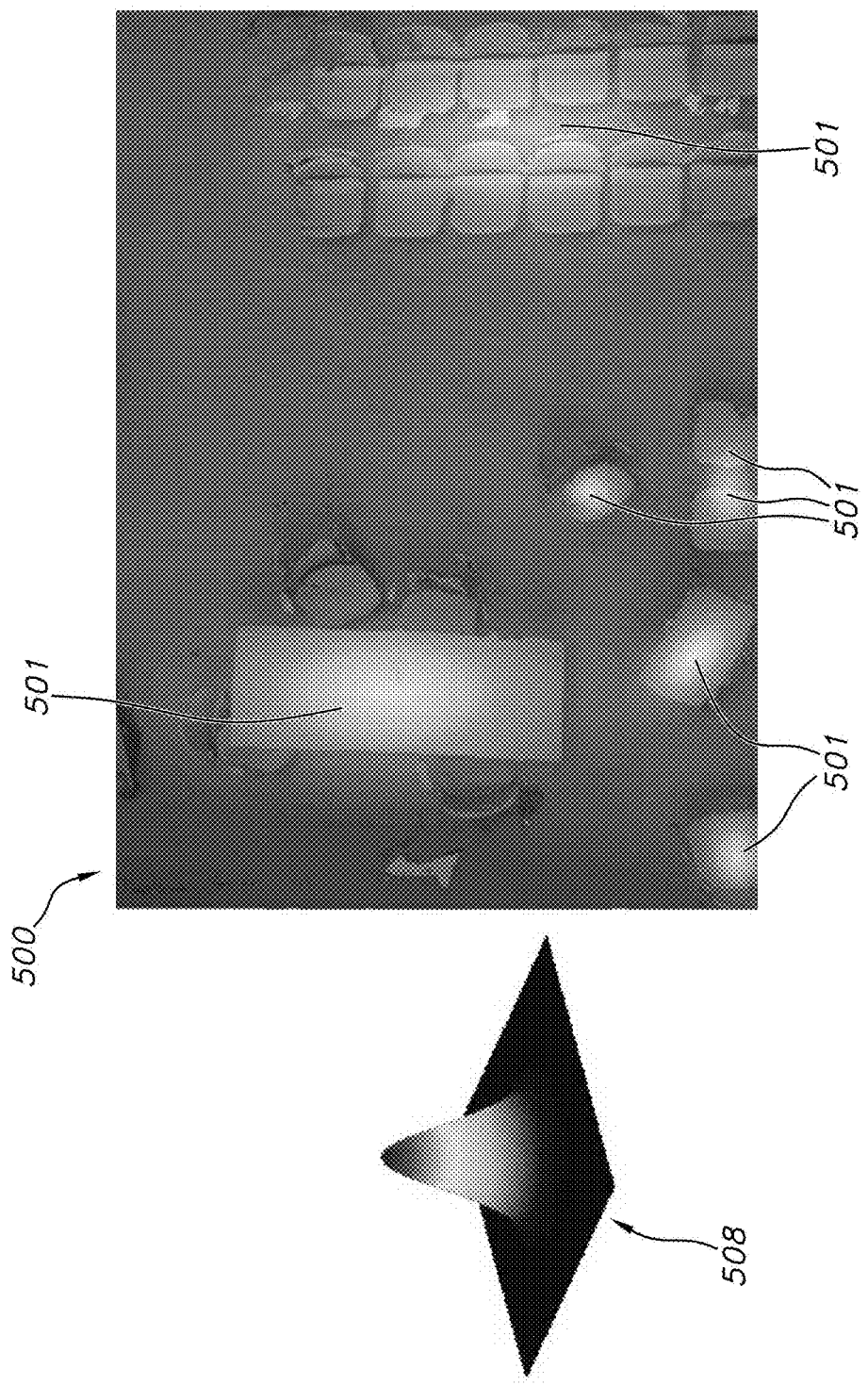
FIG. 5 illustrates an embodiment of the virtual reality mapping system, in particular the Gaussian barrier process by which a boundary of an obstacle within the physical space that the user navigates within, is determined and delineated by the disclosed system and method, as shown.

FIG. 5 illustrates an embodiment of the virtual reality mapping system, in particular the process by which a boundary of an obstacle within the physical space that the user navigates within, is determined and delineated by the disclosed system and method, as shown.

Figure 5A:
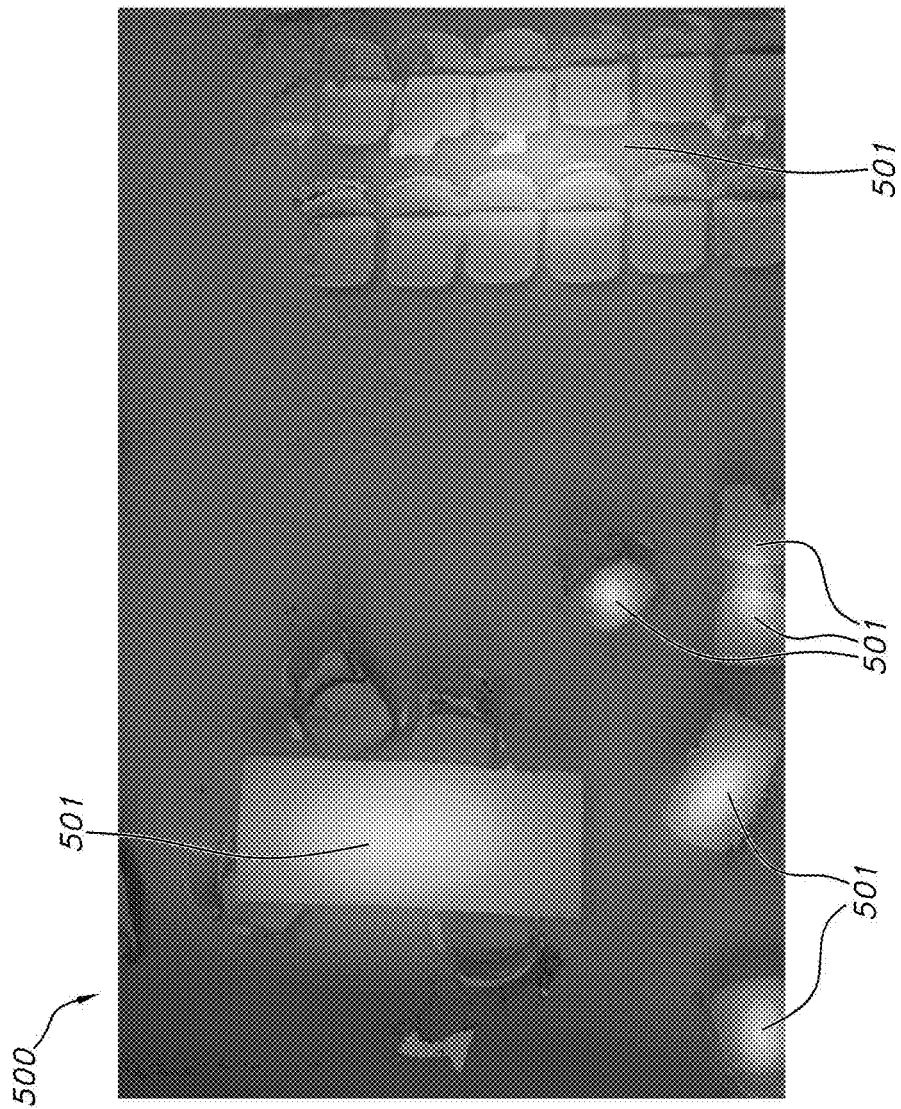
FIG. 5A also illustrates an embodiment of the virtual reality mapping system, in particular the process by which a boundary of an obstacle within the physical space that the user navigates within, is determined and delineated by the disclosed system and method, as shown.

FIG. 5A also illustrates an embodiment of the virtual reality mapping system, in particular the process by which a boundary of an obstacle within the physical space that the user navigates within, is determined and delineated by the disclosed system and method, as shown.

Shown in FIG. 5, is a Gaussian barrier 508, generally of low variance, used as a barrier in the optimization system to rule out any corresponding obstacles from the physical and the virtual reality maps. The objects as shown in elements 501, include lighter circular centers which the system delineates as the centers of obstacles and are based on their position in the physical floor plan 500. Therefore, the system in accordance with processes described in greater detail hereinbelow, applies processes to prevent such obstacles from appearing as free navigation areas in the corresponding virtualized map and specifically, excludes such areas 501 from the corresponding virtualized map. FIG. 5A also shows the objects as shown in elements 501, are lighter circular centers indicating where the obstacles exist in the physical environment and hence, in the respective mapped physical floor plan 115. The mapped output in the real world domain is the ideal set of paths users can safely navigate without encountering the obstacles 501 present in their physical environment 301.

Figure 6B:
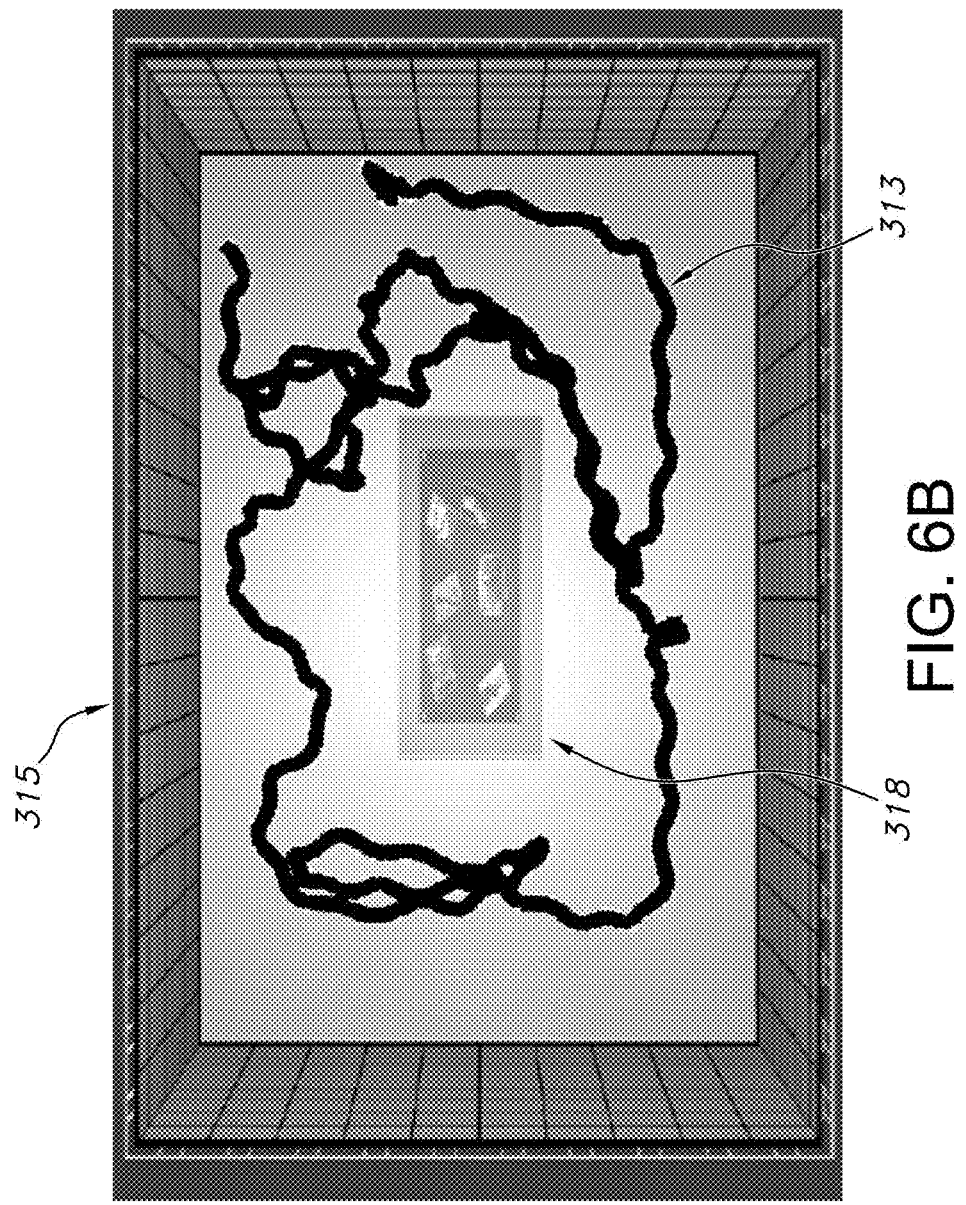
FIG. 6B illustrates an aerial view of a set of real world floor plans also provided as an input to the virtual mapping system, in accordance with an embodiment of the disclosed system and method.

Referring to FIG. 6A, shown is an aerial view of a set of virtual world floor plans provided as in input to the system, in accordance with an embodiment of the disclosed system and method. FIG. 6B illustrates an aerial view of a set of real world floor plans also provided as in input, in accordance with an embodiment of the disclosed system and method. The projected path 317 of the user in the corresponding virtual scene floor plan in FIG. 6A is shown as pathway 317. The corresponding pathway of the user in the physical or real scene floor plans 315 is detected by the system and shown as pathway 313 in FIG. 6B. A static mapping of the virtual floor plans and the real world floor plans is computed in accordance with a disclosed embodiment of the VR system. The mapping that is static is considered surjective such that the limited real world space can be reused to fulfill the immersion of the user in the virtual world environment. During execution as described in greater detail below, the system can track the user position and the formed pathway 313 in the real space plans shown in FIG. 6B, and determine the corresponding positions and respective user pathway 317 thereby formed in the virtual space plans 310, as mapped thereto by the system. The virtual scene is rendered for comfortable navigation of the user in the wearable HMD. Also shown in FIG. 6B, is an obstacle 318 that is mapped from the physical room 301 and which the user accordingly avoids in navigating the physical room 301 and hence the physical room/real scene plan map 315.

Figure 6C:
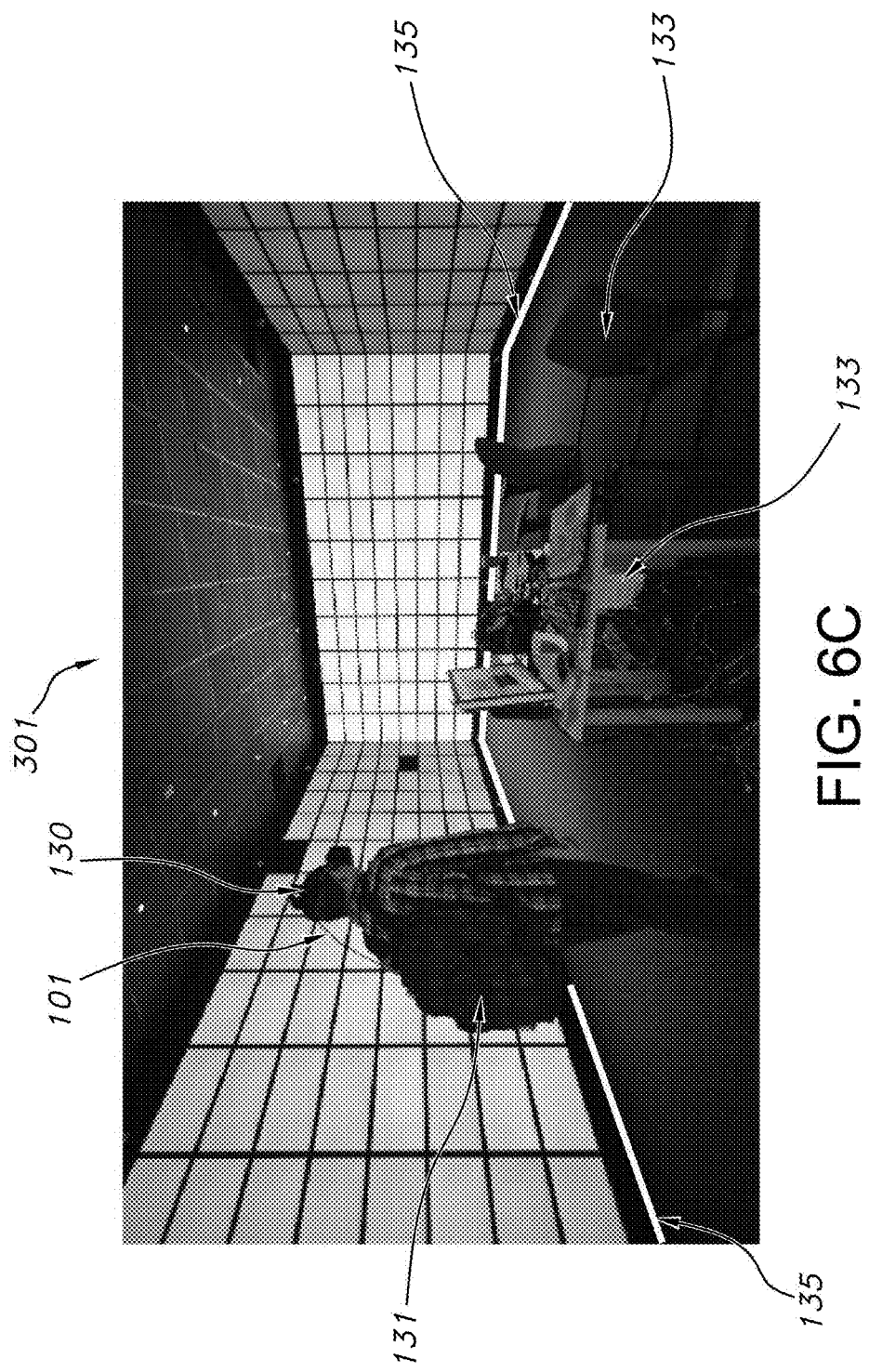
FIG. 6C shows the user wearing the HMD and portable computing device as freely navigating the room while avoiding shown obstacles, in accordance with an embodiment of the system and method.

FIG. 6C shows the user 101 wearing the HMD 130 mounted on his head and eye area, with a portable computing device 131 as freely navigating the physical room or confined physical environment 301, while avoiding shown obstacles 133, in accordance with an embodiment of the disclosed system and method.

In order to implement an example virtual reality mapping system, FIG. 6C illustrates an example physical environment 301, in particular, a 5 m×10 m room with 24 OptiTrack motion capture cameras installed along the floor and ceiling edges, and a rectangular desk and chair located in the middle of the room or environment 301, which are considered obstacles 133 within the room's boundaries 135. A rigid body OptiTrack tracker is attached on top of an Oculus DK2 HMD 130 to track the user's 101 movement as he/she navigates the physical environment 301. The HMD 130 is further connected to and driven by a laptop computing device 131 with for example, Intel i7-5700HQ CPU, NVIDIA GTX980 m GPU, and solid-state drive. A lightweighted uninterruptible power supply in a backpack provides power to the HMD. During user movement, the position u is detected and streamed from the motion capture system, and the orientation U is detected and transmitted to the Oculus HMD orientation sensor. The Oculus HMD 130 supports two types of renderings: a pair of identical binocular images or a pair of different monocular images with disparity.

A hybrid VR framework [Febretti et al. 2014] may be implemented to transmit and essentially drive all hardware and synchronize signals required in the virtual reality mapping system. In order to optimize physical space 301 usage and computation speeds, a subset of the virtual space $S_v$ is considered during offline optimization methods for example, static forward mapping as described hereinbelow, and online walkthroughs and related tracking methods, also described hereinbelow. This sub-set or reachable area extraction set should be reachable and achievable for optimized mapping in accordance with the example virtual reality mapping system and method, with navigation starting from the initial virtual position. Thus, the system performs a flood fill method over the virtual scene with root as x(0). All covered reachable mapping regions serve as the input domain of the static mapping function $f$.

In order to map the virtual world within the physical constraints of the actual real world map, certain optimization processes are simultaneously undertaken in order to map the world in a constrained optimized format, which will be described with greater particularity hereinbelow.

Figure 7:
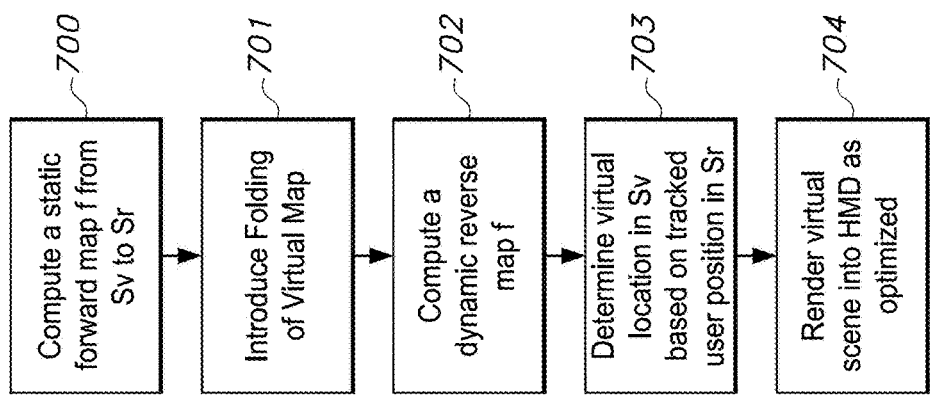
FIG. 7 illustrates a flowchart of an exemplary method of rendering a virtual scene into HMD, in accordance with an embodiment of the virtual reality mapping system.

As shown in FIG. 7, disclosed is a flowchart of an exemplary method of rendering a virtual scene into the HMD. Using the 2D floor plans for the virtual $S_v$ and real $S_r$ scenes, as inputs, the disclosed system and method first computes a static forward map $f$ from $S_v$ to $S_r$ at step 700. This map is surjective but not bijective in general when $S_v > S_r$, but should minimize both distance and angle distortion for VR walkthroughs. The static map is computed for every point in both $S_v$ and $S_r$, while keeping inside $S_r$ and away from interior obstacles. Folding is introduced without tearing or breaking apart the virtual world as shown in step 701. One of the fundamental concepts of mapping is the concept of folding (for example, curling, compressing, contorting, perturbing and/or collapsing) the virtual world in the real world space plan. This process of folding permits constrained optimization to avoid walls and obstacles. Folding is considered a novel solution to the constrained optimization problem. Such static mapping will be globally surjective and locally bijective. The static map will have characteristics such as low shape distortion for comfortable visual and locomotive experience. In addition, the entire track of user's 101 footsteps can effectively and safely bypass any such walls and obstacles. Introduction of global surjection in such static mapping permits reusing of the physical space. Introduction of local bijection in static mapping prevents and avoids the potential space from flipping over. These processes are described in greater detail hereinbelow.

At run time during user navigation, the method further computes a dynamic reverse map of f as shown in step 702, in order to determine the virtual location in $S_v$ from the tracked user position in $S_r$ as shown in step 703 of FIG. 7. This reverse map should be consistent with the forward map f, while maintaining motion and perception consistency for the users.

Finally, the disclosed method renders the virtual scene in optimized format into the HMD, as illustrated in step 704 of FIG. 7. The rendering should possess sufficient quality and speed, and fit the appearance of the virtual scene into the confines and geometry of the real scene including balance between visual and motion fidelity.

Figure 7A:
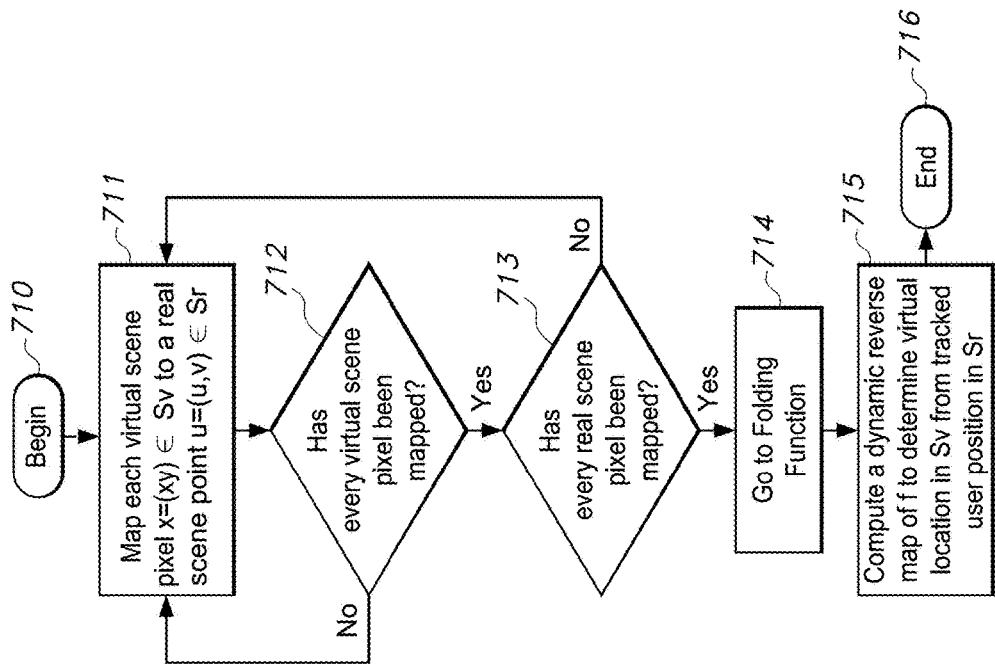
FIG. 7A illustrates a flowchart of an exemplary method of performing static forward mapping in rendering a virtual scene into HMD, in accordance with an embodiment of the virtual reality mapping system.

Referring to FIG. 7A, illustrated is a flowchart of an exemplary method of rending a virtual scene into the HMD including static forward mapping to $f$ of each virtual scene pixel to a real scene point, performing the folding function on the image data, and then computing a dynamic reverse map of $f$ in order to track VR walkthroughs and relevant user position data. Initially, the example method will begin at step 710. The system initiates the method by receiving the 2D floor plans for the virtual $S_v$ and real $S_r$ scenes, as inputs. At step 711 the computing device will surjectively map each virtual scene pixel x=(x,y)∈$S_v$ to a real scene point u=(u, v)∈$S_r$, where $S_v$ and &represent 2D planar regions. The system will next determine if every virtual scene pixel has been mapped at step 712 and if not, will continue back to step 711 to map the next virtual scene pixel x+1=(x+1,y+1)∈$S_v$ to a real scene point u+1=(u+1, v+1)∈$S_r$. It is noted that this map is surjective but not bijective in general when $S_v > S_r$, but should minimize both distance and angle distortion for VR walkthroughs. The static map is generally computed for every point in both $S_v$ and $S_r$, while keeping within the boundaries of $S_r$ and away from any interior obstacles using for example application of exterior boundary constraints, such as by application of 2D Gaussian based barrier functions for each interior object as described in greater detail hereinabove, in FIGS. 5 and 5A.

Once the example method determines that every virtual scene pixel has indeed been mapped, the method proceeds to step 713, in which another determination is made by the computing device. At step 713, the system determines whether every real scene pixel has been respectively mapped. If not, the method proceeds back to step 711 to surjectively map each virtual scene pixel x=(x,y)∈$S_v$ to a real scene point u=(u, v)∈$S_r$, where $S_v$ and &represent 2D planar regions. Once the system determines that every real scene pixel has been accordingly mapped, the system next proceeds to perform the method referred to as the folding function in step 714.

Folding is introduced without tearing or breaking apart the virtual world as shown in step 714. The folding function is also described in greater detail hereinbelow with respect to exemplary flowchart method illustrated in FIG. 13A. As described hereinabove for FIG. 7, one of the fundamental concepts of mapping is the concept of folding (for example, curling, compressing, contorting, perturbing, yielding and/or collapsing) the virtual world in the real world space plan. This process of folding permits constrained optimization to avoid walls and obstacles. Folding is a considered solution to the constrained optimization problem. Such static mapping will be globally surjective and locally bijective. The final static map possesses characteristics such as low shape distortion for comfortable visual and locomotive experience. In addition, the entire track of user's 101 footsteps can effectively and safely bypass any such walls and obstacles, as described in FIGS. 5 and 5A. Introduction of global surjection in such static mapping permits reusing of the physical space. Introduction of local bijection in static mapping prevents and avoids the potential space from flipping over. These processes are also described in greater detail hereinbelow in FIGS. 13 and 13A.

During the foldover process 714 of example method 7A, performed during the static forward mapping $f$ process, a global surjectivity method is applied which permits the system to fold large virtual map, $S_v$ into a sample, small real scene map, $S_r$. However, a local fold-over may produce visible artifacts, as described and exemplified in FIG. 12A.

In order to prevent such fold-overs of artifacts, a local bijectivity control feature is added to the static mapping, in accordance with an example embodiment as described below.

A mapping at a given point $x \in S_v$ is locally bijective (i.e., no fold-overs) when it satisfies:

Equation (9) is defined as:

$$\det(J_u(x)) > 0. \qquad (9)$$

In order to address these various performance issues, local bijective constraints are added in a coarse-to-fine process. In accordance with such disclosed method, initially $S_v$ (virtual map) is partitioned into a collection of cells as also shown and described hereinabove with respect to FIG. 10. Next during optimization, the following constraints are added to each sample point $x \in S_v$ in which:

Equation (10) is applied, respectively:

$$\det(J_u(x)) = \frac{\partial x}{\partial u}\frac{\partial y}{\partial v} - \frac{\partial x}{\partial v}\frac{\partial y}{\partial u} > 0. \qquad (10)$$

Figure 13:
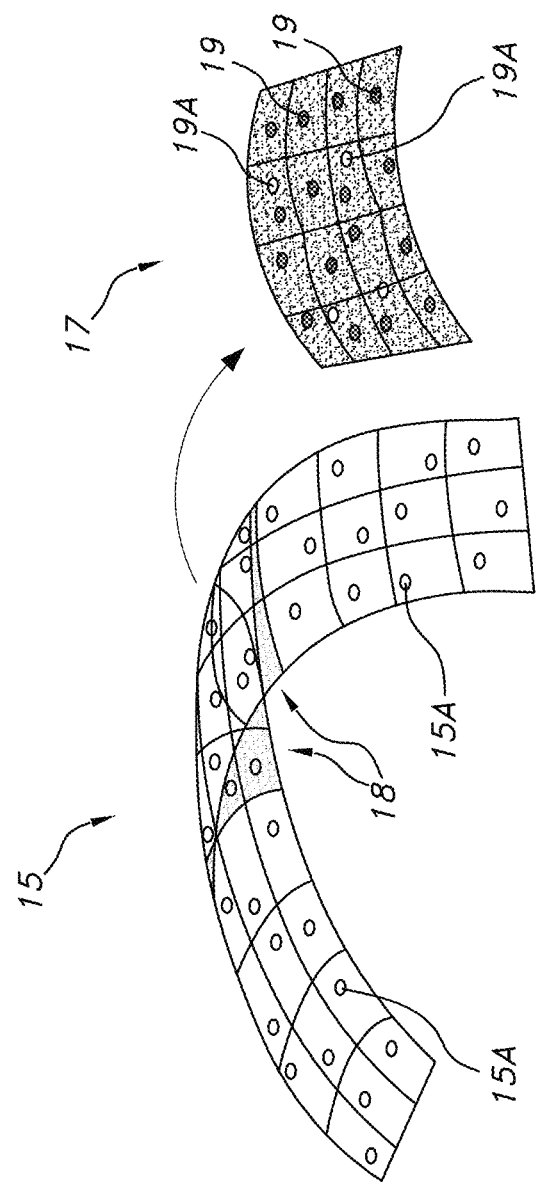
FIG. 13 illustrates an example local bijection sampling process of the virtual map $S_v$, in accordance with the sampling process as described in FIG. 10.

Described in greater detail below also with respect to FIG. 13, is a local bijection sampling process that detects any foldover and further performs an optimization process. Next the distance constraints are then relaxed as illustrated in the folding area 17 of FIG. 13, and as further described in greater detail hereinbelow for example, with respect to FIGS. 15A and 15B.

Once the folding function is completed in step 714, the example method of FIG. 7A, next proceeds to step 715 in computing a dynamic reverse map of $f$ in order to determine the virtual location in virtual scene map, $S_v$, from the tracked user position in real scene map, $S_r$.

In particular, at run time during user navigation, the method computes sich dynamic reverse mapping of f in step 715, in order to determine the virtual location in $S_v$ from the tracked user position in $S_r$ (as also described in step 703 of FIG. 7). This reverse map should be consistent with the forward map f while maintaining motion and perception consistency for the users.

The step of 715, dynamic reverse mapping, permits the system to properly render the virtual world to guide the user walking or navigation within the constraints of their physical space and simultaneously provides accurate visual and locomotion fidelity as described in greater detail hereinbelow.

In particular, during step 715 of FIG. 7A, the system tracks and collects data including user positions u(t) and u(t+1) as well as orientations U(t) and U(t+1) which are collected and tracked in the real world of the user, for example, $S_r$ at time steps, t and t+1. The corresponding virtual position x(t) and orientation X(t) at time t, is computed by the processing device or computing device. The corresponding virtual position x(t+1) and orientation X(t+1) is accomplished using the example dynamic inverse method. Note that this is a path dependent process as x(t+1) and X(t+1) are computed from x(t), X(t), u(t+1), and U(t+1). Initially, the system assigns x(0) and X(0) for the initial virtual world position and orientation.

Direction Update—

In order to compute x(t+1), the moving direction of the user is first determined and computed in accordance with Equation (14) (as described in greater detail hereinbelow).

Next during step 715, the virtual and real world directions are related by the Jacobians of their mapping as follows, in accordance with equation (15) (described in greater detail hereinbelow) and further in accordance with Equation (16) (also described in greater detail hereinbelow) which provides the real world direction. Thus, the final result is determined by computing the Jacobian of the reverse function off in Equation (1).

Even though f might not be globally bijective, the local bijectivity satisfies the inverse function theorem and thereby permits computing the inverse Jacobian via Equation (18) (described in greater detail hereinbelow), where $J_x(u)$ can be computed from the analytic function f at position x(t).

During step 715 of FIG. 7A, the system next determines the new virtual position x(t+1) based on the estimated direction δx(t). Focusing on the 2D x-y position, the z/height value of x can be directly assigned from u after an initial correspondence. For computation purposes, Δx(t)=x(t+1)−x(t), is defined and represented in a polar coordinate system, for example, $\Delta x(t) = \Delta x_r(d, 0) = (d \cos(0), d \sin(0))$. The system uses this algorithm to determine optimized (d, 0) to minimize an energy function as described hereinbelow.

The first energy term measures how close the actual direction is to the estimated direction δx(t), using equation (19) (described in greater detail hereinbelow). The second term $E_{dis}$ is determined and used to keep the virtual distance close to the real distance defined by equation (20), as described in greater detail hereinbelow. The last term $E_{map}$ (d,θ) is determined and used to match the mapping function f in Equation (1) using equation (21), also described in greater particularity hereinbelow.

Next in computing a dynamic reverse map in step 715 of FIG. 7A, the system determines x(t+1)=x(t)+Δx(t) to minimize $E_{rev}$ using relative weights.

Finally, the method of FIG. 7A ends at step 716, but may proceed to other example methods to render the virtual scene into the HMD as illustrated for example, in step 704 of FIG. 7. The rendering should possess sufficient quality and speed, and fit the appearance of the virtual scene into the confines and geometry of the real scene including balance between visual and motion fidelity.

As an example method, further described in greater detail hereinbelow, an orientation update process is also performed. In generating the final rendering for the wearable communication device or for example, an HMD, the system and method in an example embodiment, also computes the virtual camera orientation X(t) from the real camera orientation U(t), which is tracked by the HMD or the wearable communication device (i.e. other computing devices or processors can perform these respective functions and embodiments in which other devices perform these functions are contemplated herein as well). The system represents both orientations, virtual camera orientation X(t) and the real camera orientation U(t), using their respective Euler angles defined by equations (24), described in greater particularity hereinbelow. Additional optimization processes including application of optimized angle θ including equations (25)-(28), are performed in generating the final rendering to the HMD, as described in greater particularity hereinbelow.

Referring to FIG. 8, illustrated is an example result of the static mapping, the virtual world 800 is curled up or folded into the smaller real space world map 803, as such process of curling or folding is more particularly shown in FIGS. 9A-9G and FIGS. 11A and 11B. The circled obstacle 801, in real scene map 803, such as the table 801, is avoided. The track of the user path 805 as shown in virtual world map 800 is essentially contorted into corresponding physical world floor map 803, noting the corresponding user path is shown as 807, the interior obstacle 801 is avoided. The boundary perimeter 808 of the real world space map 803 including the room with corresponding walls is also shown. However, this is a partial solution to the problem of actually folding the entire virtual scene with user paths into the real world space map of the room 803.

Referring to FIGS. 7 and 7A, the steps of computing a static forward map ƒ, static mapping 700 and 711-714, comprises with greater particularity that the system surjectively map each virtual scene pixel $x=(x,y) \in S_v$ to a real scene point $u=(u, v) \in S_r$, where $S_v$ and $S_r$ represent 2D planar regions. Unlike most prior 2D planar mapping methods, the disclosed method does not require global bijectivity to allow proper folding of large virtual scenes into small real scenes. Instead, the disclosed virtual mapping system and method relies more on conformality and isometry in order to minimize angular and distal distortion during VR navigation.

Figure 9F:
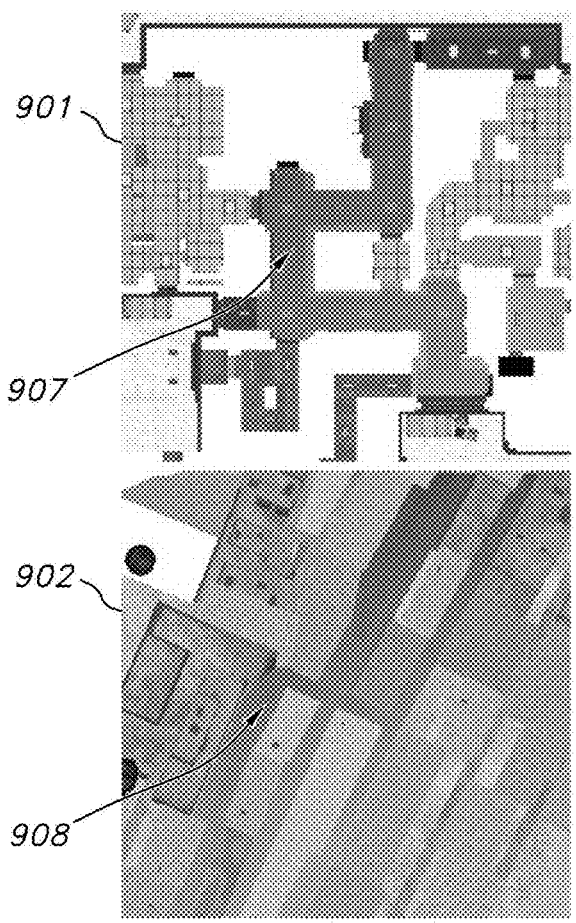
FIGS. 9F-9J, show example static forward mappings with different inputs to the system to map to various sized real scene maps. In particular
Figure 9G:
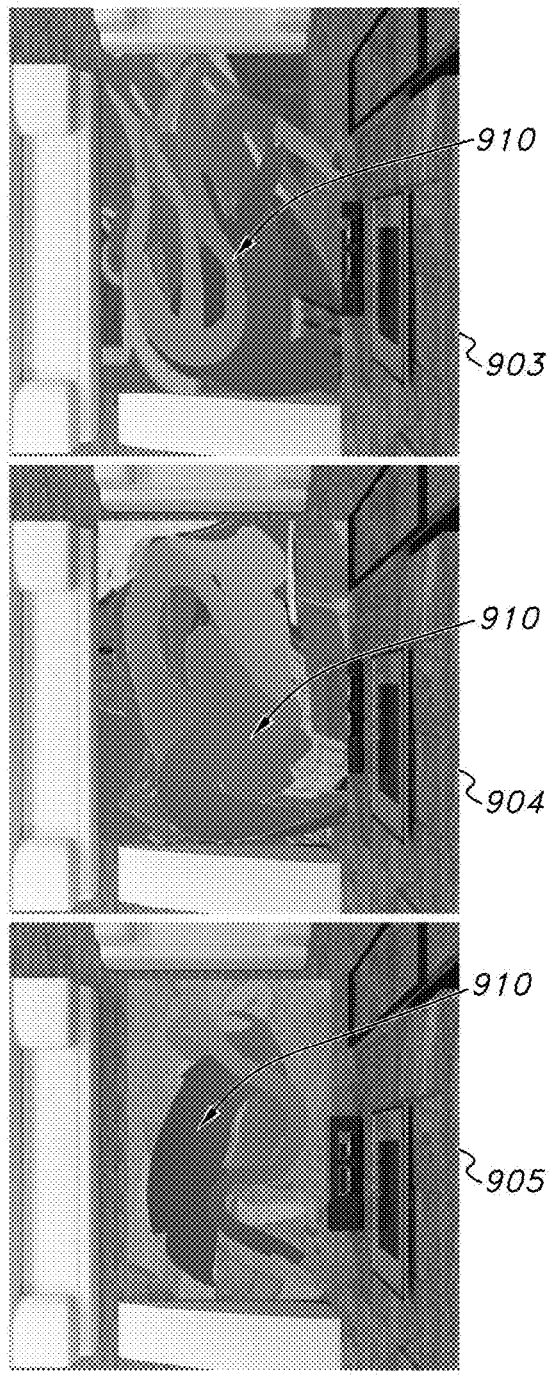
Figures 9H, 9I:
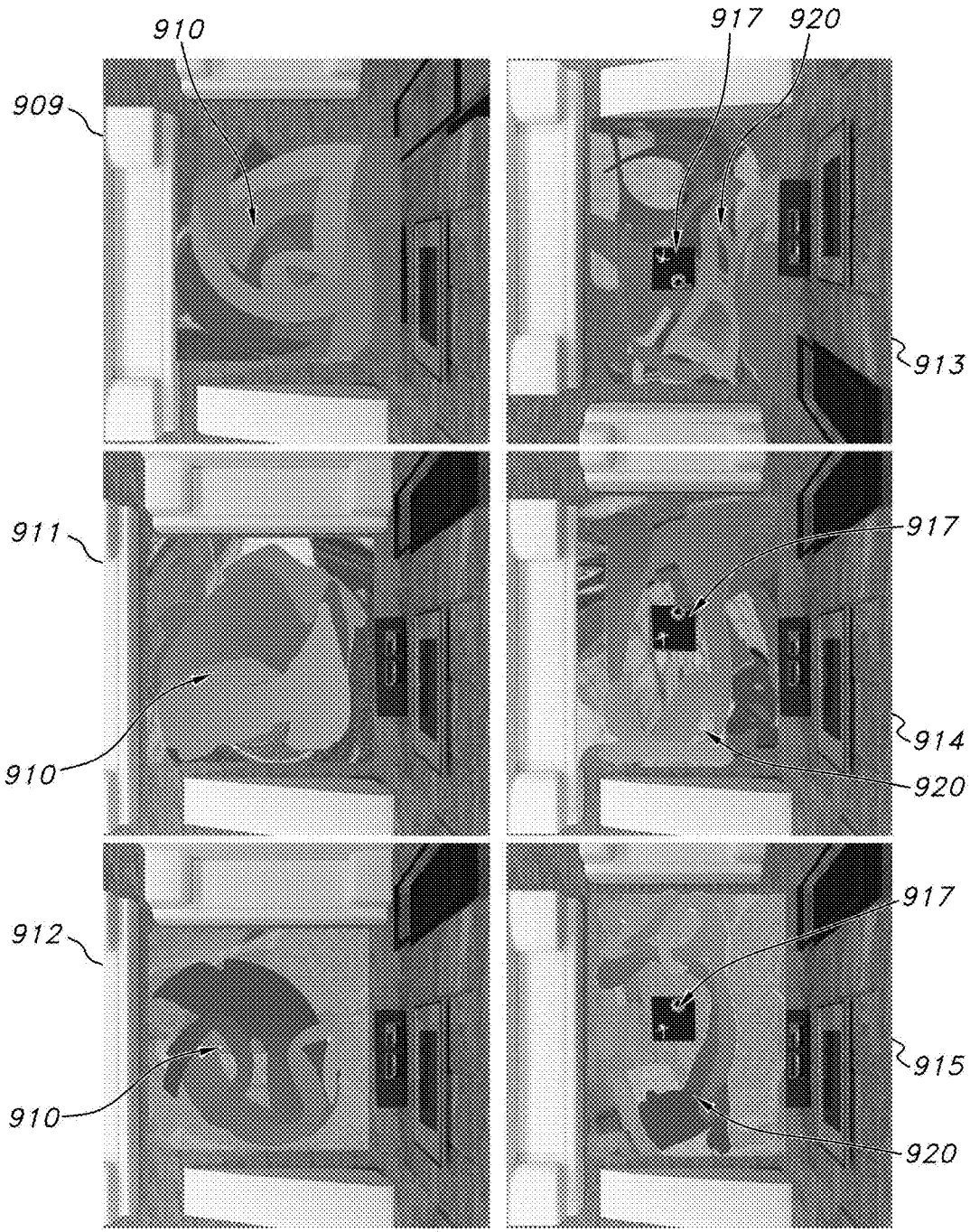

FIGS. 9A-9E illustrates an overview of enlarged FIGS. 9F-9J, in a side-by-side overview of FIGS. 9A-9E, showing example static forward mappings. In particular, FIGS. 9F-9J each show example static forward mappings with different virtual scene maps as inputs to the system and resulting in corresponding completely mapped real scene maps, including folded virtual scene floor maps folded within the real scene floor maps, which processes are described in greater particularity hereinbelow with respect to FIGS. 11A-15B. In particular, FIG. 9F illustrates three different virtual scene inputs 900, 901 and 902. The original input virtual scenes are overlaid with the user paths illustrated in each as paths 906, 907, and 908. FIG. 9G illustrates example real scene maps of 60×100 physical rooms shown as items 903, 904 and 907. FIG. 9H also illustrates example real scene maps of 70×70 physical rooms shown as items 909, 911 and 912. Also shown are the virtual paths 906, 907, and 908 of input virtual scene maps shown in FIG. 9F, that have each been contorted and folded, respectively, as shown in FIGS. 9G-9J, to fit into the space of the real scene maps shown for example, as 903, 904, 905, 909, 911 and 912 in FIGS. 9G and 9H. The contorted virtual paths are illustrated as item 910 in each of real scene maps 903, 904, 905, 909, 911 and 912 in FIGS. 9G and 9H. The contorted virtual paths 910 are each contorted or folded in accordance with an embodiment of the disclosed method, in order to fit into the physical space of the example, real scene space maps 903, 904, 905, 909, 911 and 912, respectively. It is noted that the obstacles are not yet accounted for by the system as the obstacles in FIGS. 9G and 9H are not accounted for in real scene maps 903, 904, 905, 909, 911 and 912, other than boundary wall obstacles.

Figure 9J:
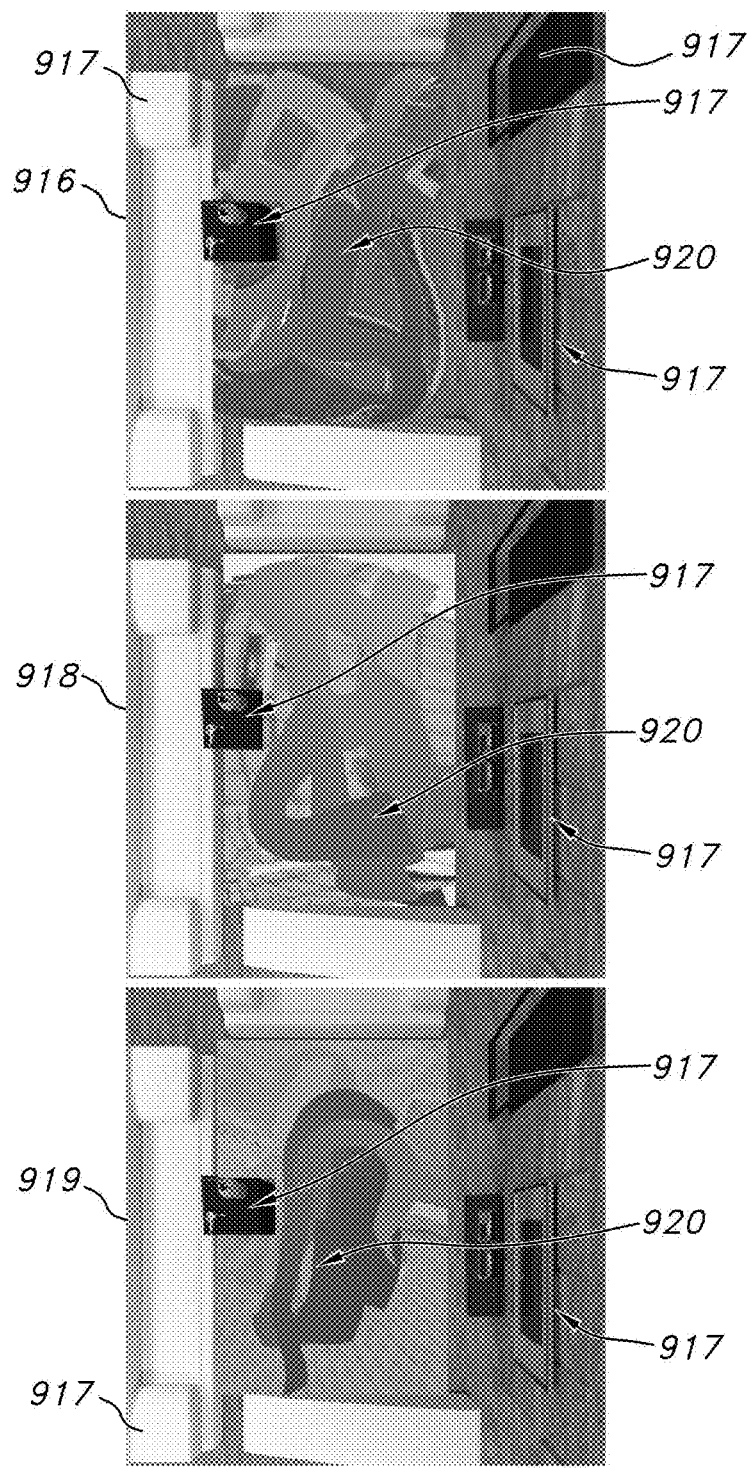

However, in FIGS. 9I and 9J, included are obstacles 917 and wall obstacles in each of FIGS. 9I and 9J, shown as square table obstacle 917 in each of real room scene maps 913, 914, 915, 916, 918 and 919, are the obstacles 917 within the boundaries of each real scene map FIGS. 9I and 9J, items 913, 914, 915, 916, 918 and 919. The contorted virtual paths that were folded into real scene maps are shown as item 920 in each of real scene maps 913, 914, 915, 916, 918 and 919. The mapping to real scene spaces with interior obstacles include obstacles 917 that are either within and/or adjacent the boundaries (example, the walls or adjacent the walls) of the real scene maps 913, 914, 915, 916, 918 and 919. The contorted virtual paths as mapped to the real scene maps while fitting into and within the constraints of the respective boundaries of maps 913, 914, 915, 916, 918 and 919, also avoid any corresponding points and/or boundary perimeter information of the obstacles 917 (in accordance with FIGS. 5 and 5A). The contorted virtual paths 920 essentially are folded and contorted to fit into open space or free space areas of the real scene maps 913, 914, 915, 916, 918 and 919, in avoidance of any conflicting space occupied by the obstacles 917.

In accordance with an embodiment of the disclosed system and method for producing static forward mapping, virtual scene maps overlaid with user paths are provided as inputs to the system. Both the virtual $S_v$ and real $S_r$ scenes are represented by planar 2D regions bounded by their external and internal boundaries (for domain shapes and obstacle regions, respectively). For computational purposes, both virtual and real scene space maps are represented as polygonal shapes, as shown for example in FIGS. 9A-9E. In certain embodiments, those polygons can be extracted as convex/non-convex hulls from scanned data or design figures.

Figure 10:
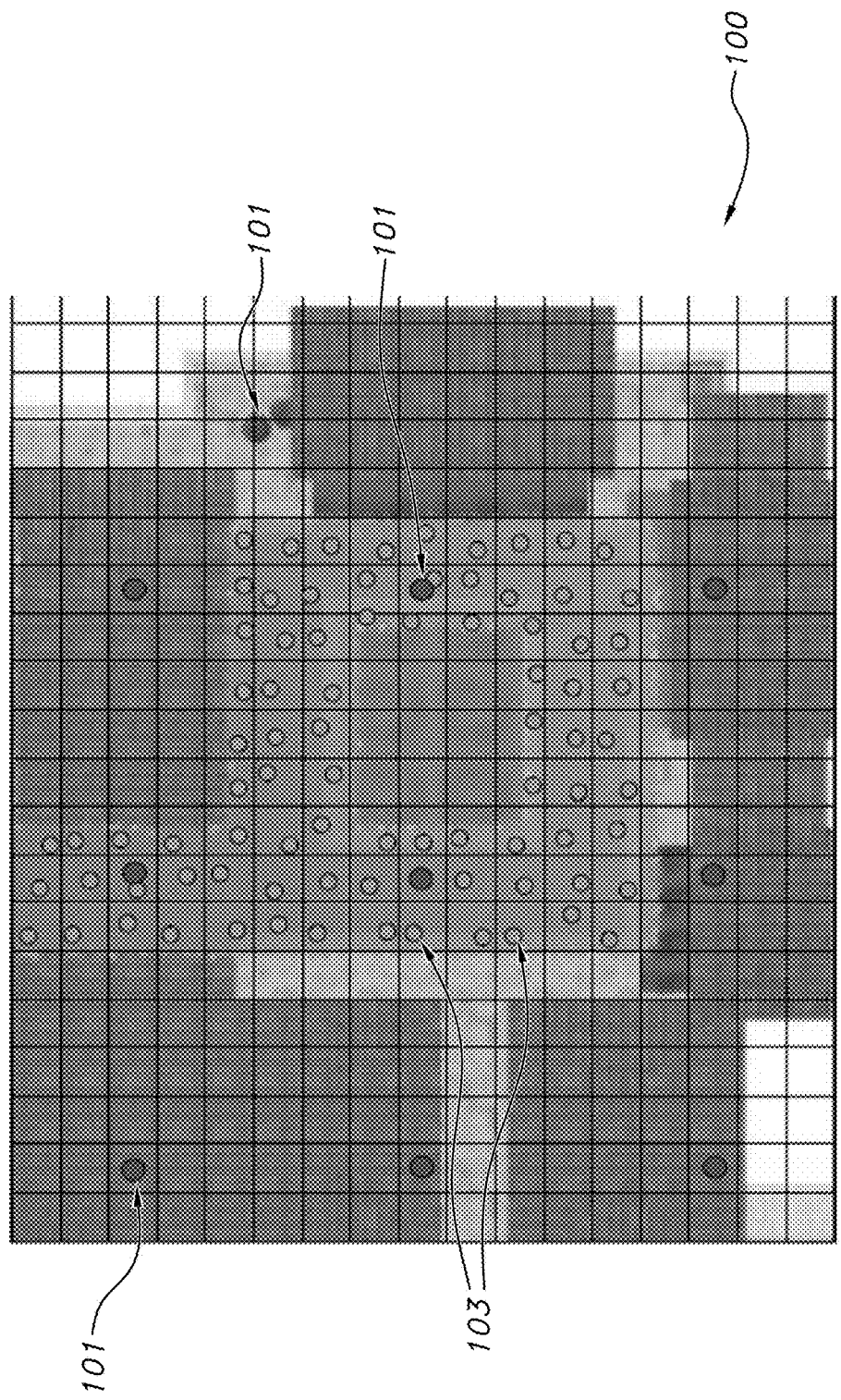
FIG. 10 illustrates an example of stratified sampling implemented for a sample scene floor plan in generating the representation forward map $f$, in accordance with an embodiment of the disclosed system and method.

Referring to FIG. 10, shown is an example method of stratified sampling implemented for at least a portion of a sample scene floor plan in creating the representation as a static forward map f from $S_v$ to $S_r$, in which an overview of static forward mapping was provided as described in connection with FIGS. 7 and 7A.

Similar to prior meshless warping and planar mapping methods [Poranne and Lipman 2014; Chen and Weber 2015], the disclosed method of static forward mapping f also adopts a basis-function form to facilitate an analytical computation of Jacobians and Hessians using:

Equation (1) defined as:

$$(u(x, y), v(x, y)) = u = f(x) = \sum_{i=1}^{p} c_i b_i(x) + Tx, \quad (1)$$

where $\{b_i\}$ are basis functions with weights $\{c_i\}$, and T is an affine transformation matrix. Gaussians are used for b, i.e., referring to Equation (2) which is defined as:

$$b_i(x) = e^{-\frac{1\|x-x_i\|^2}{2s^2}}, \quad (2)$$

where $x_i$ is the i-th basis center (refer to darker points 101 as shown in FIG. 10) and x is a sample point in $S_v$ (refer to lighter points 103 as shown in FIG. 10). In certain examples, stratified sampling is implemented in the disclosed system with each stratum containing 0.025% pixels over $S_v$ and set s as 5× the average sample distance.

The general goal is to find proper $c=\{c_i\}$ and T so that the mapping f is as globally conformal and locally isometric as possible. In general, $S_v$ (virtual scene map) is larger than $S_r$ (real scene map). However, there are scenarios in which the $S_v$ (virtual scene map) is smaller than (real scene map).

In order to allow folding $S_v$ (virtual scene map) into $S_r$ (real scene map), f (static forward mapping) should be surjective, but not necessarily bijective which is the goal generally of most planar mapping methods. Such folding will also prevent f from being globally-isometric. Thus, the ideal mapping is targeted as globally conformal but locally isometric, via a collection of objectives and constraints as described in greater detail hereinbelow.

Figure 11B:
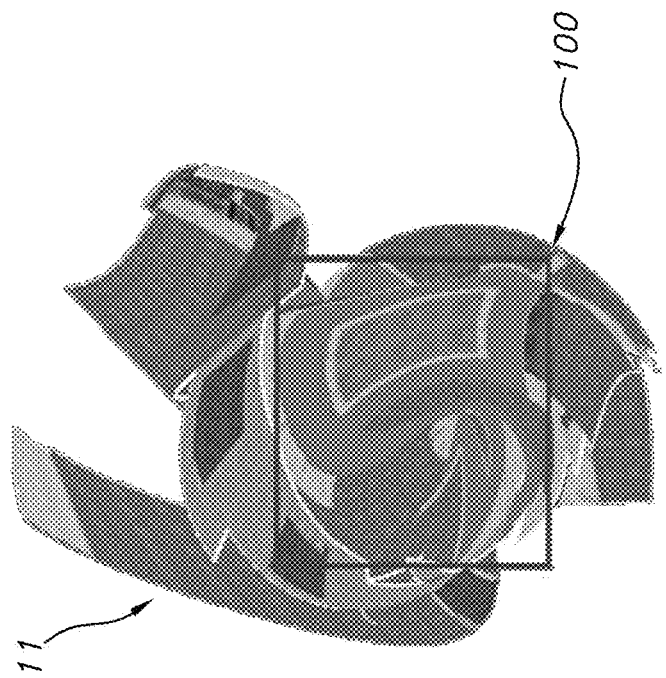
FIGS. 11A-11E illustrate example virtual floor planar maps when folded or contorted, in order to fit within the constraints of the sample real scene map, in accordance with an embodiment of the disclosed system and method.
Figure 11A:
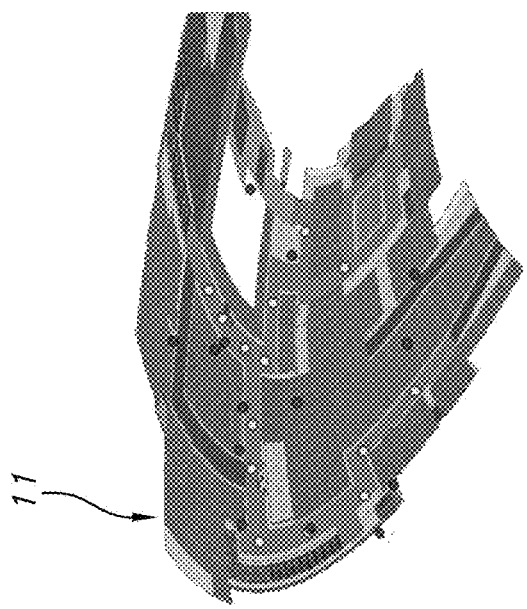

Referring to FIGS. 11A and 11B, are shown example virtual maps being folded or contorted in order to fit within the constraints (for example, boundaries, obstacles and other physical space limitations) of the given real scene map 803. The rectangle 100 illustrated in FIG. 11B includes the contorted or folded virtual floor plan 11 and rectangle 100 indicates the boundaries or fullest extent of the example physical real space.

Figure 11E:
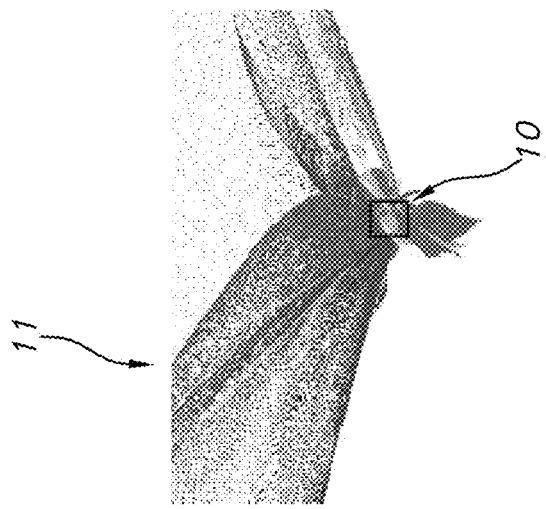
Figure 11D:
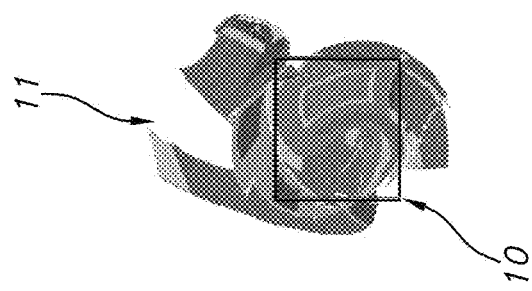
Figure 11C:
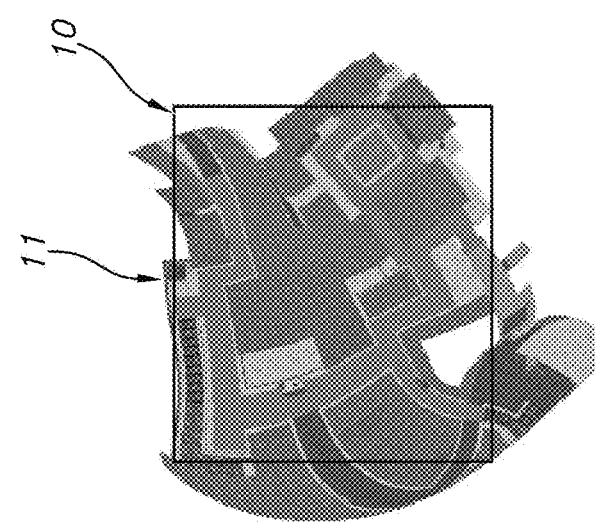

FIGS. 11C-11E illustrate additional examples of the virtual reality mapping method step of folding the virtualized floor plan map into the free space areas or available boundaries of the physical floor plan map. Differences in size and shape between the virtual spaces, can render different results as shown in FIGS. 11C-11E. Although the static forward mapping system and method can estimate a constraint satisfying a solution for any given pair of virtual and real spaces, the quality of the real scene map generally depends on the shape and size differences between the virtual and real space maps. When the sizes between virtual and physical maps differ substantially, the mapped virtual space may be strongly distorted, reducing both visual and locomotion fidelity to the users. On the other hand, similar virtual and physical worlds can certainly improve the output quality of the disclosed system.

FIG. 11C is an example in which the virtualized space map 11 is generally considered small and mostly fits within the boundaries 10 of the physical scene map. FIG. 11D is an example in which the virtualized space map 11 is considered to be medium relative to the size of the physical boundaries 10 and requires more contortion or folding to be fit into the physical map boundaries 10 than FIG. 11C. FIG. 11E is an example in which a large virtualized space 11 requires more significant curling or folding to be fitted within the free space and/or boundaries of the physical space map and therefore, has some reduction in quality. Typically, very large open virtual spaces cannot be folded into a small real space without being noticed by the users. However, the disclosed system and method implements various processes that can minimize such distortions for large virtualized space maps, as described in greater detail hereinbelow.

Conformal Objective—

As 2D mappings satisfy the Cauchy-Riemann function when it preserves angles [L'evy et al. 2002; Chen and Weber 2015], the disclosed system and method define the conformal objective as:

Equation (3) is defined as:

$$E_{conf}(c) = \max_x \left( \left( \frac{\partial u}{\partial x} - \frac{\partial v}{\partial y} \right)^2 + \left( \frac{\partial u}{\partial y} - \frac{\partial v}{\partial x} \right)^2 \right). \quad (3)$$

This energy is then minimized (i.e., a minimax formulation) to maintain smooth energy distribution without extra regularization.

Distance Constraint—

Unlike a global isometric mapping which requires $$\frac{\partial u}{\partial x} = \frac{\partial v}{\partial y} = 1,$$

the disclosed method of mapping generally requires that it be locally isometric, which requires its Jacobians J to satisfy $J^T J = 1$, i.e., as indicated in equation (4) below:

Equation (4) is defined as:

$$\left( \frac{\partial u}{\partial x} \right)^2 + \left( \frac{\partial v}{\partial x} \right)^2 = 1 \quad (4)$$

-continued $$\left( \frac{\partial u}{\partial y} \right)^2 + \left( \frac{\partial v}{\partial y} \right)^2 = 1$$

$$\frac{\partial u}{\partial x} \frac{\partial u}{\partial y} + \frac{\partial v}{\partial x} \frac{\partial v}{\partial y} = 0.$$

Since local isometry maps geodesics (a locally length-minimizing curve) to geodesics [Gray 1996], it suffices as a working method for VR locomotion. Note that minimizing $E_{conf}$ in Equation (3) as indicated hereinabove, also addresses the last term in Equation (4), so the focus is generally on the first two terms.

Analogous to feature-aware texturing [Gal et al. 2006], different virtual regions may need different amounts of distance preservation in VR applications. For example, distances near region boundaries should be more strictly preserved as the users can examine the virtual walls close by, than when the users are in the middle of a large empty physical space.

Due to this practical consideration, instead of placing the first two terms in Equation (4) as objective functions, in accordance with an embodiment, the disclosed system and method treats the equations as bounded constraints for more flexible control as indicated in the equation hereinbelow with Equation (5) is defined as:

$$\alpha(x) < \left( \frac{\partial u}{\partial x} \right)^2 + \left( \frac{\partial v}{\partial x} \right)^2 < \beta(x) \quad (5)$$

$$\alpha(x) < \left( \frac{\partial u}{\partial y} \right)^2 + \left( \frac{\partial v}{\partial y} \right)^2 < \beta(x),$$

where $\alpha \in [0, 1]$ and $\beta \in [1, +\infty)$ are stretching ranges for each virtual scene point x. When both $\alpha$ and $\beta$ equal to 1, the mapping is strictly locally isometric. However, for improved conformality, the isometry is designated into a range: the lower/higher the $\alpha/\beta$ value is, the more shrinking/stretching is thereby possible. There are at least three methods to set those parameters: constant values, user specification, or automatically computed via RANSAC line detection over $S_v$.

Referring to FIGS. 5 and 5A, an embodiment of the virtual reality mapping system, in particular the Gaussian barrier process by which a boundary of an obstacle within the physical space that the user navigates within, is determined and delineated by the disclosed system and method, as described in greater particularity below.

Exterior Boundary Constraint—

In order to maintain all u inside the real space map $S_r$, the polygonal convex hull of $S_r$ is constructed as a set of straight line functions $\{B_i\}$, and a series of linear constraints are added using:

Equation (6) defined as:

$$(B_i u)^T (B_i C_r) > 0, \quad (6)$$

where $C_r$ is the center of the physical space. Generally u and $C_r$ are maintained on the same side of each $B_i$ for testing point inclusion.

Interior Obstacle Barrier—

In accordance with an embodiment of the disclosed method, creating interior obstacle barriers on the real scene map prevents users from hitting interior obstacles and can be formulated as the opposite of the point inclusion test in Equation (6), as described hereinabove. However, such formulation will require the calculation of directed areas or angles and solving a large quadratic instead of linear constraint system. For faster computation, a 2D Gaussian based barrier function (508) can be used for each interior object (501). A minimal-covering 2D ellipse area $E(u_c, E_w, E_h, \theta_c)$, is fitted for each object or obstacle (501) determined by the system in the real scene map, where $u_c$ is the center, $E_w$ and $E_h$ are width and height, $\theta_c$ is the rotation angle. Based on the scale of the ellipse, a Gaussian-based barrier is defined using:

Equation (7) defined as:

$$E_b(E(u_c, E_w, E_h, \theta_c), u) = \exp\left(\frac{-1}{2\sigma^2}\left(\frac{u'^2}{E_w^2} + \frac{v'^2}{E_h^2}\right)\right), \quad (7)$$

Equation (8) is defined as:

$$u' = \left(u\begin{bmatrix} \cos\theta_c & \sin\theta_c \\ -\sin\theta_c & \cos\theta_c \end{bmatrix} - u_c\right). \quad (8)$$

In an example method, $G^2=0.2$.

It is noted that FIGS. 5 and 5A illustrate the energy distribution of the obstacle barrier applied by equation (7), over a reconstructed real indoor scene. The higher energies are present in obstacle areas as indicated by the lighter shades of grey in the center of each obstacle 501, shown in the example as an ellipse with a lighter center area.

Referring to FIGS. 12A-12C, illustrated are example virtual scene maps and their respective bijection characteristics, in accordance with an embodiment of the disclosed system and method. Without local bijection, local fold-over in the static mapping step may block the whole path with having a wall, for example as shown in area 12 in FIG. 12A. The view is obstructed due to a wall being present and lack of local bijection. FIG. 12B introduces local bijection. By adding the local bijection constraint, the artifact is prevented from appearing in the user's HMD rendering of the virtualized scene, shown in FIG. 12B. More particularly, as shown in FIG. 12A, an entire pathway 14, now visible in FIG. 12B, was originally obstructed, and now the wall 13 appears as shown in FIG. 12B with an entire pathway 14 available for the user to navigate freely, and now open, when previously blocked in FIG. 12A. FIG. 12C illustrates the original virtual scene for comparison purposes with the local bijection scene as shown in FIG. 12B.

The result of introduction of local bijectivity into the virtualized map in order to avoid artifacts is illustrated hereinabove with respect to FIGS. 12A-12C. This further embodiment of the process of creating a static mapping, the process of folding the virtualized map into the real scene map, and the process of applying Gaussian barriers to physical constraints 403 within the physical room or environment 301, is further described hereinbelow in greater detail and such local bijection method is used in order to prevent artifacts upon folding Sv into Sr.

Local Bijectivity—

In accordance with an embodiment of the disclosed virtual reality mapping system and method, included is the process of static mapping f, which permits global surjectivity to fold large virtual map, $S_v$ into a sample, small real scene map, $S_r$. However, a local fold-over may produce visible artifacts, as described and exemplified in FIG. 12A. In order to prevent such fold-overs of artifacts, a local bijectivity control feature is added to the static mapping, in accordance with an example embodiment as described below.

In accordance with a known method [Schuller et al. 2013], a mapping at a given point $x \in S_v$ is locally bijective (i.e., no fold-overs) when it satisfies Equation (9) which is defined as:

$$\det(J_u(x)) > 0. \quad (9)$$

Directly applying this constraint to all points in $S_v$ can be computationally expensive and impractical. More efficient barrier functions and optimizers [Schuller et al. 2013] require sparse objective functions, whereas the objective function in accordance with the disclosed system and method is dense. The method in [Poranne and Lipman 2014] can express Equation (9) as eigenvalues over all points, but such constraints cannot improve performance with respect to persistent non-convex quadratic constraint problem apparent with such known methods.

In order to address these performance issues, disclosed is an embodiment in which local bijective constraints are added in a coarse-to-fine process. In accordance with such disclosed method, initially $S_v$ (virtual map) is partitioned into a collection of cells as also shown and described hereinabove with respect to FIG. 10. Next during the optimization phase, the following constraints are added to each sample point $x \in S_v$ in which:

Equation (10) is applied, respectively and defined as:

$$\det(J_u(x)) = \frac{\partial x}{\partial u}\frac{\partial y}{\partial v} - \frac{\partial x}{\partial v}\frac{\partial y}{\partial u} > 0. \quad (10)$$

Referring to FIG. 13, illustrated is a local bijection sampling process. As already shown with respect to FIG. 10, the virtual map $S_v$ is partitioned into a collection of cells as also shown in cells 15 of FIG. 13. When any fold-over is detected by the system for example, as shown for example, in the shaded portion 18 of the original collection of sampled cells 15, the optimization process described hereinabove, is restarted, in which the constraints of equation (10) are added to each sampled point $x \in S_v$. Next the distance constraints are then relaxed as illustrated in the folding area 17 of FIG. 13, and as further described in greater detail hereinbelow for example, with respect to FIGS. 15A and 15B.

After the step of convergence, if the system further detects any fold-over inside any remaining cells 18 of FIG. 13, and/or in certain embodiments, if the system detects any fold-over in remaining cells 19 of FIG. 13 in foldover portion 17 (which originates from shaded area 18), all such cells are then iteratively split into four smaller ones. Next the system adds one more sample for each. All cells are then split instead of only those in the fold-overs 18 for faster convergence. Specifically, up-sampling only the fold-over areas 18 tends to push fold-overs to other areas with original sampling, which will require even more optimization rounds to correct than undergoing the process of up-sampling all cells 15 as illustrated in FIG. 13. As compared to active-set methods used in [Poranne and Lipman 2014], this coarse-to-fine process is a more stable solution for a non-convex problem.

Figure 13A:
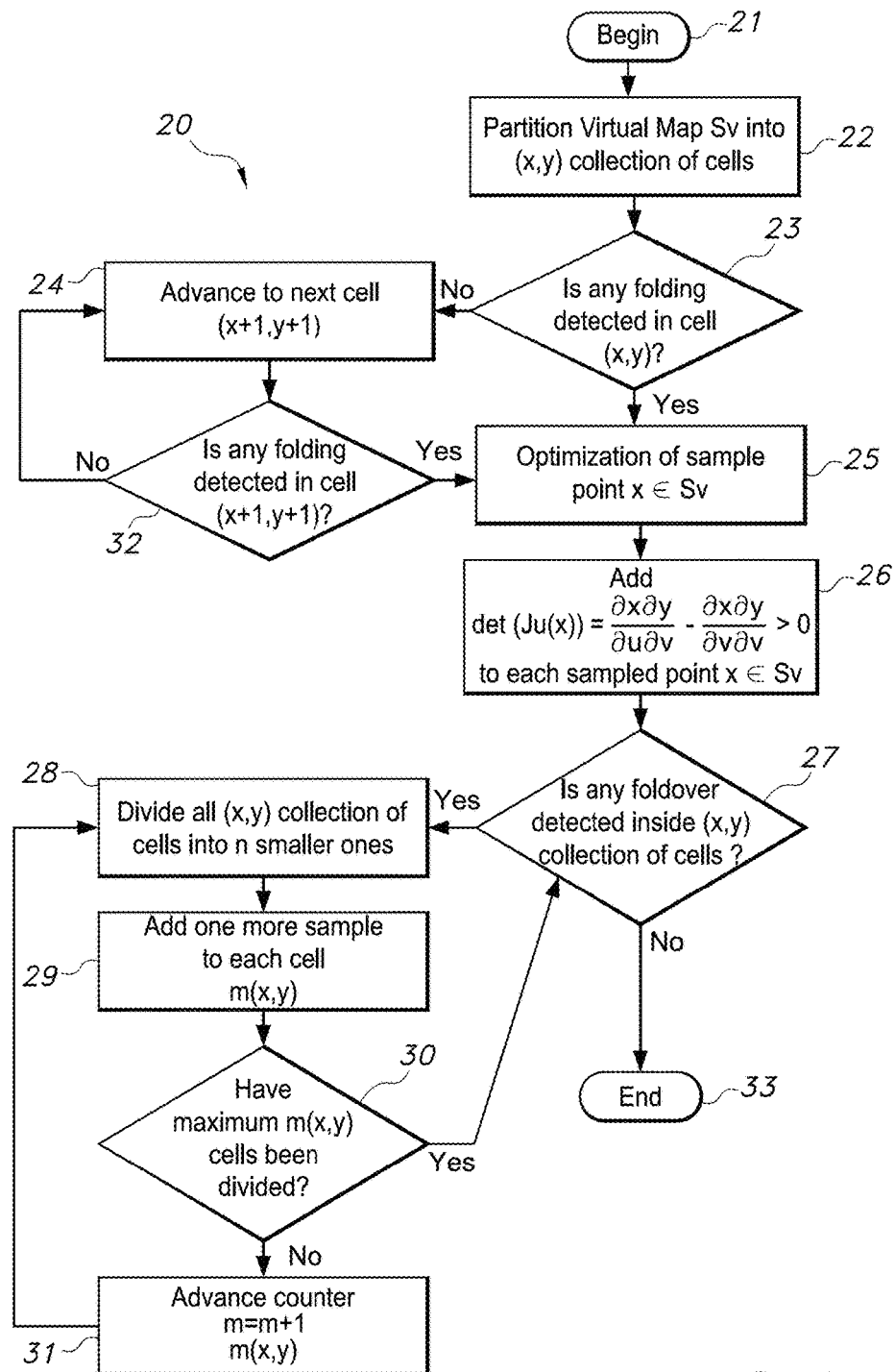
FIG. 13A is an example flowchart of the local bijection sampling process of the virtual map $S_v$.

In accordance with an example method, illustrated in FIG. 13A is an example flowchart or method 20 of the local bijection sampling process of the virtual map $S_v$, in particular the method of addressing various performance issues that arise during application of local bijectivity in the static forward mapping to $f$ process.

The example method begins at step 21 of FIG. 13A. By way of background for this example method, included in the process of static mapping f, is permitting global surjectivity to fold large virtual map, $S_v$ into a sample, small real scene map, $S_r$. However, a local fold-over may produce visible artifacts, as described and exemplified in FIG. 12A. In order to prevent such fold-overs of artifacts, a local bijectivity control feature is added to the static mapping, in accordance with an example embodiment as described below.

Directly applying this constraint to all points in $S_v$ can be computationally expensive and impractical. More efficient barrier functions and optimizers [Schuller et al. 2013] require sparse objective functions, whereas the objective function in accordance with the disclosed system and method is dense. The method in [Poranne and Lipman 2014] can express Equation (9) as eigenvalues over all points, but such constraints cannot improve performance with respect to persistent non-convex quadratic constraint problem apparent with such known methods.

In order to address these various performance issues, illustrated in FIG. 13A, is an embodiment of a local bijection sampling process in which local bijective constraints are added in a coarse-to-fine optimization process. In accordance with such disclosed method 20, initially $S_v$ (virtual map) is partitioned into a collection of cells in step 22 of FIG. 13A (as also shown and described hereinabove with respect to FIGS. 10 and 13).

The system next detects in step 23, whether there exists any folding, as shown for example, in the shaded portion 18 of the original collection of sampled cells 15, in FIG. 13. If so the example method proceeds to step 25 to perform optimization of sample point x. If not, the system advances to the next cell (x+1, y+1) in step 24. The example method next proceeds in step 32 to detect if there is any folding detected in next cell (x+1, y+1), by advancing the cell (x,y) by 1 cell (for example by (x+1, y+1)). If no folding is detected in step 32, the method advances to the next cell in step 24. Once folding is detected in the cell (x+1, y+1) in step 32, the system next will proceed to step 25 to perform optimization of the pertinent sample point $x \in S_v$.

Next during optimization the example method proceeds to step 26 in which the following constraints are added to each sample point $x \in S_v$ in which:

Equation (10) is applied, respectively to each sampled point $x \in S_v$:

$$\det(J_u(x)) = \frac{\partial x}{\partial u}\frac{\partial y}{\partial v} - \frac{\partial x}{\partial v}\frac{\partial y}{\partial u} > 0. \quad (10)$$

After the step of optimization 26, the system proceeds to determine if any fold-over remains inside (x,y) collection of cells at step 27. If not, the example method ends at step 33. However, if any further foldover is detected in any remaining (x,y) cells, the system will divide (x,y) cells in step 28 iteratively into n smaller ones, for example n=4. The method will next proceed to add one more sample to each (x,y) collection of cells in step 29. Step 29 in certain example embodiments is similar to step 26, in that it adds constraint to each sample point $x \in S_v$, in accordance with step 26 and equation (10).

Next the method will determine if maximum m (x,y) cells have been divided in step 30. If not, the method 20 proceeds to step 31 to advance counter m=m+1. The method will next proceed back to step 28 to further divide all remaining (x,y) collection of cells into n smaller ones. The method will next add one more sample to each cell in step 29. Once all cells have been divided, the method proceeds to step 27 to determine if any foldover is detected inside (x,y) collection of further divided cells. If not, the system ends the method at step 33. If any foldover is indeed detected, the system will next further divide all (x,y) collection of cells into n smaller ones in step 28. The method will next add one more sample to each (x,y) collection of cells at step 29. Next the method will iteratively continue to test if any foldover is detected inside (x,y) collection of cells. Once no foldover is detected inside (x,y) collection of n divided (x,y) cells in step 27, at which point, the method of FIG. 13A will proceed to end at step 33.

It is noted that once the system adds one more sample for each in step 29, all cells are then split or divided instead of only those in the fold-overs 18 for faster convergence. Specifically, up-sampling only the fold-over areas 18 tends to push fold-overs to other areas with original sampling, which will require even more optimization rounds to correct than undergoing the process of up-sampling all cells 15 as illustrated FIG. 13. As compared to active-set methods used in [Poranne and Lipman 2014], this coarse-to-fine process is a more stable solution for a non-convex problem.

In certain embodiments, the optimization step 25 as described hereinabove with respect to same step 25, is restarted, in which the constraints of equation (10) are added to each sampled point $x \in S_v$. Next the distance constraints are then relaxed as illustrated in the folding area 17 of FIG. 13, and as further described in greater detail hereinbelow for example, with respect to FIGS. 15A and 15B.

Relaxed Distance Constraint—

In order to further facilitate the disclosed method of adding a local bijectivity control, the distance constraints in Equation (5) as described hereinabove, are relaxed in another example embodiment, in order to facilitate stretching of the sample areas rather than folding. As an example, to further illustrate this further processing, in an example virtual domain that is a plastic floor plan sheet that can be bent or folded, but never cut. In such case, bending or folding the floor plan sheet will cause point-wise stretching whereas, folding will not. Thus, in order to facilitate bending over folding, an extra point set L is maintained from those samples located in a folding area, for example, the shaded points (19) illustrated in FIG. 13. The upper limit of Equation (5) is increased for all points in L to facilitate and generate stretching in accordance with:

Equation (11) defined as:

$$\left(\frac{\partial x}{\partial u}\right)^2 + \left(\frac{\partial y}{\partial u}\right)^2 < \beta(x) \rightarrow \left(\frac{\partial x}{\partial u}\right)^2 + \left(\frac{\partial y}{\partial u}\right)^2 < \lambda\beta(x) \quad (11)$$

$$\left(\frac{\partial x}{\partial v}\right)^2 + \left(\frac{\partial y}{\partial v}\right)^2 < \beta(x) \rightarrow \left(\frac{\partial x}{\partial v}\right)^2 + \left(\frac{\partial y}{\partial v}\right)^2 < \lambda\beta(x).$$

An example value for wavelength $\lambda$ is set to $\lambda=1.2$.

Final Static Mapping—

The local isometric requirement in Equation (5) defined hereinabove, renders the terms quadratic, and thus cannot be directly solved via the SOCP methods as in [Poranne and Lipman 2014; Chen and Weber 2015]. With the combined conformal objective and various constraints and requirements, the problem becomes a quadratically constrained quadratic programming (QCQP) in a min max format. However, due to the dual-bounded constraints Equations (4) and (5), the constraints are not convex and thus not suitable for QCQP solvers.

In order to address this large, dense, and non-linear optimization problem in accordance with an embodiment of the system and method for mapping virtual and physical reality, an interior-point method is applied [Bonnans et al. 2006]. In order to match the solver format, the conformal objective Equation (3) is rewritten as follows:

Equation (12) is defined as:

$$\min z, \text{ s.t. } \left(\frac{\partial u}{\partial x} - \frac{\partial v}{\partial y}\right)^2 + \left(\frac{\partial u}{\partial y} + \frac{\partial v}{\partial x}\right)^2 < z. \quad (12)$$

Combining the same constraints and Gaussian barriers as described hereinabove, the final static mapping problem is solved by application of an interior-point method as follows with:

Equation (13) is defined as:

$$\min z + w_o E_b(E,u), \quad (13)$$

wherein, $w_o$ is the weight for obstacle barrier function, which as an example, is set to 600. Next, $\{c_i\}$ and T are initialized in Equation (1) as zeros, and an identity matrix in order to satisfy Equations (5), (6) and (10) to (12), as described hereinabove.

Figure 14B:
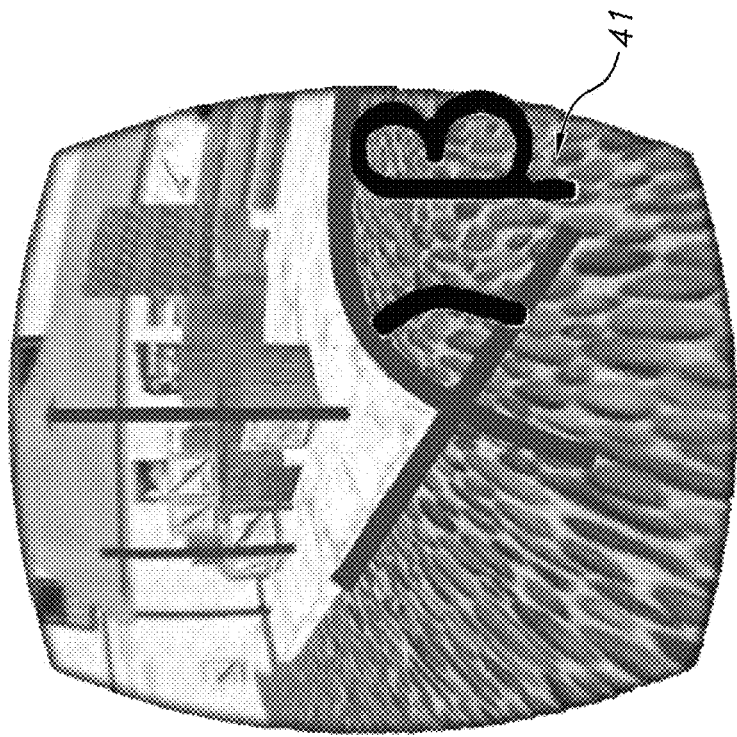
FIGS. 14A and 14B illustrate an example angle preserving method applied to the virtualized and optimized virtual maps.
Figure 14A:
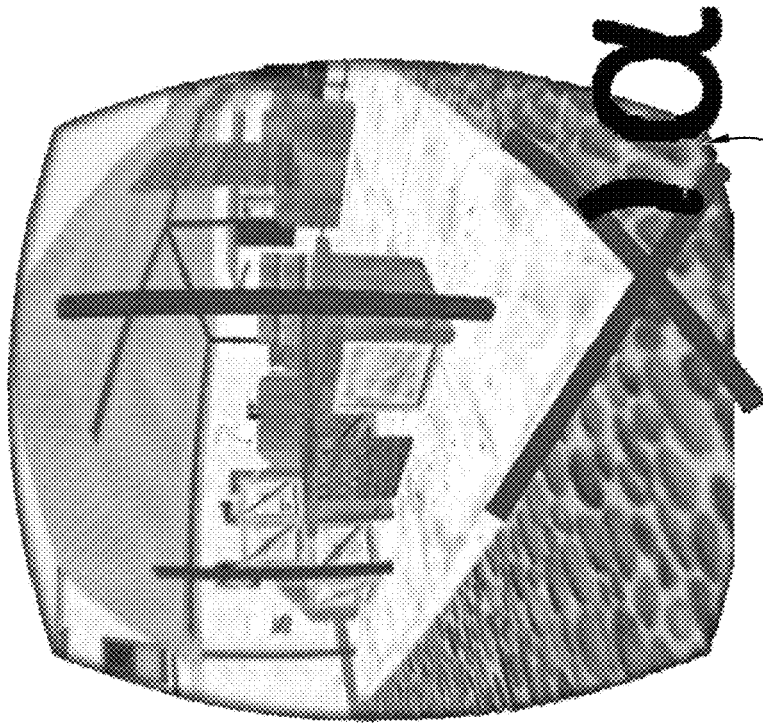

There are additional methods in accordance with the disclosed system and method, in order to minimize shape distortion in the virtualized maps. Common geometry features such as for example, angles and distances in the virtualized map and optimized virtualized map, are further refined. As an example, shown in FIGS. 14A and 14B, is an example of an angle preserving method. The maximum angular change is corrected in the final rendered view. An angle preserving equation is applied as follows to the virtualized and real scene maps:

$$E = \max(I\alpha - \beta) \quad (14a)$$

Shown in FIG. 14A is the angle α, as reference 40 and angle β in FIG. 14B, is shown as reference 41. This process permits the refinement for expressing shapes by removing angular distortions.

Figure 15B:
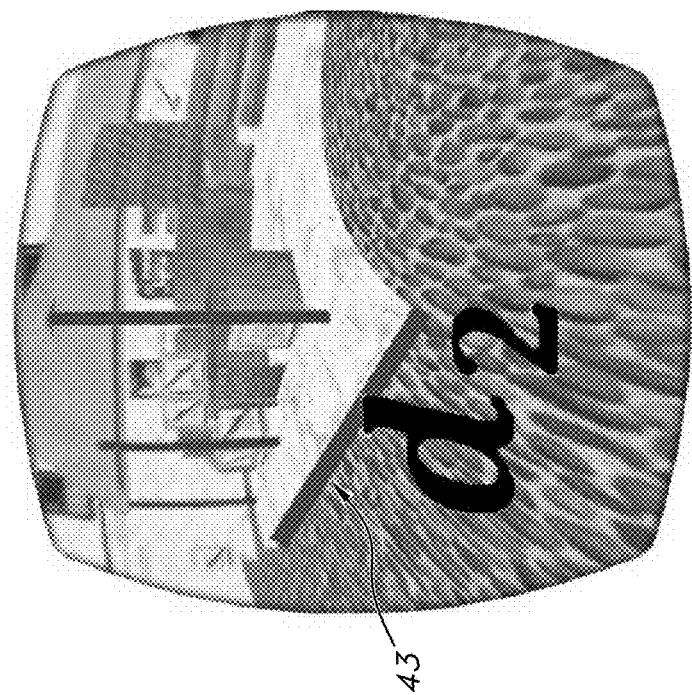
FIGS. 15A and 15B, illustrate an example method to minimize shape distortion in the final map using a local distance preserving method applied to virtualized and optimized virtual maps.
Figure 15A:
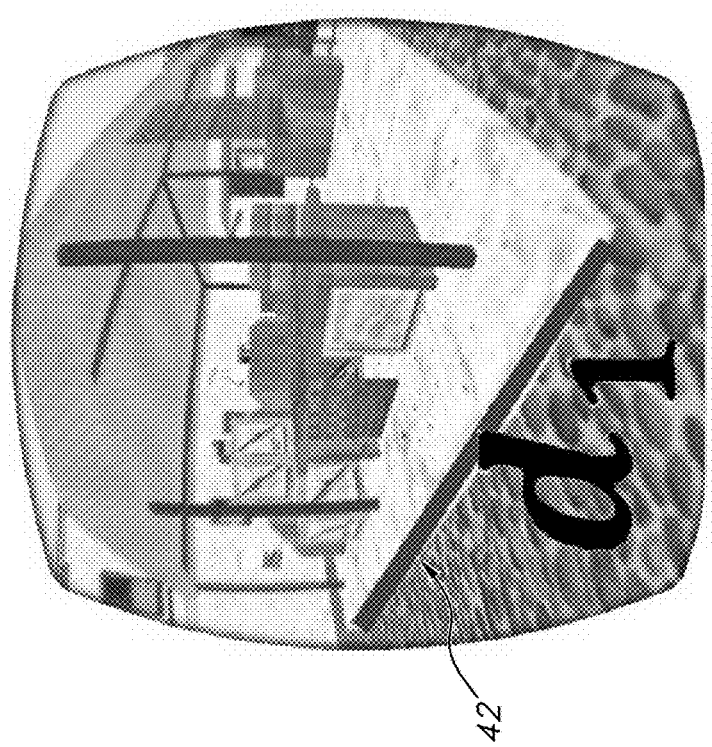

Referring to FIGS. 15A and 15B, illustrated is an example method to minimize shape distortion in the final rendered map. Shown in FIGS. 15A and 15B, is a local distance preserving method with application of an equation as follows:

$$l_1 < d_1 - d_2 \quad (14b)$$

In FIG. 15A, $d_1$ is illustrated as the distance shown as item 42. In FIG. 15B, d2 is illustrated as the distance shown as item 43. The virtual world positions are defined and determine by the respective mapping. In order to render the walking experience immersive and consistent, the local distance should not vary too much relative to the virtual distance. In order to keep the distance change within a tolerance level, the local distance preserving method is applied to such variations in distances.

FIGS. 16A and 16B illustrate an example method to minimize shape distortion in the final map using a geometric preserving visualization method applied to virtualized and real scene maps. The checkerboard texture demonstrates visually the shape changes between both virtualized and optimized virtualized maps, shown in FIGS. 16A and 16B. In both figures, the angles are preserved using the angle preserving method as described in FIGS. 14A and 14B. In addition, a distance preserving method is also applied as described hereinabove in FIGS. 15A and 15B.

Geometric properties are further refined for comfortable locomotion, accurate and enhanced visual experience. Furthermore, such geometric properties are also enhanced to increase a user's safety during navigation within the constraints of the physical environment and any obstacles contained therein, while experiencing the virtualized environment visually.

In accordance with an embodiment of the disclosed system and method of mapping to optimize and enhance the user's virtual reality experience, disclosed is the application of an example dynamic inverse method.

The static map as described at least in FIGS. 7 and 7A, implements the method that forwards positions the maps, from the virtual world $S_v$ to the real world $S_r$. However, for VR walkthroughs, an additional method of reverse mapping is applied, specifically to reverse map, from the current user position in $S_r$ to $S_v$. This reverse map contends with the forward map that is not bijective. There are other solutions but, the following illustrates one embodiment of correcting a forward static map that is not bijective.

The system next updates the positions of the user in the virtual world based on the tracking of their physical actions vis-à-vis, their determined (x,y) positions in time t. The system is required to continuously determine update the user's positions in time in the physical world, and then the corresponding virtual position. This process requires the reverse mapping from the user's actual real position. This reverse mapping projects back to the virtual world after having determined the static forward map which essentially folds or curls the virtual world scene into the real world plan using the static functions described hereinabove. A strict reverse mapping does not accomplish the end result ideally since f is transcendental while surjective, so the reverse analytical mapping is imperfect. However, the example embodiment updates the virtual position progressively, therefore the status of each moment, is estimated based on the last frame. Therefore, the system can determine an estimate back projection at the present moment. The user may move to an position at time t+1, and even alter their head orientation. The system tracks and determines these changes to gauge and estimate the next virtual world state from the previous one. The static mapping result is an example constraint the system implements, along with other factors as described in greater detail hereinbelow.

It is further noted that because of surjectivity, there remains the problem that the virtual camera might move to a different layer than the current static map which can cause jumping camera artifacts. However, the process of local bijection and the folding function described hereinabove, helps eliminate and prevent this phenomena from occurring and introducing artifacts from the jumping camera. In order to minimize any latencies, the performance processing is optimized to reach extremely fast processing speeds, in certain embodiments speeds greater than 160 FPS. This is part of the real-time optimization process.

The disclosed method also minimizes perceptual angles and distance distortion for the user during navigation. Further described hereinbelow is how the inverse map is computed during user navigation. It is noted that during user navigation the user's position and orientations are tracked in the real world of the user. This can be accomplished for example, by the computing device or processor collecting user position data by tracking sensors, motion trackers or other sensing type devices that can track motion of a user.

It is noted that known methods of simply warping the virtual scene in the real scene map based on the static mapping, renders a highly distorted world to the user. The user may feel the physical world correctly but are sacrificing visual fidelity for locomotive fidelity. Conversely, if users are provided just an original virtual scene, the effects produce dizzying and nauseating motion sickness in user because of the directional mismatching between the virtual camera and the user's real HMD motion. In contrast, the disclosed method and system of progressively mapping virtual and physical reality, minimizes both the residual visual distortion from mere warping methods, and the accompanying nausea effects that many users experience. The disclosed system and method minimizes both distortion and sickness so that the user can smoothly explore the virtual world and eliminates the highly distorted objects in the final rendering to the HMD of the user.

The disclosed system and method of dynamic reverse mapping permits the system to properly render the virtual world to guide the user walking or navigation within the constraints of their physical space, and simultaneously provides accurate visual and locomotion fidelity in accordance with the method described in greater detail hereinbelow.

The system therefore, tracks and collects data including user positions u(t) and u(t+1) as well as orientations U(t) and U(t+1) which are collected and tracked in the real world of the user, for example, $S_r$ at time steps, t and t+1. The corresponding virtual position x(t) and orientation X(t) at time t, is computed by the processing device or computing device. The corresponding virtual position x(t+1) and orientation X(t+1) is accomplished using the example dynamic inverse method. Note that this is a path dependent process as x(t+1) and X(t+1) are computed from x(t), X(t), u(t+1), and U(t+1). Initially, the system assigns x(0) and X(0) for the initial virtual world position and orientation.

Direction Update—

In order to compute x(t+1), the moving direction of the user is first determined and computed as follows in accordance with:

Equation (14) defined as:

$$\hat{\delta}x(t) = \frac{x(t+1) - x(t)}{\|x(t+1) - x(t)\|} \triangleq \begin{pmatrix} \hat{\delta}x \\ \hat{\delta}y \end{pmatrix}. \quad (14)$$

The virtual and real world directions are related by the Jacobians of their mapping as follows, in accordance with equation (15) defined as:

$$\begin{pmatrix} \hat{\delta}x \\ \hat{\delta}y \end{pmatrix} = \begin{pmatrix} \frac{\partial x}{\partial u} & \frac{\partial x}{\partial v} \\ \frac{\partial y}{\partial u} & \frac{\partial y}{\partial v} \end{pmatrix} \begin{pmatrix} \hat{\delta}u \\ \hat{\delta}v \end{pmatrix}, \quad (15)$$

Wherein equation (16) is defined as:

$$\begin{pmatrix} \hat{\delta}u \\ \hat{\delta}v \end{pmatrix} = \hat{\delta}u(t) = \frac{u(t+1) - u(t)}{\|u(t+1) - u(t)\|} \quad (16)$$

Equation (16) is the real world direction. Thus, the final result is determined by computing the Jacobian of the reverse function of f in Equation (1).

$$J_u(x) = \begin{bmatrix} \frac{\partial x}{\partial u} & \frac{\partial x}{\partial v} \\ \frac{\partial y}{\partial u} & \frac{\partial y}{\partial v} \end{bmatrix}. \quad (17)$$

Even though f might not be globally bijective, the local bijectivity satisfies the inverse function theorem [Rudin 1976] and thereby permits computing the inverse Jacobian via:

Equation (18) defined as:

$$J_u(x) = J_x^{-1}(u). \quad (18)$$

where $J_x(u)$ can be computed from the analytic function f at position x(t).

Position Update—

The system next determines the new virtual position x(t+1) based on the estimated direction δx(t). Focusing on the 2D x-y position, the z/height value of x can be directly assigned from u after an initial correspondence. For computation purposes, defined is Δx(t)=x(t+1)−x(t), and is represented in a polar coordinate system, for example, Δx(t)=Δx_r(d, θ)=(d cos(θ), d sin(θ)). The system uses this algorithm in determining optimized (d, θ) to minimize an energy function as described hereinbelow.

The first energy term measures how close the actual direction is to the estimated direction δx(t), with equation (19) defined as:

$$E_{dir}(\theta) = \left\| \theta - \arctan\left(\frac{\hat{\delta}y}{\hat{\delta}x}\right) \right\|^2. \quad (19)$$

The second term is to keep the virtual distance close to the real distance defined by equation (20) as:

$$E_{dis}(d) = \|d - \Delta u(t)\|^2. \quad (20)$$

The last term is to match the mapping function f in Equation (1) using equation (21) defined as:

$$E_{map}(d,\theta) = \|f(x(t) + \Delta x(t)) - u(t+1)\|^2. \quad (21)$$

Next the system determines x(t+1)=x(t)+Δx(t) to minimize $E_{rev}$ $$E_{rev} = E_{map} + \lambda_{dir} E_{dir} + \lambda_{dis} E_{dis}, \quad (22)$$

in which $\lambda_{dir}$ and $\lambda_{dis}$ are relative weights. In an example embodiment, the system sets $\kappa_{dir}$=0.1 and $\kappa_{dis}$=0.05.

For fast convergence, the system bases an initial estimation on:

$$\theta = \arctan\left(\frac{\hat{\delta}y}{\hat{\delta}x}\right) \quad (23)$$

$$d = \|\Delta u(t)\|.$$

Orientation Update—

In generating the rendering for the communication wearable communication device for example, an HMD, the system and method in an example embodiment, also computes the virtual camera orientation X(t) from the real camera orientation U(t), which is tracked by the HMD or the wearable communication device (i.e. other computing devices or processors can perform these respective functions and embodiments in which other devices perform these functions are contemplated herein as well). The system represents both orientations, virtual camera orientation X(t) and the real camera orientation U(t), using their respective Euler angles defined by equations (24):

$$U(t)=(yaw_u(t), pitch_u(t), roll_u(t))$$

$$X(t)=(yaw_x(t), pitch_x(t), roll_x(t)). \quad (24)$$

Since the planar map f has only x-y positions in the example embodiment, the system proceeds to compute only $yaw_x$ and simply copy $pitch_x$ and $roll_x$ from $pitch_u$ and $roll_u$ as defined in equation (25):

$$pitch_x(t)=pitch_u(t)$$

$$roll_x(t)=roll_u(t). \quad (25)$$

The system next determines $yaw_x(t)$ by copying the optimized angle θ from Equation (22), described hereinabove. However, empirically this can cause nausea and dizziness in the rendering to the user. The static mapping (and thus the estimated orientation correspondence) is non-linear. Consequently, when users rotate their heads with uniform speed, the corresponding virtual camera may rotate non-uniformly. Therefore, the system determines $yaw_x$ as a combination of $\lambda_a$ and $yaw_u$ in order to balance between accuracy and consistency using equation (26) defined as:

$$yaw_x(t)=\lambda_a\theta(t)+\lambda_c yaw_u(t)$$

$$1=\lambda_a+\lambda_c, \quad (26)$$

where $\lambda_a$ and $\lambda_c$ are subjective parameters set via user evaluation, as described in greater detail hereinbelow.

Figure 17A:
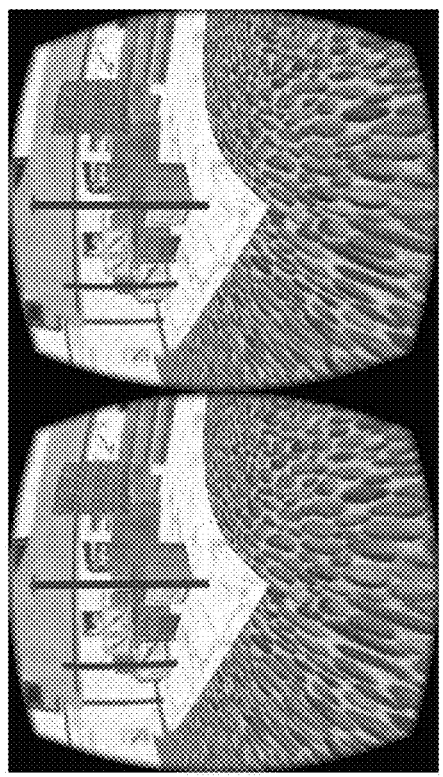
FIGS. 17A and 17B illustrate example virtual world views and a user's HMD view in accordance with an embodiment of the disclosed system and method.
Figure 17B:
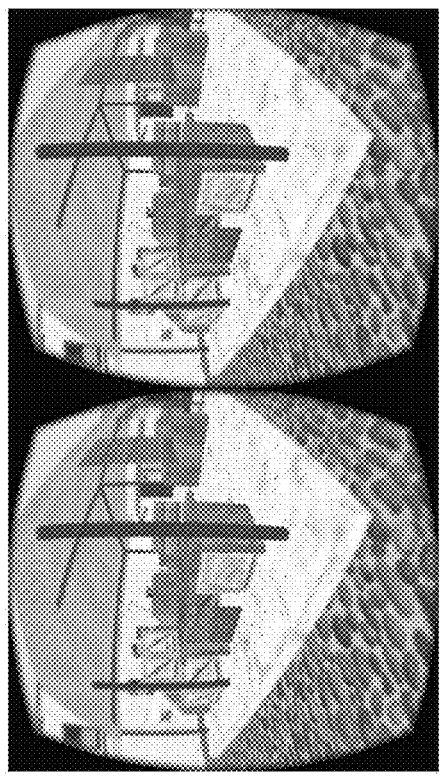

Described hereinbelow is an example of the disclosed system and method that provides the final rendering for the user to view in the HMD or wearable computing device. Referring to FIGS. 17A and 17B, shown are example virtual world views and a user's HMD view, respectively. The system renders the virtual world appearance shown in FIG. 17A, to the user's HMD view, shown in FIG. 17B, in a way that is compatible with the real world geometry, such that the user can faithfully view the virtual world but, comfortably navigate the physical rendering within the constraints of their defined physical environment. It is noted that although the user's view is entirely blocked by the placement of the HMD in their head and eye area, the disclosed system, nonetheless guides the user away from any boundaries and potentially unsafe obstacles, such as walls and furniture.

The system in producing such final rendering to the HMD, further refines the rendering by minimizing remaining issues, such as occlusion in the rendering. As described hereinabove, mere warping of the virtualized scene causes artifacts due to surjectivity. In order to further illustrate such artifacts, by way of example, unwanted lines may appear, ghost walls and blocked pathways appear in the rendering. Introducing local bijectivity as described hereinabove, minimizes these distortions. However, an image based rendering is the process by which the system minimizes and refines the rendering by eliminating for example, occlusion in the rendering. Occlusion, for example, can present as an object or other impediment, such as a wall that blocks another object or pathway from view in the HMD rendering.

Figure 18B:
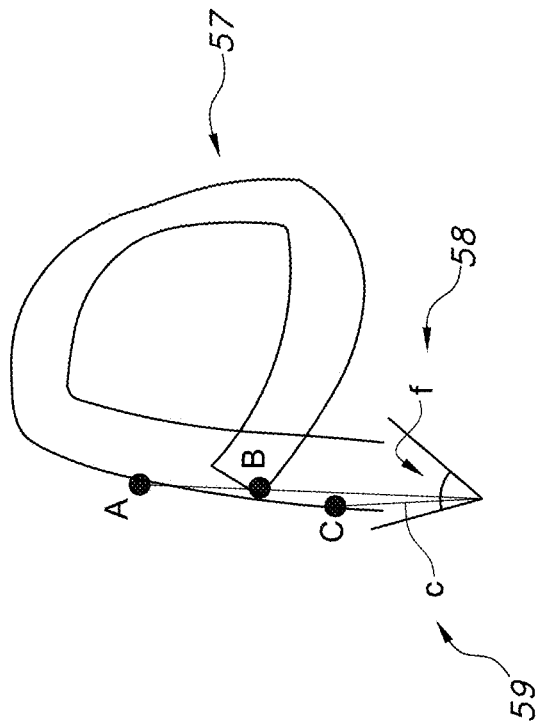
FIGS. 18A and 18B illustrate example mapped paths in a virtual scene and the corresponding real scene that demonstrate an example method of handling occlusion, in accordance with an embodiment of the disclosed system and method.
Figure 18A:
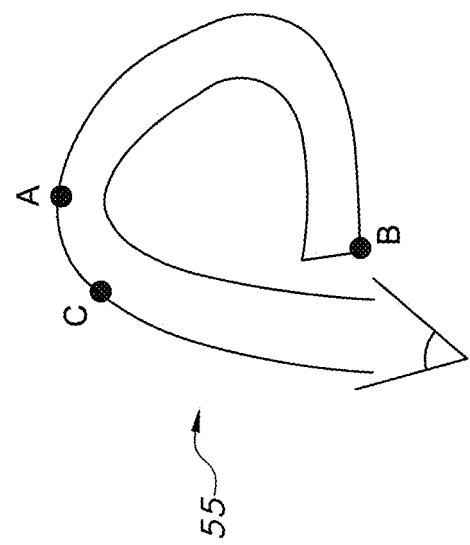

Referring to FIGS. 18A and 18B, illustrated are example mapped paths in the virtual scene 55 and the real scene 57 that demonstrate an example method of handling occlusion. As an example, it is noted that the camera in the virtualized space is viewing a walled pathway with three corresponding scene points shown as points A, B and C in FIG. 18A. Point A is occluded in the virtual camera $C_v$ but visible (i.e. dis-occluded) in the real camera $C_r$. The system is configured to determine the rendering of the dis-occluded pixel $f$ 58 in $C_r$. The direct rendering of the real scene $G_r$ into $C_r$ will select point B and causes highly occluded geometry. The example method improves the problem by selecting point B for $f$ since it is nearer the center of $C_v$ than point A. Therefore, for each pixel in the dis-occluded area such as pixel $f$, the system determines the nearest non-occluded pixel in $C_r$ which is pixel c 59 in the shown example. The system next determines the corresponding scene point C of pixel c 59. The system next assigns its 3D distances to A and B in the virtual scene $G_v$ as their depth values. Since C is closer to A than B, A will be selected by the disclosed method for $f$. This example method works in resolving occlusion issues because the local bijectivity of the mapping will prevent the incorrect solution B to be closer to C, than the correct solution to A.

It is noted that while global surjection is encouraged by the system to for example, curl up or fold the virtual world map into the real scene map, such function cannot be introduced to the point of incurring a flip-over of the world. If the surjection would violate local bijection (for example, cause the virtual pathways to be underground when folded into the real scene map) then surjection would violate local bijection and in such example, walking would be upside down, which is obviously impossible. Therefore, these constraints are also performed by the system and described in greater detail hereinbelow, in order to prevent any violations of local bijection during global surjection.

Figure 21A:
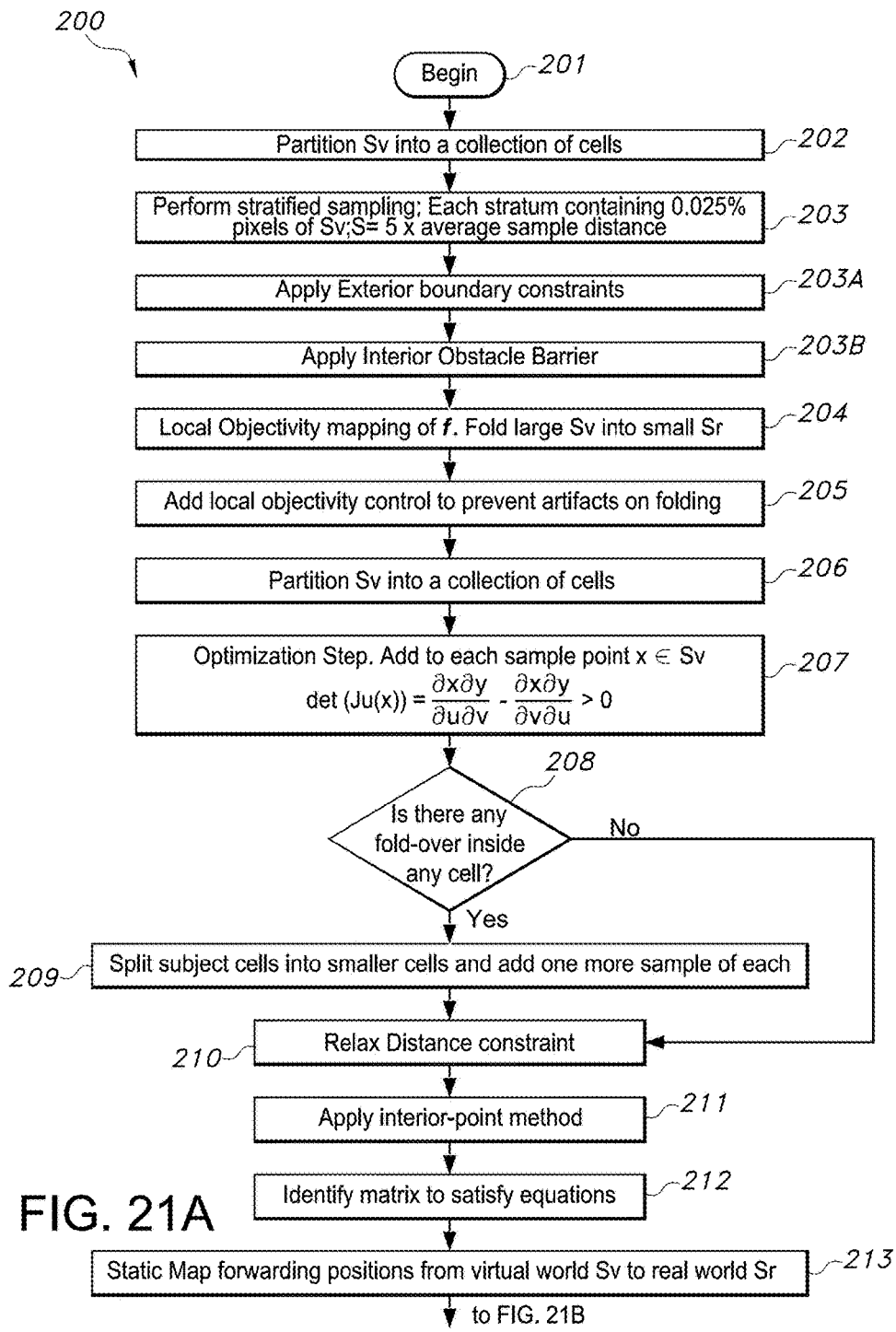
FIGS. 21A-B are a contiguous flowchart illustrating an example method comprising static forward mapping, local bijectivity, dynamic inverse mapping, and rendering a virtual scene into HMD, in accordance with an embodiment of the virtual reality mapping system.
Figure 21B:
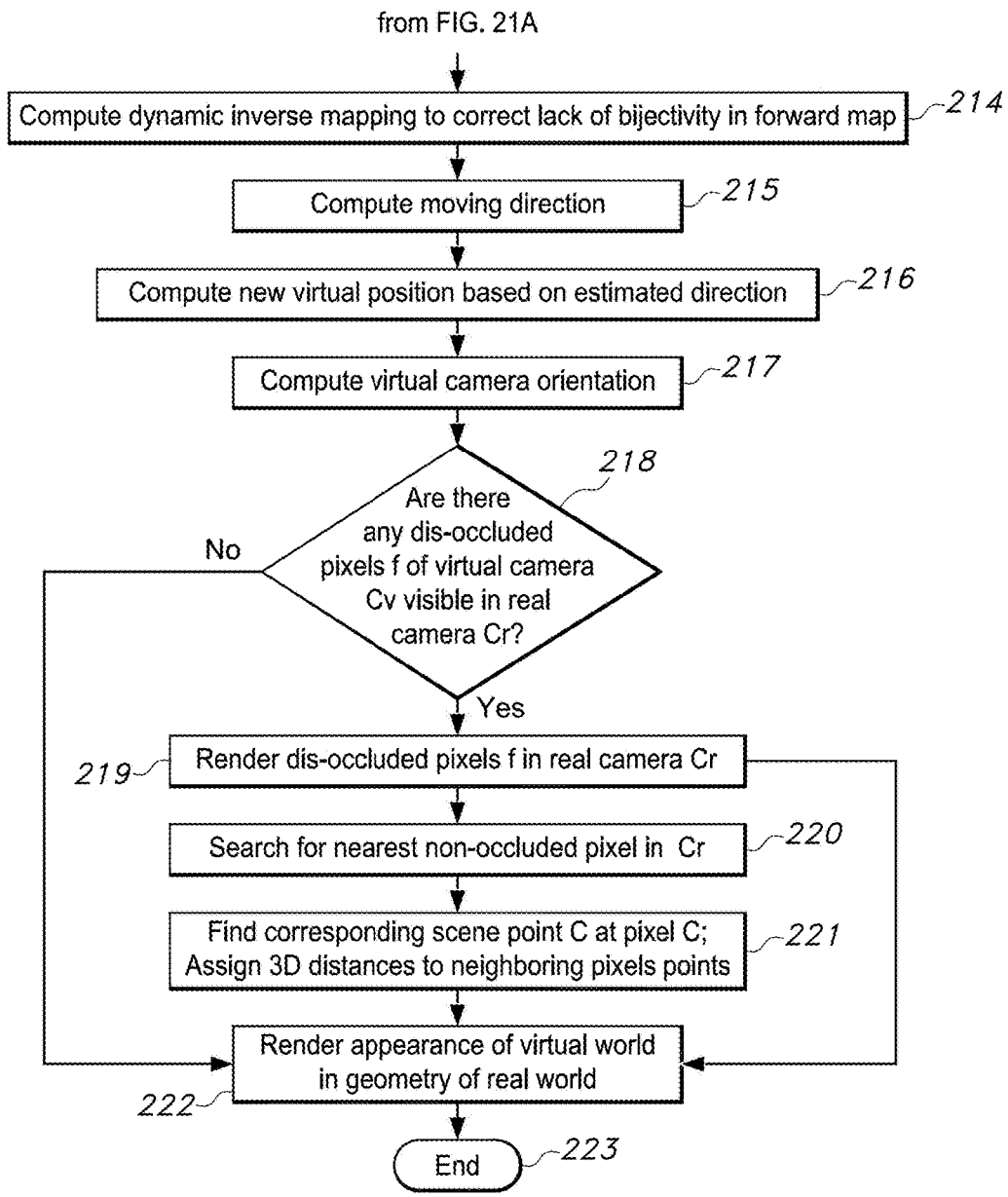

Referring to FIGS. 21A and 21B (noting the method of 201 in FIG. 21A is continued in FIG. 21B), illustrated is a flowchart of an example method comprising static forward mapping, local bijectivity, dynamic inverse mapping, and rendering a virtual scene into HMD, in accordance with an embodiment of the virtual reality mapping system. The example method 200 begins at step 201. At step 202 the method partitions $S_v$ into a collection of cells. At step 203 the method next performs stratified sampling with each stratum containing for example, 0.025% pixels over $S_v$ and setting s as 5× the average sample distance.

It is noted that given the 2D floor plans for the virtual $S_v$ and real $S_r$ scenes, the static forward map f from $S_v$ to $S_r$ that is formed is surjective but not bijective in general when $S_v > S_r$, but should minimize both distance and angle distortion for VR walkthroughs. It should reach every point in both $S_v$ and $S_r$, while keeping inside $S_r$ and away from interior obstacles. Therefore, in order to accomplish mapping of interior obstacles, in Step 203A, the method applying exterior boundary constraints is shown. Step 203 A determines and keeps all u (i.e. obstacle points) inside the real space $S_r$, by constructing a polygonal convex hull (referring to FIGS. 5 and 5A, items 501) of $S_r$ as a set of straight line functions $\{B_i\}$, to keep all u inside the real space $S_r$, and adding a series of linear constraints in accordance with equation (6) below:

$$(B_i u)^T(B_i C_r) > 0, \quad (6)$$

where $C_r$ is the center of the physical space. Essentially, step 203A functions to retain u and $C_r$ on the same side of each $B_i$ for testing point inclusion.

The step of 203B further includes the method of forming an interior obstacle barrier as also shown in items 511, FIGS. 5 and 5A. Such Gaussian barriers prevent users from hitting interior obstacles and can be formulated as the opposite of the point inclusion test in Equation (6) described further hereinbelow. However, such step further requires the determination of directed areas or angles, solving a large quadratic instead of using a linear constraint system. For faster computation, the method implements a 2D Gaussian based barrier function for each interior object 501. For each object, the system fits a minimal-covering 2D ellipse area $E(u_c, E_w, E_h, \theta_c)$, where $u_c$ is the center, $E_w$ and $E_h$ are width and height, $\theta_c$ is the rotation angle. Based on the scale of the ellipse, a Gaussian-based barrier is determined for each obstacle in the physical environment.

The method next performs local objectivity mapping $f$ in step 204. Step 204 includes the folding or curling of large $S_v$ into small $S_r$ to prevent $f$ from being globally isometric. The method targets adding objectivity controls in step 205 to prevent artifacts from appearing in the folding process end result. Next the method proceeds to partition $S_v$ into a collection of cells in step 206 in order to address performance issues during optimization of the image data and to prevent local fold-overs in the image, which produces visible artifacts in the virtual views.

The system next performs optimization in step 207 to add constraints to each sample point, in accordance with equation (10). This introduction of local bijective constraints is a fine-to-coarse process that permits prevention of foldover and reduction of visible artifacts in the final rendering of the virtual scene.

At step 208, the method next determines if there is any fold-over detected inside any of the cells. If not, the method proceeds to further local bijectivity in step 210 by modifying the distance constraints in equation (5) to encourage more stretching. This permits relaxing, more shrinking and stretching is allowed by relaxing the distance constraints. Otherwise, if fold-over is detected inside any of the cells, the system will split the subject cells into smaller cells in step 209, and further add one more sample to each. Such coarse-to-fine process provides greater stability for a non-convex problem. The method proceeds to step 211 in which an interior-point optimization process is applied. The interior-point method addresses the large, dense, and non-linear optimization problem.

It is noted that since the static forward map is surjective but not bijective in general when $S_v > S_r$, it minimizes both distance and angle distortion for VR walkthroughs. The system processes every point (x,y) in both $S_v$ and $S_r$, while keeping inside $S_r$ and away from interior obstacles. Folding that was introduced in Step 204, occurs without tearing or breaking apart the virtual world.

The method next proceeds to step 212 to identify a matrix which satisfies equations (5), (6), and (10) to (12), in resolving the static mapping problem using the interior point method of 211.

In step 213, the method static map forward positions from the virtual world Sv to real world Sr. When conducting VR walkthroughs, the method reverse maps from the current user position in Sr to Sv. This reverse map helps minimize perceptual angle and distance distortion experienced during navigation. The system next computes dynamic inverse mapping to correct the lack of bijectivity in the forward map at step 214. A dynamic inverse map is generated that guides natural locomotion and resolves local ambiguities. Such rendering method preserves the virtual world appearance while observing the physical world geometry to balance between visual fidelity and navigation comfort. At run time during user navigation, the method further computes a dynamic reverse map of $f$ in order to determine the virtual location in $S_v$ from the tracked user position in $S_r$. This reverse map is created as consistent with the forward map f while maintaining motion and perception consistency for the users. The step implements the detected tracked real/virtual user positions/orientations to determine the real and virtual cameras $C_r = \{u(t), U(t)\}$ and $C_v = \{x(t), X(t)\}$ at each moment t (as described in connection with equations (14) to (26) and related disclosure hereinabove). The system processes such data to render the appearance of the virtual world into the environment of the real world, to permit the user comfortably perceiving and viewing the virtualized world while navigating in their constrained physical environment.

In particular, during step 215 of FIG. 21B, the system tracks and collects data including user positions u(t) and u(t+1), as well as orientations U(t) and U(t+1) which are collected and tracked in the real world of the user, for example, $S_r$, at time steps, t and t+1. The corresponding virtual position x(t) and orientation X(t) at time t, is computed by the processing device or computing device. The corresponding virtual position x(t+1) and orientation X(t+1) is accomplished using the example dynamic inverse method. Note that this is a path dependent process as x(t+1) and X(t+1) are computed from x(t), X(t), u(t+1), and U(t+1). Initially, the system assigns x(0) and X(0) for the initial virtual world position and orientation.

The direction is next updated and new virtual position is determined based on estimated direction in step 216. In order to compute x(t+1), the moving direction of the user is first determined and computed in accordance with Equation (14) (as described in greater detail hereinabove).

Next during steps 216 and 217, the virtual and real world directions are related by the Jacobians of their mapping as follows, in accordance with equation (15) (described in greater detail hereinabove) and further in accordance with Equation (16) which provides the real world direction. Thus, the final result is determined by computing the Jacobian of the reverse function off in Equation (1).

In particular, in step 216 the system determines the new virtual position x(t+1) based on the estimated direction δx(t). Focusing on the 2D x-y position, the z/height value of x can be directly assigned from u after an initial correspondence. For computation purposes, Δx(t)=x(t+1)−x(t), is defined and represented in a polar coordinate system, i.e., $\Delta x(t) = \Delta x_r(d, 0) = (d \cos(0), d \sin(0))$. The goal is to find optimized (d, 0) to minimize an energy function as described hereinbelow. The first energy term measures how close the actual direction is to the estimated direction δx(t), using equation (19) described in greater detail hereinbelow. The second term is to keep the virtual distance close to the real distance defined by equation (20), as described in greater detail hereinbelow. The last term is to match the mapping function f in Equation (1) using equation (21) described with greater particularity hereinbelow. The virtual camera orientation is computed in step 217. For rendering, the system computes the virtual camera orientation X(t) from real camera orientation U(t), which is tracked by the HMD. Both orientations are represented by their Euler angles.

The method proceeds to step 218 in determining if there are any dis-occluded pixels f of the virtual camera $C_v$ visible in real camera. The method renders any dis-occluded pixels f in real camera $C_r$ in step 219.

In particular, for each fragment (xy pixel+z depth) $f_r$ visible in $I_r$ but not in $I_v$ (i.e., in dis-occlusion areas), the system processor or computing device detects the nearest (in terms of 2D xy coordinates) fragment $f_v$ visible (i.e., non-occluded) in $I_v$ in step 220. It next finds corresponding scene point C at pixel C in step 221. The method via the computing device then assigns the 3D Euclidean distance between $f_v$ and $f_r$ (in $C_v$ space) as the depth value to $f_r$ for rendering in $C_r$ in step 221. The local bijection controls as introduced in step 205 prevents overlapping among nearby virtual scene points. The result is that there is geometric similarity between the local real scene and the final rendering of progressive representations in the HMD in step 222 in a discrete time interval. The method ends at step 223.

Figure 21C:
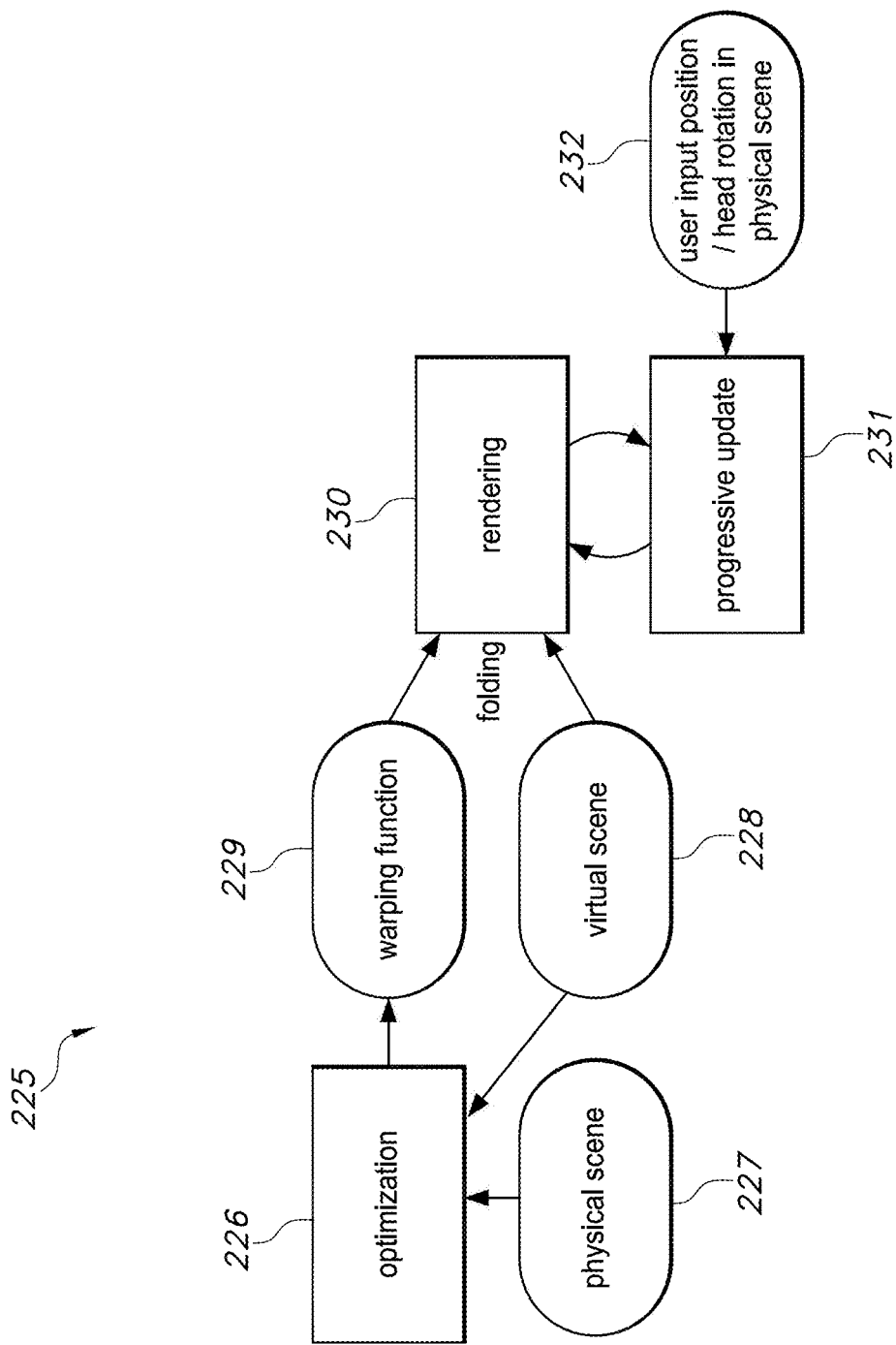
FIG. 21C is an overview flowchart illustrating various processes that are performed in rendering an optimized virtual scene into HMD with progressive updates, in accordance with an embodiment of the virtual reality mapping system.

Referring to FIG. 21C is an example flow chart providing an overview of the method employed by the virtual mapping system. In particular, FIG. 21C provides an overview flowchart illustrating various processes that are performed in rendering an optimized virtual scene into HMD with progressive updates, in accordance with an embodiment of the virtual reality mapping system. The system basically can generate for the user progressive representations as viewed via their HMD or wearable computing device as the final output image. The system receives the physical scene data in step 227 and the virtual scene data 228 and performs respective optimization of the image in step 226. The system applies the warping function in 229 and folding functions in generating the rendering 230. The rendering is further updated by application of inverse mapping functions as described hereinabove. The user input positions such as head rotation and user walkthrough data such as user position data u(t) and u(t=1), camera orientation data U(t), and the corresponding virtual position data is tracked and determined as applied to the progressive update function or module 231. The user input including change in position and head rotation in the physical scene 232, is dynamically updated and input into the progressive updating function or module 231.

Described with greater particularity hereinbelow is the example method of the final HMD rendering for the user navigating a subject physical environment that the real scene plans are based upon following the above-described method of static mapping $f$.

In an embodiment of the method of rendering, the disclosed system uses the tracked/computed real/virtual user positions/orientations as described hereinabove to determine the real and virtual cameras $C_r=\{u(t), U(t)\}$ and $C_v=\{x(t), X(t)\}$ at each moment t (as described in connection with equations (14) to (26) and related disclosure hereinabove). The system processes such data to render the appearance of the virtual world into the environment of the real world, for the purpose of the user comfortably perceiving and viewing the virtualized world while navigating in their constrained physical environment. As described in connection with FIGS. 18A and 18B, and further in connection with FIGS. 19A-19F described further hereinbelow, the direct mapping of the virtual scene geometry into the real scene via static forward mapping $f$ using Equation (1), can result in overlaps and intersections including occlusions in the rendering, and thus result in an unsuitable rendering. The original virtual scene rendering, however, cannot be used for direct navigation as it would cause motion sickness due to incompatibility with the real scene. Typically navigating without optimizing the virtual scene in accordance with embodiments of the disclosed system and method, will result in very fast and jolting video viewing. Therefore, the disclosed system and method incorporates the rendering of the virtual world into the geometry of the real world, balancing visual fidelity and locomotion fidelity and further, reducing vestibular discomfort, in accordance with the example method, as described in greater detail hereinbelow.

FIGS. 19A-19F illustrate examples of various renderings, which provides an overview of the various issues that arise, and the differences between the different kinds of renderings. FIG. 19A illustrates a virtual camera view, specifically virtual camera $C_v$ rendering $I_v$ in both top 70 and bottom 71 views. FIG. 19B illustrates a real camera view, specifically a real camera $C_r$ rendering $I_r$ with ghosting objects 72, 73, such as walls and other artifacts, blocking most of the respective views. FIG. 19C illustrates manually cropping only the relevant parts of the real scene to remove the ghosting objects 72, 73 in FIG. 19B, shown for comparison purposes only, not as a solution or an example of the disclosed method. FIG. 19D illustrates an example rendering with warping solution applied with resultant dis-occlusion. In particular, warping $I_v$ towards $C_r$ is performed with dis-occlusion areas shown in areas 74, 75 and 76. FIG. 19E illustrates a naive solution for the dis-occlusion areas shown in FIG. 19D using fragment depth values in the virtual camera Cv. However, this solution result is not effective in removal of all artifacts as blurring and other artifacts appear at least in area 77 and disocclusion in at least area 78. FIG. 19F illustrates an example rendering in accordance with an embodiment of the disclosed system and method with no artifacts present. Specifically shown is fitting the virtual image $I_v$ into the real camera $C_r$. The combination of the rendering in FIG. 19A and geometry in FIG. 19C which renders the appearance of the virtual image and fitting cleanly into the real camera view.

In accordance with a disclosed embodiment of rendering, the example method renders the virtual image $I_v$ with virtual scene geometry $G_v$ and virtual camera $C_v$. The system next initializes the real image $I_r$ by mapping/warping [McMillan 1997] $I_v$ into $C_r$ via f to maintain visibility consistency with $I_v$. Parts of $I_r$ might remain uncovered due to dis-occlusion. In such case, the system performs an additional method step of a rendering pass via the real scene geometry $G_r$ and camera $C_r$.

The disclosed method generally will initially warp the original virtual image $I_v$ into $I_r$. Next, the method is followed by rendering $G_r$ only into the uncovered portions of $I_r$. Otherwise, parts of $G_r$ may erroneously occlude points in $I_v$ that should remain visible in $I_r$, as demonstrated in FIG. 19B, for example. Regarding the dis-occluded parts in $I_r$, simply rendering $G_r$ via $C_r$ will show artifacts as illustrated for example, in dis-occluded areas 72 and 73. Another method partially improves the outcome by using depth values in the virtual camera $C_v$ instead of the real camera $C_r$. However, this method is not effective as illustrated in FIG. 19E, areas 77, 78.

Therefore, the disclosed method exhibits more accurate results in achieving elimination of dis-occlusion in the final rendering. In the example method, the system detects fragment (xy pixel+z depth) $f_r$ visible in $I_r$ but not in $I_v$ (i.e., in dis-occlusion areas). The system next determines the nearest fragment $f_v$ (for example, in terms of 2D xy coordinates) visible (i.e., non-occluded) in $I_v$. The system next assigns the 3D Euclidean distance between $f_v$ and $f_r$ (in $C_v$ space) as the depth value to $F_r$ for rendering in $C_r$. Referring to FIGS. 18A and 18B, illustrated is an example. This strategy is effective because the local bijection (as described hereinabove at least with respect to FIGS. 12A-12C and FIG. 13), prevents overlapping among nearby virtual scene points. There is apparent a geometric similarity between the local real scene in FIG. 19C (a local naïve solution applied) and FIG. 19F (the example method applied).

Implementation of such rendering method and related algorithms is available for GPU implementation. It is noted that a graphics processing unit (GPU), also referred to as a visual processing unit (VPU), is a specialized electronic circuit designed to rapidly manipulate and alter memory to accelerate the creation of images in a frame buffer intended for output to a display device, such as an HMD. GPUs are generally used in embedded systems, mobile phones, personal computers, workstations, and game consoles. Modern GPUs are very efficient at manipulating computer graphics and image processing, and their highly parallel structure makes them more efficient than general-purpose Central Processing Units (CPUs) for algorithms where the processing of large blocks of data is done in parallel. In a personal computer, a GPU can be present on a video card, or it can be embedded on the motherboard or in certain CPUs on the CPU die.

Implemented by any such processors, the virtual image $I_v$ is first rendered (via polygon rasterization) of the virtual geometry $G_v$ into virtual camera $C_v$. For each given pixel/fragment, the system records the usual color and depth, as well as the optional G-buffer parameters [Crassin et al. 2015] for re-shading non-Lambertian materials. The system next forward warps [McMillan 1997; Yang et al. 2011] $I_v$ into $C_r$ to initialize $I_r$ (and optionally re-render non-Lambertian fragments), and record the coverage via a stencil buffer. If $I_r$ is not entirely covered, the system renders $G_r$ via $C_r$ culled by the stencil buffer.

Because it is generally computationally complex to do reverse projection of $I_v$ as f is a transcendental function, 3D position of a real rendered pixel is generally stored in memory or a computer readable medium, as a texture coordinate.

Similar to standard game level design, the example method surrounds the scene with an environment-map box to ensure all pixels in $I_v$ are initially covered. Thus, all uncovered pixels in forward-warped $I_r$ are caused by dis-occlusion. The environment map is important to ensure robust dis-occlusion to prevent far-away objects from being mistakenly rendered into the background, as exemplified in FIGS. 20A-20D.

Referring to FIGS. 20A-20D, illustrated are example virtual and real camera views in an example embodiment of using environment maps to remove environmental artifacts. The importance of applying use of the environment map, for example, a light sky blue background 80 as shown in FIG. 20D. FIG. 20A illustrates a rendering from the virtual camera view. FIG. 20B illustrates a rendering from the real camera view. FIG. 20C illustrates a rendering in accordance with an embodiment of the disclosed method without using an environment map and including various artifacts 81, 82, 83 in the sky region 85. FIG. 20D illustrates a rendering in accordance with an embodiment of the disclosed method by application of an environment map. Resulting image includes a sky 80 that is clear, similar to the sky region 84 in FIG. 20B, but, additionally required to result in sky 80, is the application of the subset of $I_v$ from $C_v$.

For more robust handling of larger/more complex dis-occlusions, the system will determine for each detected dis-occluded fragment $f_r$, its four nearest visible fragments, instead of just one nearest visible fragment, as also described hereinabove. Specifically, the system detects the nearest non-occluded pixel $c_i$, $i \in [1, 4]$ visible (for example, that is non-occluded or unobstructed) along each image domain direction ($\pm x$ and $\pm y$) in $I_r$. Each of the nearest non-occluded pixel $c_i$, in which $i \in [1, 4]$, possesses a 2D distance $d_i$ to $f_r$ and corresponding scene position $C_i$. The system next estimates the hypothetical matching point C (as also described in connection with FIGS. 18A and 18B hereinabove) by applying equation (27):

$$C = \frac{\sum_{i=1}^{4} d_i^{-1} C_i}{\sum_{j=1}^{4} d_j^{-1}}. \tag{27}$$

In order to further improve quality, the system in certain embodiments, uses the standard IBR implementations [Debevec et al. 1996] of rendering multiple images with different camera parameters for $G_r$, and further blends all fragments with the same screen position and depth (within a numerical precision range in certain embodiments) with weights proportional to their quality. For example, fragments with normal directions closer to the camera ray will generally possess higher weights.

It is noted that in certain instances, the camera $C_r$ may also go beyond the field of view of the original camera $C_v$. Therefore, in certain embodiments, the system renders $I_v$ into a cylinder or 6 sides of a cube to ensure sufficient coverage. In improving efficiency, the system will estimate and render only the needed subset of $I_v$ from $C_v$ and $C_r$, which includes the relevant cube faces essentially stenciled and mapped with the corresponding necessary portions.

The mapping $f$ in Equation (1) described hereinabove for the example method of static forward mapping $f$, can possess a meta parameter w that morphs the scene [Turk and O'Brien 2005]. For example, $f_0$ maps to the virtual scene $G(0)=G_v$, $f_1$ maps to the real scene $G(1)=G_r$, and $f_w$ with $w \in (0\ 1)$ maps to a scene in-between $G(w)$. The w parameter trades off between visual fidelity to the virtual image $I(0)=I_v$ and motion fidelity to the real scene $G(1)=G_r$. As shown in FIGS. 22A-22D, illustrated are side-by-side comparisons of different renderings possessing different virtual-real mixing weights w ranging from 0% to 100% and resultedly exhibiting varied visible renderings.

In particular, FIG. 22A (top and bottom views) illustrates an example rendering possessing a virtual-real mixing weight w of 0%. FIG. 22B (top and bottom views) illustrates an example rendering possessing a virtual-real mixing weight w of 33%. FIG. 22C (top and bottom views) illustrates another example rendering possessing a virtual-real mixing weight w of 66%. FIG. 22D (top and bottom views) illustrates another example rendering possessing a virtual-real mixing weight w of 100%.

Experiment A:

Subjective and objective aspects of the system pipeline were studied via various experiments with participants. In an example study Experiment A, seven (7) participants with ages between 25 and 31 were tested. Among these participants, one participant had no prior experience with HMDs, six others have at least some basic knowledge or experiences with HMDs. One of the participants suffered from a light degree of vertigo prior to the study.

Figure 25B:
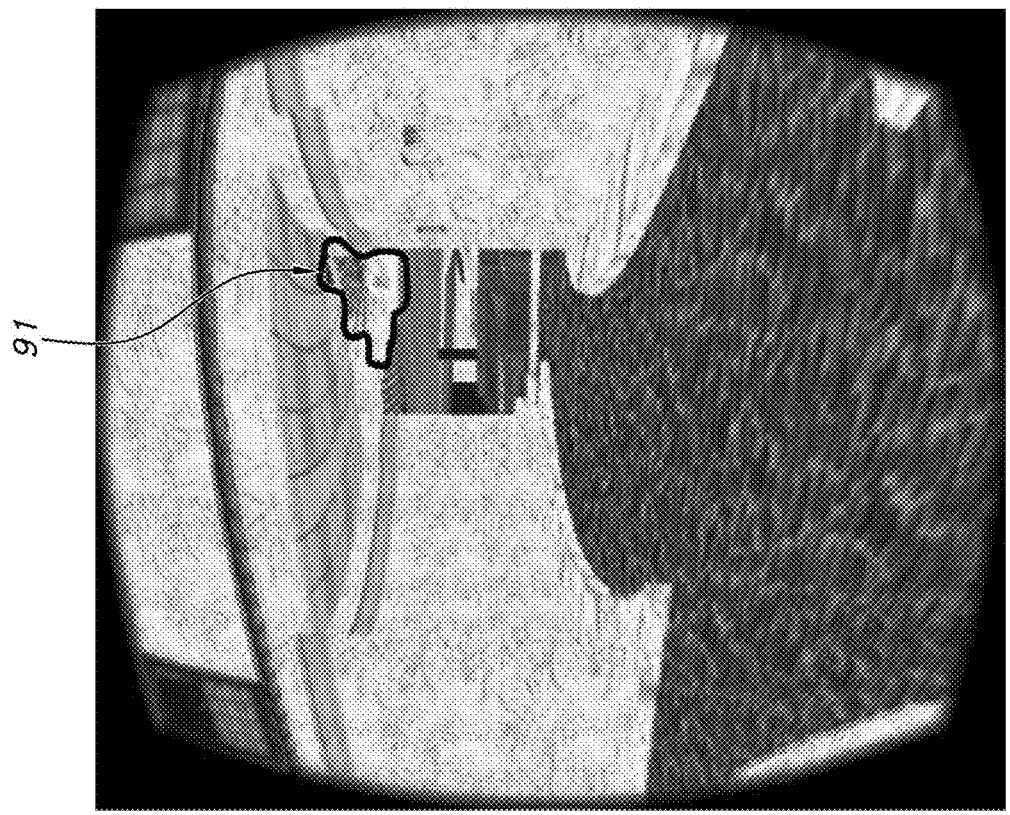
FIGS. 25A and 25B illustrate example renderings of virtual scenes with significant dis-occlusion triggered and artifacts present.
Figure 25A:
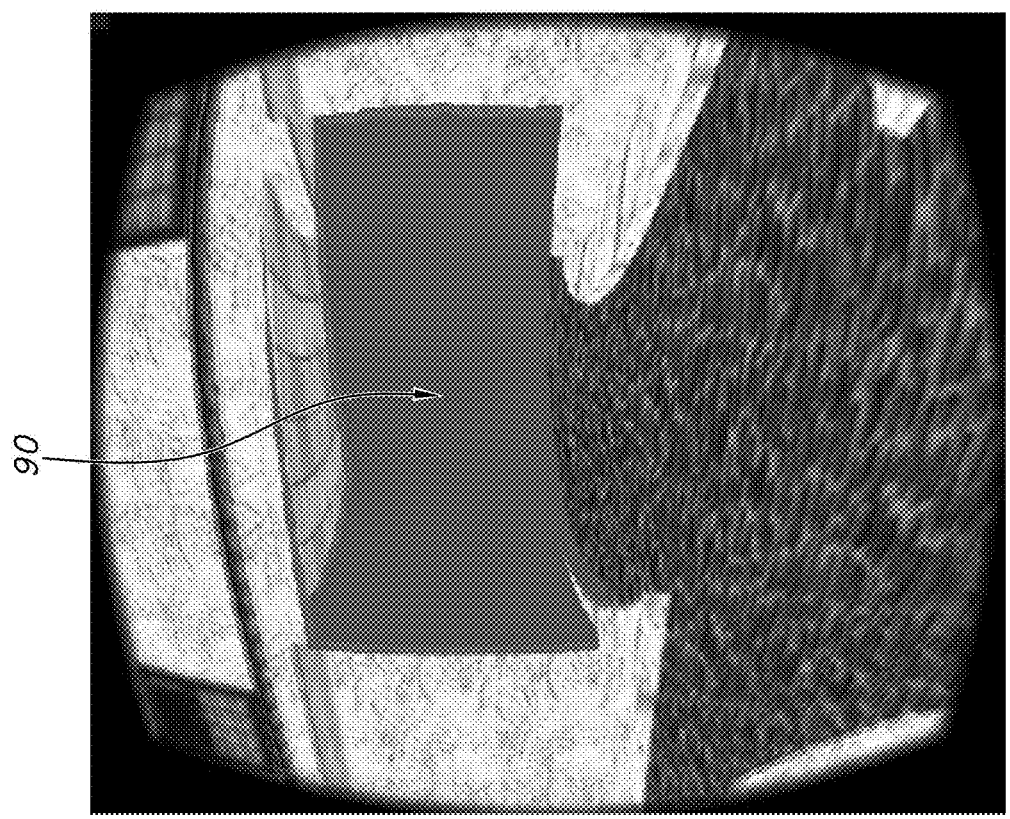

In addition to objective parameters which are empirically set based on scene properties, also analyzed are two subjective parameters, w and $\lambda_d/\lambda_b$. The parameter w was described hereinabove for the example method of rendering. The parameter $\lambda_d/\lambda_b$ was described hereinabove for the example method dynamic inverse mapping. Due to limited human sensitivity to small parameter differences, ranges are evaluated instead of individual values. For w, its valid range [0, 1] is split uniformly into 3 sub-ranges. When $\lambda_d/\lambda_b$, values are lower than 0.6, it may cause significant mismatch between virtual and real camera orientations, triggering large dis-occlusions and rendering artifacts such as shown in FIGS. 25A and 25B, in particular in example, areas 90 and 91. In the present experiment, the [0.6, 1] range was selected and uniformly split into 4 sub-ranges. Each participant was tested with a random value sampled from each sub-range.

For w, the participants followed paths inside the virtual office scene as shown in bottom panel of FIGS. 22A-22D, which are mapped to the physical lab scene with both boundaries and obstacles present. Generally, larger w values will favor locomotion over visual fidelity, and when weighting value w is too small, it can result in motion sickness. Participants chose the most favorite w value to balance between visual and locomotion fidelity. Because people are more sensitive to locomotion discomfort, the participants were evaluated with high to low w values until feeling uncomfortable. Since $\lambda_d/\lambda_b$ is for orientation, the participants were requested to remain stationary, rotate their heads, and choose which values provide the most natural experience.

The results of the experiments are as follows. For w, six (6) participants chose values within the 33% to 66% w values range as their preferences. One of those six (6) users reported unbearable locomotion experience, when w lies in 0 to 33%. The user with 3D vertigo reported light, but bearable dizziness during this range and preferred the 66% to 100% w values range instead.

For $\lambda_d/\lambda_b$, all participants reported visual discomfort when the w value was lower than 0.7. Among all participants, one (1) chose [0.7, 0.8] while the others chose [0.8, 0.9]. They reported that the proper values should be position-sensitive, i.e., the level of mismatch between real and virtual scenes caused by $f$.

Also observed were the participants that did not rotate their head much during the w experiments. As a result, they did not detect strong inconsistency when $\lambda_c$ was low, until the participants commenced the rotation experiment.

VR Usability—

Similar to other VR applications [Bowman et al. 2002], conducted was a formative user study to evaluate the usability of the disclosed VR system and method. Implemented in such study was the task-based method to evaluate locomotion and the post-interview-based method to evaluate visual fidelity and motion sickness. All subjective parameters in this study session are taken from users' choices as described hereinabove.

Figure 23A:
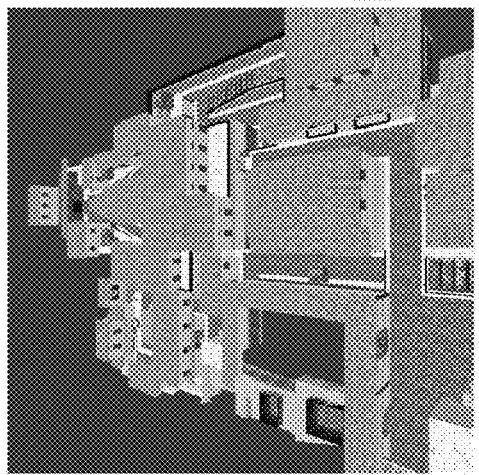
FIGS. 23A-23D illustrate an external view of scenes implemented by the VR mapping system and method in experimental studies.
Figure 23B:
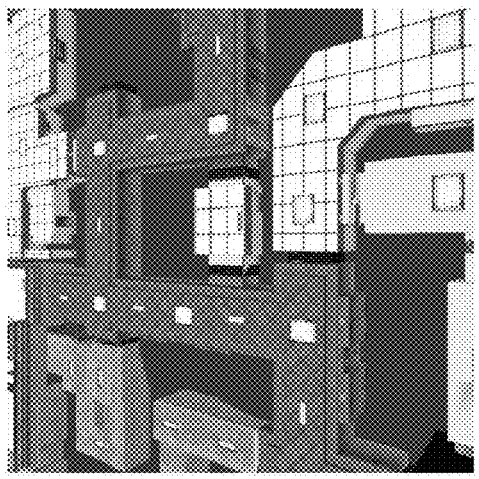

In an example Experiment B, the Counter Strike office scene as illustrated in FIG. 23B was selected. FIG. 23B scene has simple and uniform paths for task-based studies. A purple vending machine at one end of the scene was chosen as the goal object. This particular object is unique in the scene and far from the entrance door, and thus considered suitable for a search task. Without prior knowledge of the scene, the participants commenced free locomotion to find the target. During the experiment, if a participant hits any real world objects or feels sick, the experiment was stopped. In order to evaluate locomotion fidelity, the participants can click a counter whenever they feel lost. In order to evaluate visual fidelity, the participants were provided the original virtual scene to explore and grade for similarity at the end of the experiments. At the closing interview session, the participants shared their comments and graded their sickness and fatigue levels.

Experiment B Result:

In accomplishing the search task, two (2) participants had a failure experience. One (1) was caused by wall crossing and since the implemented pipeline does not implement collision detection, when users cross a wall, the algorithm was not able to progress with the final rendering, as it regarded all pixels as dis-occlusion. Another failure case was caused by the particular user passing by the vending machine without noticing it until being explicitly prompted. No participant hit any real world objects.

Regarding locomotion fidelity, no direction loss was reported.

Regarding motion sickness, the simulator sickness questionnaire (SSQ) [Kennedy et al. 1993] was conducted at the end of the experiments. Compared to prior literature, such as [Schild et al. 2012] for gaming environments, the overall numbers as shown in Table 1 hereinbelow are in a comfortable range. Specifically, one user reported bearable fatigue after the w experiment. Two users (one with VR experience and another without) reported dizziness right after the first experiment, but they recovered and felt comfortable for the remaining two experiments.

TABLE 1

SSQ results using the questionnaire from [Bouchard et al. 2007]

| | participants | | | | | | |
|---|---|---|---|---|---|---|---|
| measure | 1 | 2 | 3 | 4 | 5 | 6 | 7 |
| nausea (out of 27) | 5 | 8 | 6 | 1 | 0 | 0 | 0 |
| oculomotor (out of 21) | 5 | 6 | 4 | 1 | 1 | 1 | 0 |

Regarding visual fidelity, one participant graded 90 (out of 100), five graded 80, and one graded 40. The reason for the 40 low grade is that the participant was more sensitive to corner angles. Since the disclosed algorithm warps the virtual scene, any global angle (not local conformality) might change significantly.

For additional interview comments, the participant without VR experience was excited about the walkthrough experience. Another participant expressed concerns about highly bended angles, which may cause users fatigue and discomfort after sustained usage of the disclosed VR mapping system.

Performance

Static Forward Mapping—

Since the static mapping is a preprocessing step, there is no need for real-time or interactive performance. However, as shown in Table 2, without the disclosed example method of implementing a Gaussian-based obstacle barrier function, the optimization will be impractical for real spaces with obstacles.

TABLE 2

Performance measurement for static mapping.
Note the faster performance of barriers than
of constraints for interior obstacles.

| | real | | | |
|---|---|---|---|---|
| | no obstacle | | 60 × 100 with obstacle | |
| virtual | 60 × 100 | 70 × 70 | barrier | constraint |
| Italy | 406.8 s | 487.9 s | 926.7 s | >3 h |
| Office | 282.6 s | 214.3 s | 444.7 s | >3 h |
| Venice | 75.6 s | 61.6 s | 340.7 s | >3 h |
| Colonoscopy | 22.4 s | 35.0 s | 203.0 s | 35 m |

Dynamic Inverse Mapping—

The inverse mapping part is usually very fast with speed mainly depending on the complexity of $f$. For example, the office scene with the largest number of basis functions (as shown in Table 3 below) has FPS ranging from 160 to 240 based on users' movement speed.

TABLE 3

Performance measurement for rendering

| scene | # vertices | # triangles | # basis | FPS |
|---|---|---|---|---|
| Italy | 11018 | 21038 | 143 | 49.7 |
| Office | 11752 | 22249 | 165 | 50.4 |
| Venice | 6492 | 8431 | 154 | 44.2 |
| Colonoscopy | 5094 | 10108 | 48 | 40.5 |

Rendering—

Table 3 provides performance measurements and scene statistics. The frame rate is between interactive (30 FPS) and real-time (60 FPS), and the rendering cost depends much more on the image resolution (1182×1461 per eye) than geometry details due to the disclosed VR system use of image warping.

Applications—

The disclosed VR mapping system and method can be applied for various VR applications, such as gaming/entertainment, architecture/design walkthrough, and medical imaging/visualization.

First person shooting games, such as Counter Strike, have been a main target for VR designers. The disclosed method has been applied to two different scenes in Counter Strike: the Italy scene for outdoor views and the office scene for indoor views, as shown in FIGS. 23A and 23 B. The corresponding results in FIG. 17A (the virtual world view) and FIG. 17B) the HMD view of the user in accordance with an embodiment of the disclosed system and method). Other results are shown in FIGS. 22A-22D, show the significant progress and improvement exhibited in the disclosed method for navigating for example, first person shooter or other first person action games, while moving in a real room using HMD.

Figure 23C:
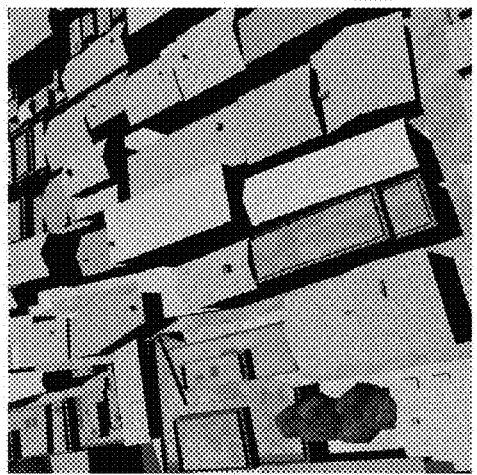

Virtual architectural walkthroughs provide immersive experience for design and education. FIG. 23C displays a portion of the Venice city 3D model, with the disclosed system rendering result shown in FIG. 24A. Users can virtually walk to every corner of the city, while staying in their homes when using the disclosed VR system.

Figure 23D:
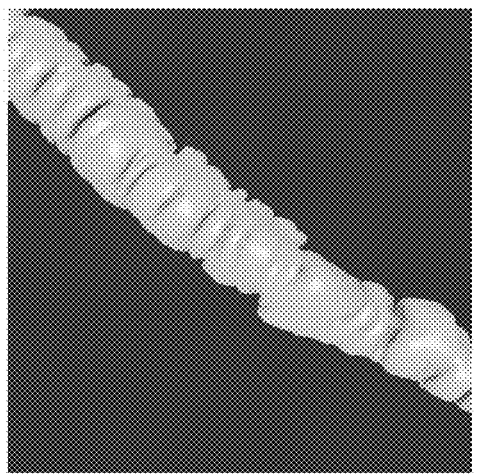
Figure 24B:
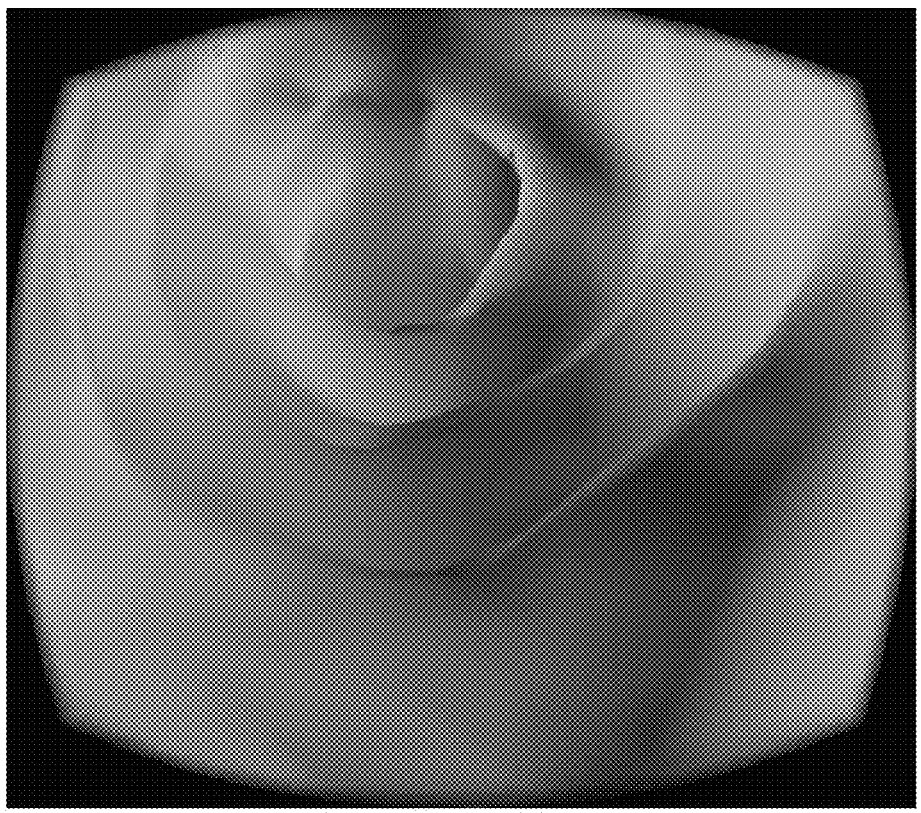
FIGS. 24A-24B illustrate sample HMD renderings for the external view of scenes shown in FIGS. 23C and 23D as implemented in the VR mapping system and method.
Figure 24A:
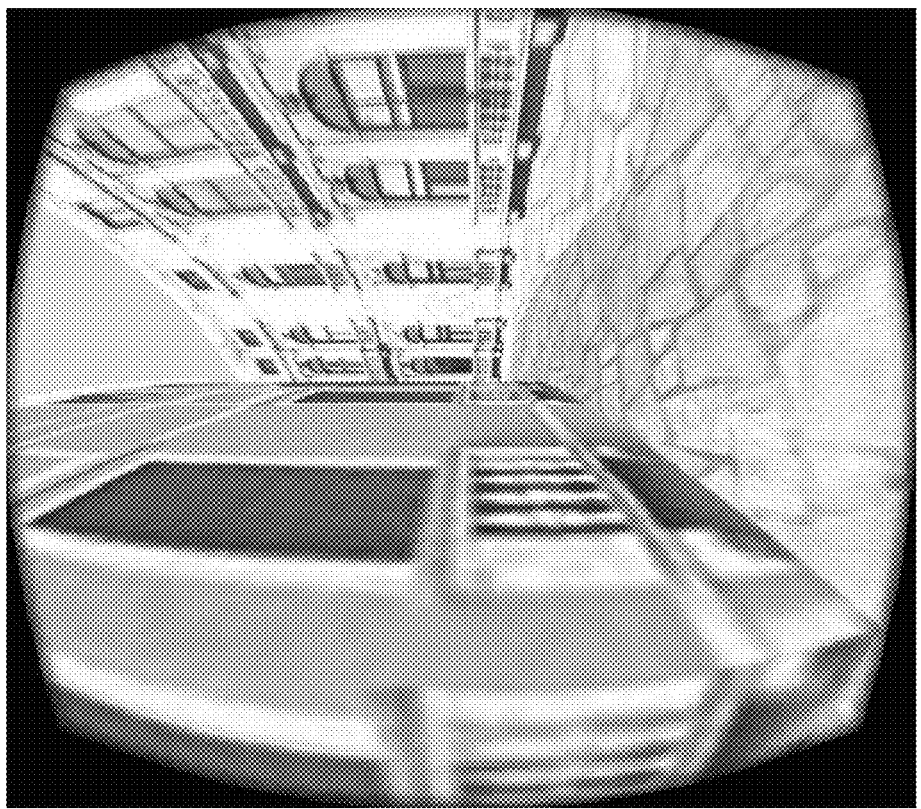

Modern virtual reality techniques have been introduced in medical imaging with clinical use. As a representative application, virtual colonoscopy is a non-invasive computer-aided 3D medical imaging technology to replace traditional optical colonoscopy [Hong et al. 1997]. In order to make radiologists feel or immerse as if being inside a human colon for greater and/or closer viewing/evaluative ability during medical evaluation, while also having a more realistic navigation experience, the disclosed VR system straightens a folded colon for 2D navigation as shown in FIG. 23D. A sample rendering by the disclosed VR mapping system of a virtual colonoscopy is shown in FIG. 24B.

Therefore, the present system and method provides for real walking within a given physical environment, while perceiving a given virtual world inside an HMD for multiple VR applications. The present system focuses on the graphics aspects: 2D mapping and 3D rendering to balance between visual fidelity to the virtual world and locomotion comfort for the physical world. These graphics algorithms depend on but are largely orthogonal and complementary to a collection of perceptual and physiological parameters, for which a preliminary study was performed.

The current method is designed for mapping 2D floor plans. It can be used to navigate scenes with height variations by tracking user head elevation and add it over the virtual scene height value for rendering. This can work if the users actively change their body postures such as jumping or crouching, but they might not sense the proper motion with plainly walking up a ramp, for example.

Although the present static mapping solver can estimate a constraint-satisfying solution for any given pair of virtual and real spaces, the quality depends on their shape and size differences. When the sizes between virtual and real spaces differ substantially, the mapped virtual space may be strongly distorted, reducing both visual and locomotion fidelity to the users. On the other hand, similar virtual and physical worlds can certainly improve the output quality of the disclosed system. FIGS. 11C-E illustrate resultant differences in size and shape between the virtual and real spaces. FIGS. 26A-26C further show dis-occlusion examples. Ghost artifacts appear in top panel image, FIG. 26C in area 93, from implementing mere warping solutions, for example. Ghosting appears in FIG. 26B at area 94 and in FIG. 26A, area 97. However, FIG. 26, item 96 illustrates the disclosed system and method implemented, without any dis-occlusion or artifacts present in the final HMD rendering.

Large open virtual spaces cannot be folded into a small real space without being noticed by the users. Space manipulation mechanisms such as teleportation might help and are worth further study. Fortunately, many virtual scenes in popular VR applications such as gaming, architecture, and medical imaging are highly occluded, and thus can benefit from the disclosed method.

In some cases, narrow virtual pathways can become even narrower than regular human footsteps after the static mapping. This, combined with motion capture accuracy limit, can cause the presently estimated Δx to cross walls and obstacles.

The example rendering algorithm cannot handle a large area that is entirely dis-occluded and also has very different depth from the surrounding regions, as illustrated in FIGS. 25A and 25B. In particular, the present dis-occlusion handling method, as depicted in FIGS. 18A and 18B, requires parts of the nearby geometry to be visible for a dis-occluded fragment. The present experiments and analysis indicated that these dis-occlusion artifacts can be resolved by using more virtual images. Fine-tuning how many additional virtual cameras are necessary, and where to place them, is part of the solution to these aforementioned issues.

Further explored is the use of non-pinhole cameras [Cui et al. 2010; Popescu et al. 2009] for rendering, but the present embodiment implements traditional pinhole projection due to perceptual and performance reasons. In particular, pinhole projection is faster to render, and causes less motion disorientation for VR walkthroughs. However, a limited amount of non-linear projection is sought to strike a balance between rendering and perception.

FIG. 27 is a simplified block diagram illustrating an example computer network infrastructure, according to an exemplary embodiment. In system 235, a device 238 communicates using a communication link 242 (e.g., a wired or wireless connection) to a remote device 241. The device 238 may be any type of device that can receive data and display information corresponding to or associated with the data. For example, the device 238 may be a heads-up display system, such as the head-mounted device 502, 600, or 620 described with reference to FIGS. 30A-30D.

Thus, the device 238 may include a display system 236 comprising a processor 239 and a display 237. The display 237 may be, for example, an optical see-through display, an optical see-around display, or a video see-through display. The processor 239 may receive data from the remote device 241, and configure the data for display on the display 237. The processor 239 may be any type of processor, such as a micro-processor or a digital signal processor, for example.

The device 238 may further include on-board data storage, such as memory 230 coupled to the processor 239. The memory 240 may store software that can be accessed and executed by the processor 239, for example.

The remote device 241 may be any type of computing system or transmitter including a laptop computer, a mobile telephone, or tablet computing system, etc., that is configured to transmit data to the device 238. The remote device 241 and the device 238 may contain hardware to enable the communication link 242, such as processors, transmitters, receivers, antennas, etc.

In FIG. 27, the communication link 242 is illustrated as a wireless connection; however, wired connections may also be used. For example, the communication link 242 may be a wired serial bus such as a universal serial bus or a parallel bus, among other connections. The communication link 242 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), and/or Zigbee, among other possibilities. Either of such a wired and/or wireless connection may be a proprietary connection as well. The remote device 241 may be accessible via the Internet and may include a computing cluster associated with a particular web service (e.g., social-networking, photo sharing, address book, etc.).

Figure 28:
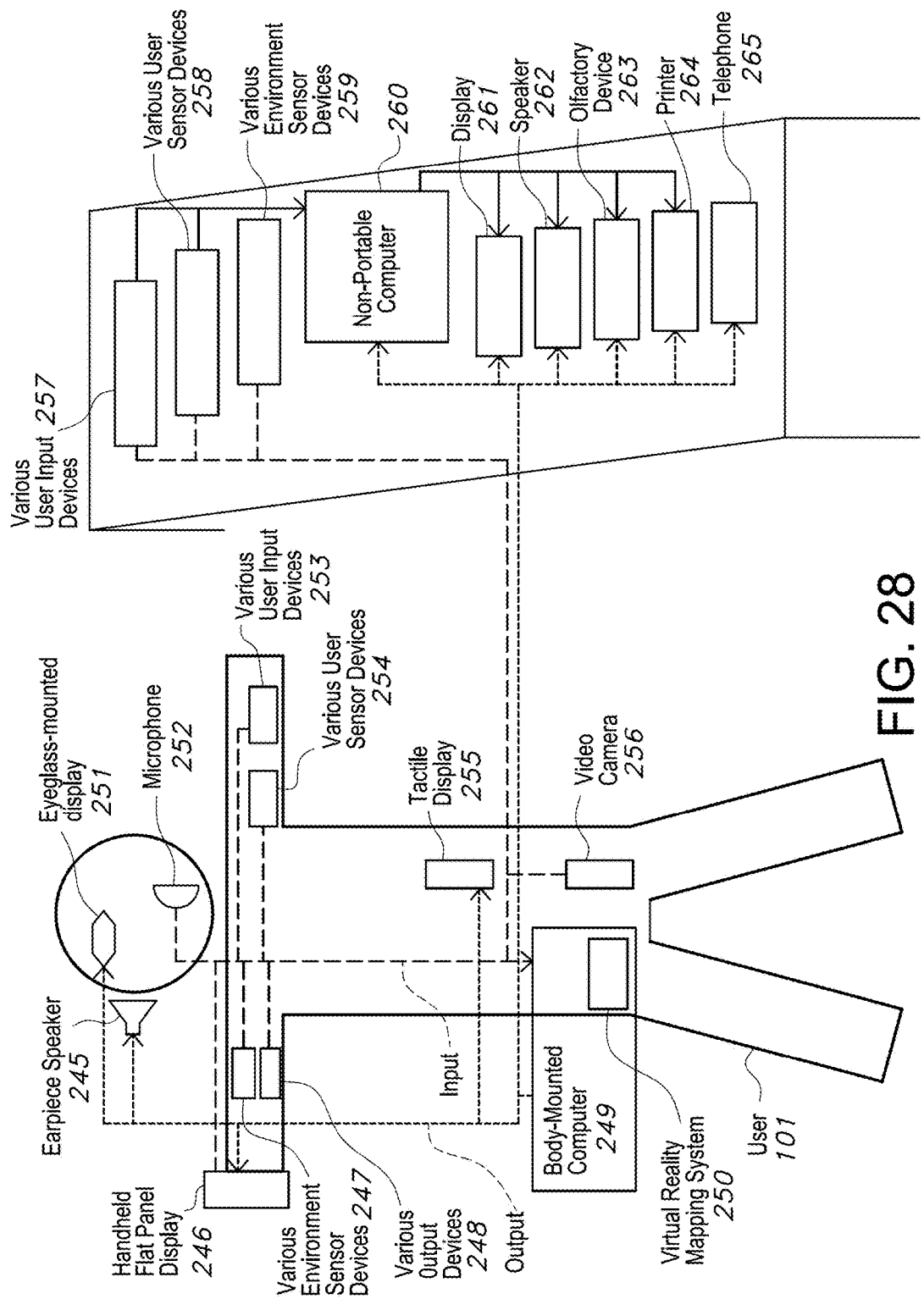
FIG. 28 illustrates a system block diagram in accordance with an embodiment of the virtual mapping system, including an example computing system.

Referring to FIG. 28, an embodiment of the virtual reality mapping system 250 is shown operating in a general-purpose body-mounted wearable computer 249 worn by the user 101. FIG. 28 and the following discussion provide a brief, general description of a suitable computing environment in which the disclosure can be implemented. Although not required, embodiments of the disclosure will be described in the general context of computer-executable instructions, such as routines executed by a general purpose computer. Those skilled in the relevant art will appreciate that aspects of the invention can be practiced with other computer system configurations, including Internet appliances, hand-held devices, cellular or mobile phones, multi-processor systems, microprocessor-based or programmable consumer electronics, network PCs, client-server environments including thin clients, mini-computers, mainframe computers and the like. Aspects of the invention can be embodied in a special purpose computer or data processor that is specifically programmed, configured or constructed to perform one or more of the computer-executable instructions or modules explained in detail below. Indeed, the term "computer" as used herein refers to any data processing platform or device.

Aspects of the invention can also be practiced in distributed computing environments, where tasks or modules are performed by remote processing devices, which are linked through a communications network. In a distributed computing environment, program modules or sub-routines may be located in both local and remote memory storage devices, such as with respect to a wearable computer and a fixed-location computer. Aspects of the invention described below may be stored and distributed on computer-readable media, including magnetic and optically readable and removable computer disks, as well as distributed electronically over the Internet or over other networks (including wireless networks). Those skilled in the relevant art will recognize that portions of the invention may reside on a server computer or server platform, while corresponding portions reside on a client computer. For example, such a client server architecture may be employed within a single wearable computer, among several wearable computers of several users, and between a wearable computer and a fixed-location computer. Data structures and transmission of data particular to aspects of the invention are also encompassed within the scope of the invention.

Many wearable computers (including the computer 249) travel with the user, such as by being strapped or attached to a user's body or clothing or by being mounted in a holster. The wearable computer 249 has a variety of user-worn user input devices including a microphone 252, a hand-held flat panel display 246 (e.g., with a touch sensitive portion and character recognition capabilities), and various other user input devices 253. Similarly, the computer has a variety of user-worn output devices that include the hand-held flat panel display 246, an earpiece speaker 245, an eyeglass-mounted display 251, a tactile output device 255, and various other user output devices 248. In addition to the various user-worn user input devices, the computer can also receive information from various user sensor input devices 254 and from environment sensor input devices 247, including a video camera 256. The virtual reality mapping system 250, as well as various CCs and/or CSes (not shown), can receive and process the various input information received by the computer and can present information to the user on the various accessible output devices.

As shown in FIG. 28, the computer 249 is accessible to or communicates with a computer 260 (e.g., by being in line-of-sight wireless proximity or by being reachable via a long-distance communication device such as a cellular phone/modem) which also has a variety of input and output devices. In the illustrated embodiment, the computer 260 is non-portable, although the body-mounted computer of the user can similarly communicate with a variety of other types of computers, including portable computers and body-mounted computers of other users. The devices from which the non-portable computer can directly receive information include various user input devices 257 and various user sensor input devices 258. The non-portable computer can output information directly to a display 261, a speaker 262, an olfactory device 263, and a printer 264. In the illustrated embodiment, the body-mounted computer can communicate with the non-portable computer via a wireless transmission medium. In this manner, the virtual reality mapping system 250 can receive information from the user input devices 257 and the user sensor devices 258 after the information has been transmitted to the non-portable computer and then to the body-mounted computer.

Alternately, the body-mounted computer may be able to directly communicate with the user input devices 257 and the user sensor devices 258, as well as with other various remote environment sensor input devices 259, without the intervention of the non-portable computer 260. Similarly, the body-mounted computer may be able to supply output information to the display 261, the speaker 262, the olfactory device 263, and the printer 264, either directly or via the non-portable computer, and directly to the telephone 265. As the user moves out of range of the remote input and output devices, the virtual reality mapping system 250 will be updated to reflect that the remote devices are not currently available.

The computers 249 and 260 can employ any known bus structures or architectures for coupling the various blocks of such systems, including employing a memory bus with memory controller, a peripheral bus, and a local bus. Data storage devices (not shown) coupled to the computers 249 and 260 may include any type of computer-readable media that can store data accessible by a computer, such as magnetic hard and floppy disk drives, optical disk drives, magnetic cassettes, flash memory cards, digital video disks (DVDs), Bernoulli cartridges, RAMs, ROMs, smart cards, etc. Indeed, any medium for storing or transmitting computer-readable instructions and data may be employed, including a connection port to a network such as a local area network (LAN), wide area network (WAN) or the Internet.

The various input devices allow the virtual reality mapping system 250 or another system (not shown) executing on the computer 249 to monitor the user and the environment and to maintain a model (not shown) of the current conditions or context. Such a context model can include a variety of attributes that represent information about the user and the user's environment at varying levels of abstraction. For example, information about the user at a low level of abstraction can include raw physiological data (e.g., heart rate and EKG) and geographic information (e.g., location and speed), while higher levels of abstraction may attempt to characterize or predict the user's physical activity (e.g., jogging or talking on a phone), emotional state (e.g., angry or puzzled), desired output behavior for different types of information (e.g., to present private family information so that it is perceivable only to the user and the user's family members), and cognitive load (i.e., the amount of attention required for the user's current activities). Background information which changes rarely or not at all can also be included, such as the user's age, gender and visual acuity. The model can similarly hold environment information at a low level of abstraction, such as air temperature or raw data from a motion sensor, or at higher levels of abstraction, such as the number and identities of nearby people, objects, and locations. The model of the current context can additionally include information added explicitly from other sources (e.g., application programs), as well as user-specified or system-learned defaults and preference information.

Those skilled in the art will appreciate that computer systems 249 and 260, as well as their various input and output devices, are merely illustrative and are not intended to limit the scope of the invention. The computer systems may contain additional components or may lack some of the illustrated components. For example, it is possible that the virtual reality mapping system 249 can be implemented on the non-portable computer 260, with the body-mounted computer 249 replaced by a thin client such as a transmitter/receiver for relaying information between the body-mounted input and output devices and the non-portable computer. Alternately, the user may not wear any devices or computers.

As described in greater detail below in connection with FIGS. 30A-30D, an example wearable computing system may include, or may otherwise be communicatively coupled to, a computing system, such as computing system 518 or computing system 604.

Figure 29:
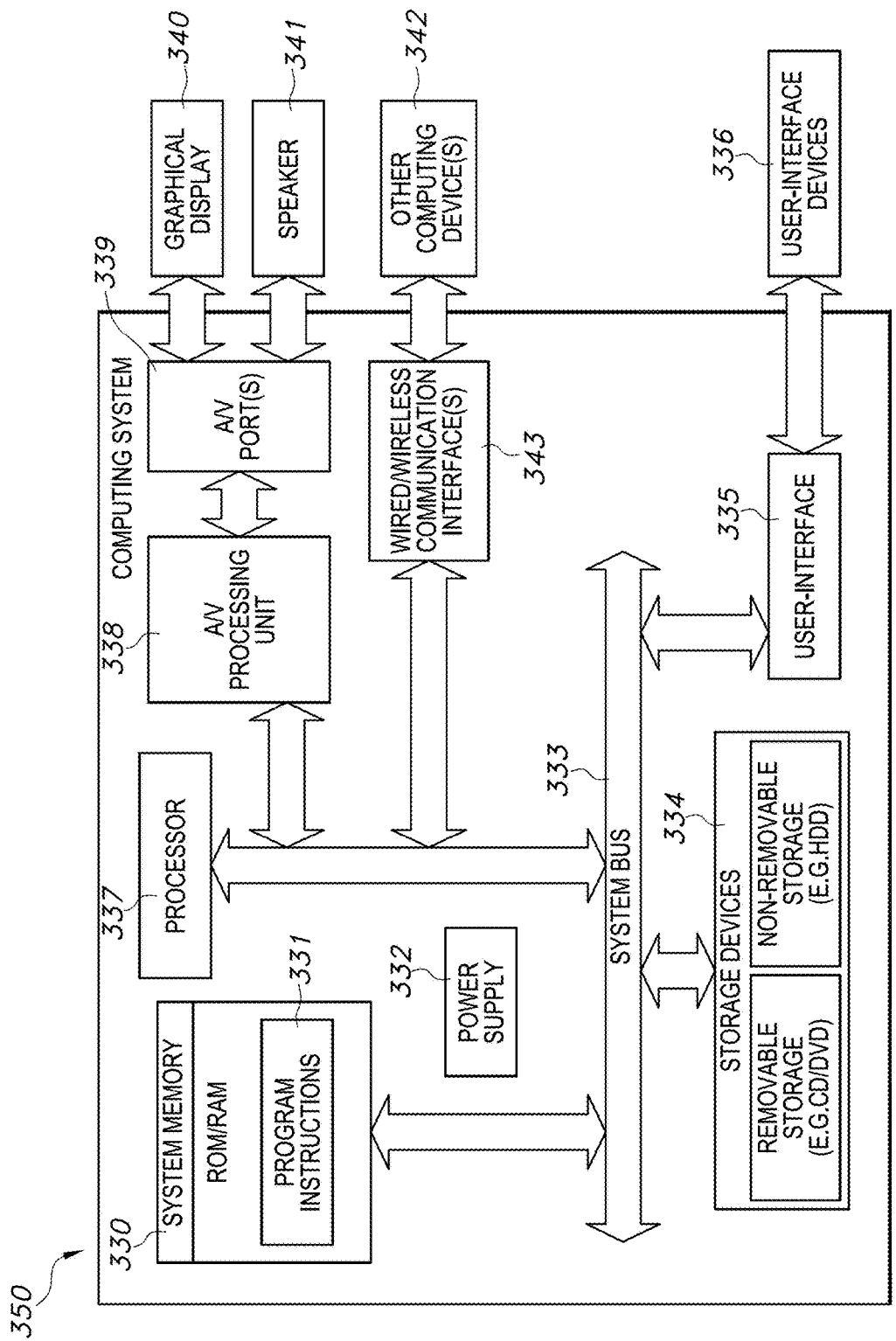
FIG. 29 illustrates a system block diagram in accordance with an embodiment of the virtual mapping system, including an example computing system.

FIG. 29 is a simplified block diagram illustrating example components of an example computing system, according to an exemplary embodiment. One or both of the device 238 and the remote device 241 of FIG. 27, may take the form of computing system 350 shown in FIG. 29.

Computing system 350 may include at least one processor 337 and system memory 330. In an example embodiment, computing system 350 may include a system bus 333 that communicatively connects processor 337 and system memory 330, as well as other components of computing system 350. Depending on the desired configuration, processor 337 can be any type of processor including, but not limited to, a microprocessor (µR), a microcontroller (µC), a digital signal processor (DSP), or any combination thereof. Furthermore, system memory 330 can be of any type of memory now known or later developed including but not limited to volatile memory (such as RAM), non-volatile memory (such as ROM, flash memory, etc.) or any combination thereof.

An example computing system 350 may include various other components as well. For example, computing system 350 includes an A/V processing unit 338 for controlling graphical display 340 and speaker 341 (via A/V port 339), one or more communication interfaces 343 for connecting to other computing systems 342, and a power supply 332. Graphical display 340 may be arranged to provide a visual depiction of various input regions provided by user-interface module 335. For example, user-interface module 335 may be configured to provide a user-interface and graphical display 340 may be configured to provide a visual depiction of the user-interface.

FIG. 30A is a diagram illustrating an embodiment of the virtual reality system for receiving, transmitting, and displaying data, according to an exemplary embodiment. The system 500 is shown in the form of a wearable computing device. While FIG. 30 illustrates a head-mounted device 502 as an example of a wearable computing system, other types of wearable computing devices could additionally or alternatively be used. As illustrated in FIG. 30A, the head-mounted device 502 has frame elements including lens-frames 504, 506 and a center frame support 508, lens elements 510, 512, and extending side-arms 514, 516. The center frame support 508 and the extending side-arms 514, 516 are configured to secure the head-mounted device 502 to a user's face via a user's nose and ears, respectively.

Each of the frame elements 504, 506, and 508 and the extending side-arms 514, 516 may be formed of a solid structure of plastic and/or metal, or may be formed of a hollow structure of similar material so as to allow wiring and component interconnects to be internally routed through the head-mounted device 502. Other materials may be possible as well.

One or more of each of the lens elements 510, 512 may be formed of any material that can suitably display a projected image or graphic. Each of the lens elements 510, 512 may also be sufficiently transparent to allow a user to see through the lens element. Combining these two features of the lens elements may facilitate an augmented reality or heads-up display where the projected image or graphic is superimposed over a real-world view as perceived by the user through the lens elements 510, 512.

The extending side-arms 514, 516 may each be projections that extend away from the lens-frames 504, 506, respectively, and may be positioned behind a user's ears to secure the head-mounted device 502 to the user. The extending side-arms 514, 516 may further secure the head-mounted device 502 to the user by extending around a rear portion of the user's head. Additionally or alternatively, for example, the system 500 may connect to or be affixed within a head-mounted helmet structure. Other possibilities exist as well.

The system 500 may also include an on-board computing system 518, a video camera 520, a sensor 522, and a finger-operable touch pad 524. The on-board computing system 518 is shown to be positioned on the extending side-arm 514 of the head-mounted device 502; however, the on-board computing system 518 may be provided on other parts of the head-mounted device 502 or may be positioned remote from the head-mounted device 502 (e.g., the on-board computing system 518 could be connected by wires or wirelessly connected to the head-mounted device 502). The on-board computing system 518 may include a processor and memory, for example. The on-board computing system 518 may be configured to receive and analyze data from the video camera 520, the sensor 522, and the finger-operable touch pad 524 (and possibly from other sensory devices, user-interfaces, or both) and generate images for output by the lens elements 510 and 512. The on-board computing system 518 may additionally include a speaker or a microphone for user input (not shown). An example computing system is further described below in connection with FIG. 31 or hereinabove in connection with FIG. 29.

The video camera 520 is shown positioned on the extending side-arm 514 of the head-mounted device 502; however, the video camera 520 may be provided on other parts of the head-mounted device 502. The video camera 520 may be configured to capture images at various resolutions or at different frame rates. Video cameras with a small form-factor, such as those used in cell phones or webcams, for example, may be incorporated into an example embodiment of the system 500.

Further, although FIG. 30A illustrates one video camera 520, more video cameras may be used, and each may be configured to capture the same view, or to capture different views. For example, the video camera 520 may be forward facing to capture at least a portion of the real-world view perceived by the user. This forward facing image captured by the video camera 520 may then be used to generate an augmented reality where computer generated images appear to interact with the real-world view perceived by the user.

The sensor 522 is shown on the extending side-arm 516 of the head-mounted device 502; however, the sensor 522 may be positioned on other parts of the head-mounted device 502. The sensor 522 may include one or more of a gyroscope or an accelerometer, for example. Other sensing devices may be included within, or in addition to, the sensor 522 or other sensing functions may be performed by the sensor 522.

The finger-operable touch pad 524 is shown on the extending side-arm 514 of the head-mounted device 502. However, the finger-operable touch pad 524 may be positioned on other parts of the head-mounted device 502. Also, more than one finger-operable touch pad may be present on the head-mounted device 502. The finger-operable touch pad 524 may be used by a user to input commands. The finger-operable touch pad 524 may sense at least one of a position and a movement of a finger via capacitive sensing, resistance sensing, or a surface acoustic wave process, among other possibilities. The finger-operable touch pad 524 may be capable of sensing finger movement in a direction parallel or planar to the pad surface, in a direction normal to the pad surface, or both, and may also be capable of sensing a level of pressure applied to the pad surface. The finger-operable touch pad 524 may be formed of one or more translucent or transparent insulating layers and one or more translucent or transparent conducting layers. Edges of the finger-operable touch pad 524 may be formed to have a raised, indented, or roughened surface, so as to provide tactile feedback to a user when the user's finger reaches the edge, or other area, of the finger-operable touch pad 524. If more than one finger-operable touch pad is present, each finger-operable touch pad may be operated independently, and may provide a different function.

FIG. 30B is a diagram illustrating an alternate view of the system illustrated in FIG. 30A, according to an exemplary embodiment. As shown in FIG. 30B, the lens elements 510, 512 may act as display elements. The head-mounted device 502 may include a first projector 528 coupled to an inside surface of the extending side-arm 516 and configured to project a display 530 onto an inside surface of the lens element 512. Additionally or alternatively, a second projector 532 may be coupled to an inside surface of the extending side-arm 514 and configured to project a display 534 onto an inside surface of the lens element 510.

The lens elements 510, 512 may act as a combiner in a light projection system and may include a coating that reflects the light projected onto them from the projectors 528, 532. In some embodiments, a reflective coating may be omitted (e.g., when the projectors 528, 532 are scanning laser devices).

In alternative embodiments, other types of display elements may also be used. For example, the lens elements 510, 512 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 504, 506 for driving such a matrix display. Alternatively or additionally, a laser or light emitting diode (LED) source and scanning system could be used to draw a raster display directly onto the retina of one or more of the user's eyes. Other possibilities exist as well.

Figure 30C:
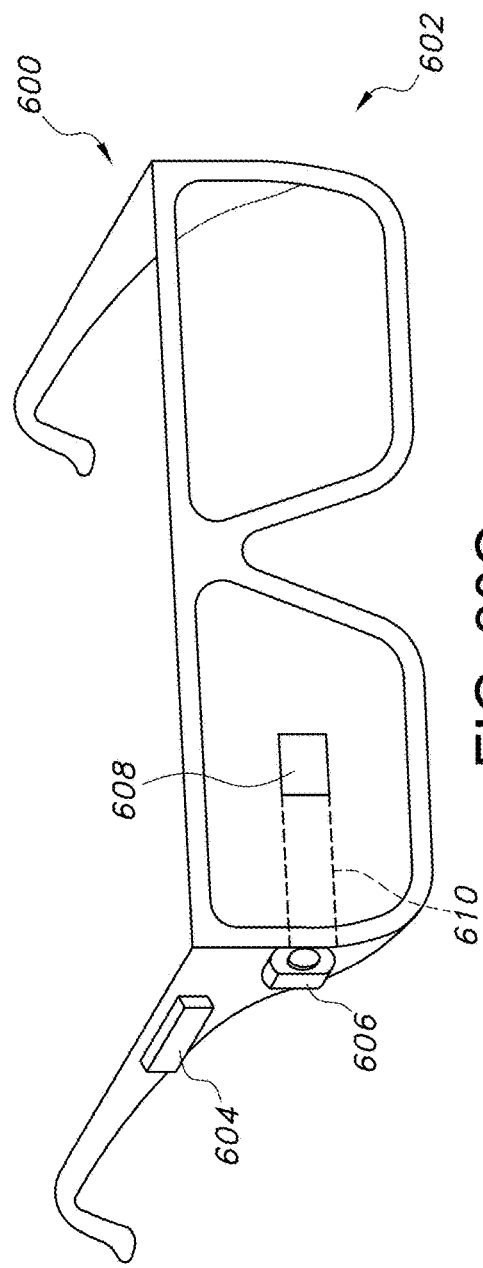

FIG. 30C is a diagram illustrating a second example system for receiving, transmitting, and displaying data, according to an exemplary embodiment. The system 600 is shown in the form of a wearable computing device 602. The wearable computing device 602 may include frame elements and side-arms such as those described with respect to FIGS. 30A and 30B. The wearable computing device 602 may additionally include an on-board computing system 604 and a video camera 606, such as those described with respect to FIGS. 30A and 30B. The video camera 606 is shown mounted on a frame of the wearable computing device 602; however, the video camera 606 may be mounted at other positions as well.

As shown in FIG. 30C, the wearable computing device 602 may include a single display 608 which may be coupled to the device. The display 608 may be formed on one of the lens elements of the wearable computing device 602, such as a lens element described with respect to FIGS. 30A and 30B, and may be configured to overlay computer-generated graphics in the user's view of the physical world. The display 608 is shown to be provided in a center of a lens of the wearable computing device 602; however, the display 608 may be provided in other positions. The display 608 is controllable via the computing system 604 that is coupled to the display 608 via an optical waveguide 610.

Figure 30D:
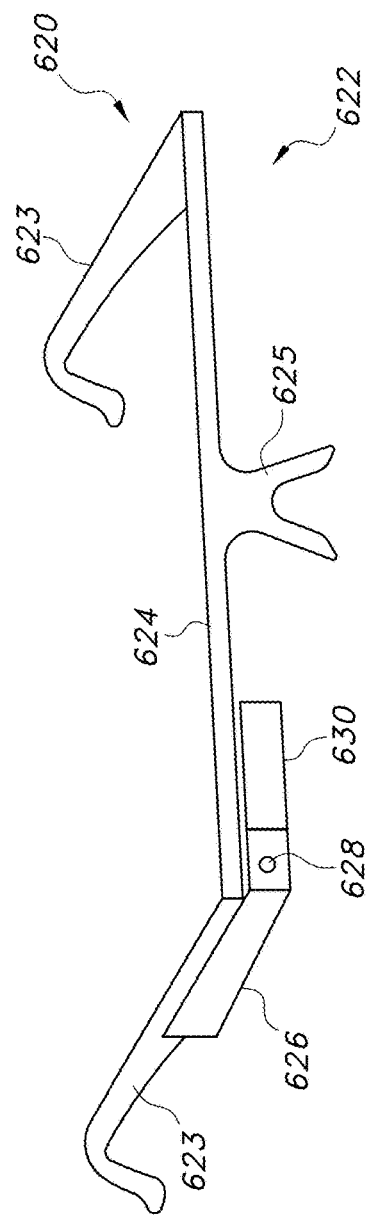

FIG. 30D is a diagram illustrating a third example system for receiving, transmitting, and displaying data, according to an exemplary embodiment. The system 620 is shown in the form of a wearable computing device 622. The wearable computing device 622 may include side-arms 623, a center frame support 624, and a bridge portion with nosepiece 625. In the example shown in FIG. 6B, the center frame support 624 connects the side-arms 623. The wearable computing device 622 does not include lens-frames containing lens elements. The wearable computing device 622 may additionally include an on-board computing system 626 and a video camera 628, such as those described with respect to FIGS. 30A and 30B.

The wearable computing device 622 may include a single lens element 630 that may be coupled to one of the side-arms 623 or the center frame support 624. The lens element 630 may include a display such as the display described with reference to FIGS. 30A and 30B, and may be configured to overlay computer-generated graphics upon the user's view of the physical world. In one example, the single lens element 630 may be coupled to a side of the extending side-arm 623. The single lens element 630 may be positioned in front of or proximate to a user's eye when the wearable computing device 622 is worn by a user. For example, the single lens element 630 may be positioned below the center frame support 624, as shown in FIG. 30D.

Figure 31:
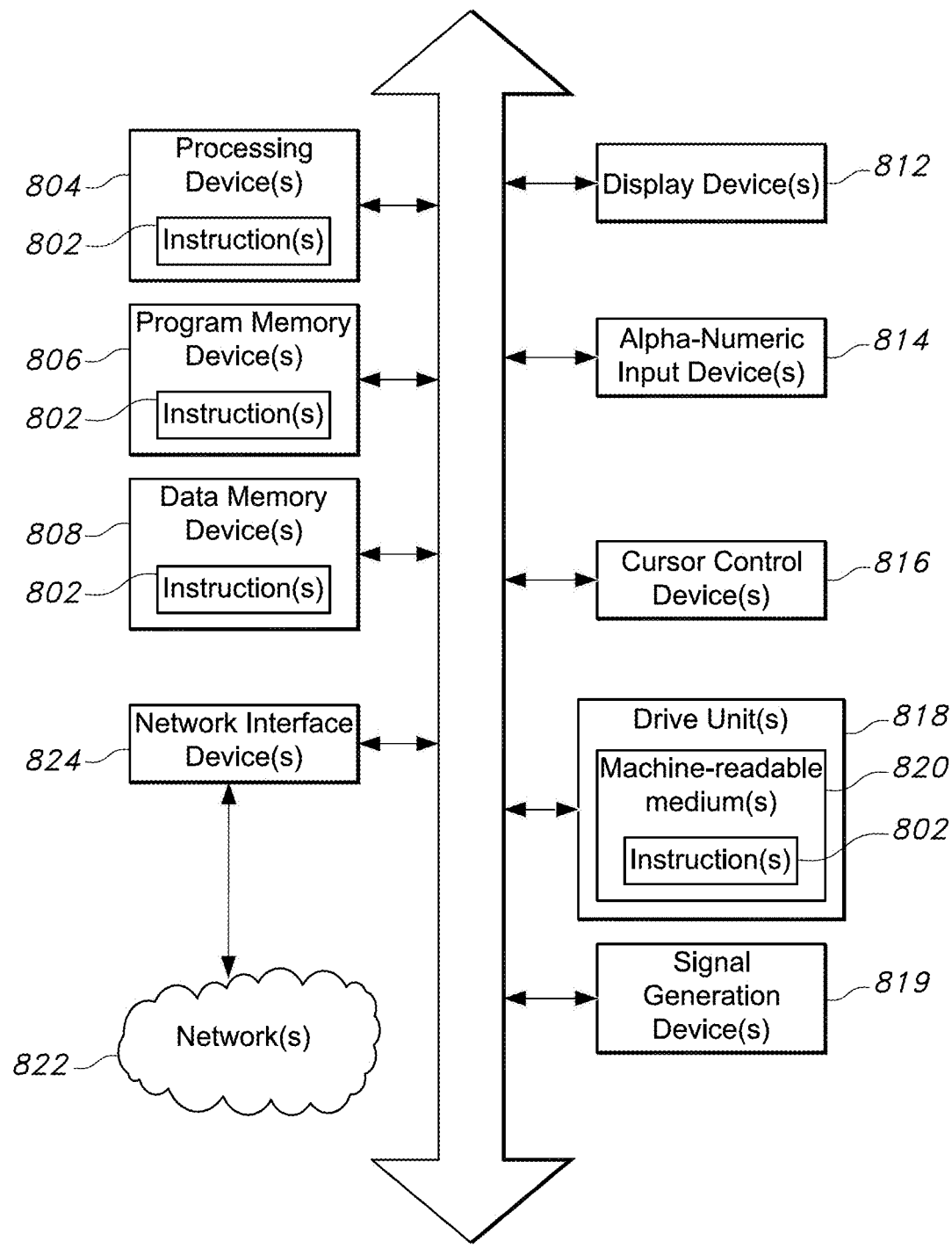
FIG. 31 is a block diagram showing a portion of an exemplary machine in the form of a computing system that performs methods according to one or more embodiments.

FIG. 31 is a block diagram of an embodiment of a machine in the form of a computing system 800, within which a set of instructions 802 is stored, that when executed, causes the machine to perform any one or more of the methodologies disclosed herein. In some embodiments, the machine operates as a standalone device. In some embodiments, the machine may be connected (e.g., using a network) to other machines. In a networked implementation, the machine may operate in the capacity of a server or a client user machine in a server-client user network environment. The machine may comprise a server computer, a client user computer, a personal computer (PC), a tablet PC, a personal digital assistant (PDA), a cellular telephone, a mobile device, a palmtop computer, a laptop computer, a desktop computer, a communication device, a personal trusted device, a web appliance, a network router, a switch or bridge, or any machine capable of executing a set of instructions (sequential or otherwise) that specify actions to be taken by that machine.

The computing system 800 may include a processing device(s) 804 (such as a central processing unit (CPU), a graphics processing unit (GPU), or both), program memory device(s) 806, and data memory device(s) 808, which communicate with each other via a bus 810. The computing system 800 may further include display device(s) 812 (e.g., liquid crystals display (LCD), a flat panel, a solid state display, or a cathode ray tube (CRT)). The computing system 800 may include input device(s) 814 (e.g., a keyboard), cursor control device(s) 816 (e.g., a mouse), disk drive unit(s) 818, signal generation device(s) 819 (e.g., a speaker or remote control), and network interface device(s) 824.

The disk drive unit(s) 818 may include machine-readable medium(s) 820, on which is stored one or more sets of instructions 802 (e.g., software) embodying any one or more of the methodologies or functions disclosed herein, including those methods illustrated herein. The instructions 802 may also reside, completely or at least partially, within the program memory device(s) 806, the data memory device(s) 808, and/or within the processing device(s) 804 during execution thereof by the computing system 800. The program memory device(s) 806 and the processing device(s) 804 may also constitute machine-readable media. Dedicated hardware implementations, not limited to application specific integrated circuits, programmable logic arrays, and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present embodiment contemplates a machine-readable medium or computer-readable medium 820 containing instructions 802, or that which receives and executes instructions 802 from a propagated signal so that a device connected to a network environment 822 can send or receive voice, video or data, and to communicate over the network 822 using the instructions 802. The instructions 802 may further be transmitted or received over a network 822 via the network interface device(s) 824. The machine-readable medium may also contain a data structure for storing data useful in providing a functional relationship between the data and a machine or computer in an illustrative embodiment of the disclosed systems and methods.

While the machine-readable medium 820 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the embodiment is considered to include any one or more of a tangible machine-readable medium or a tangible distribution medium, as listed herein and including art-recognized equivalents and successor media, in which the software implementations herein are stored.

Although the present specification describes components and functions implemented in the embodiments with reference to particular standards and protocols, the disclosed embodiment are not limited to such standards and protocols.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 31 C.F.R. § 1.12(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

In a particular non-limiting, example embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods, functions or logic described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods, functions or logic described herein.

It should also be noted that software which implements the disclosed methods, functions or logic may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although specific example embodiments have been described, it will be evident that various modifications and changes may be made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

Although preferred embodiments have been described herein with reference to the accompanying drawings, it is to be understood that the disclosure is not limited to those precise embodiments and that various other changes and modifications may be affected herein by one skilled in the art without departing from the scope or spirit of the embodi-

What is claimed is:

1. A system for generating a progressive representation associated with virtual and physical reality image data, the system comprising:
    a wearable communication device;
    an image capturing device; and
    a computing device, the computing device:
        receiving virtual image data associated with a virtual map of a virtual scene;
        receiving physical image data from the image capturing device, the physical image data associated with a physical environment of a real scene;
        determining perimeter information of the physical environment;
        determining boundary information of an obstacle associated with the physical environment;
        using the perimeter information and boundary information to generate a real scene map associated with the physical environment including an obstacle and one or more free space areas;
        generating a corresponding virtual barrier in the real scene map, the virtual barrier associated with the boundary information of the obstacle in the real scene map;
        generating a folding of the virtual scene map into the one or more free space areas of the real scene map, the free space areas surrounding or adjacent the generated virtual barrier;
        performing a stratified sampling of delineated sample points of the virtual map; and
        generating a progressive representation to the wearable communication device, the representation associated with virtual scene pixels of the virtual map corresponding to real scene points of the real scene map in a time interval.

2. The system as recited in claim 1, which further comprises the computing device adding optimization constraints to the delineated sample points of the virtual map as folded in the real scene map.

3. The system as recited in claim 2, which further comprises the computing device determining if fold-over is detected in a sampling of the virtual map.

4. The system as recited in claim 1, in which the stratified sampling further includes a stratum.

5. The system as recited in claim 4, in which the stratified sampling further includes a stratum comprising 0.025% pixels of the virtual map.

6. The system as recited in claim 5, in which the stratified sampling further includes a set of stratified samples associated in which the stratified samples are located at a distance of at least 5× an average stratified sampling distance.

7. The system as recited in claim 1, which further comprises the computing device generating a Gaussian based barrier for each obstacle associated with the physical environment.

8. The system as recited in claim 1, which further comprises the computing device generating a progressive representation that is progressively updated in a predetermined time interval.

9. The system as recited in claim 1, which further comprises the computing device adding a local bijective constraint to sample points of the virtual map.

10. The system as recited in claim 1, which further comprises the computing device determining an updated physical position of a user associated with navigation of the physical environment.

11. The system as recited in claim 10, which further comprises the computing device determining a corresponding virtual position of the user associated with the updated physical position of the user.

12. The system as recited in claim 11, which further comprises the computing device determining a next virtual position of the user based on an estimated virtual direction of the user, the estimated virtual direction of the user being based on a Jacobian relation of respective mappings of the physical position and the virtual position of the user.

13. The system as recited in claim 11, which further comprise the computing device progressively updating the virtual map based on a dynamic inverse mapping associated with the updated physical position of the user in the physical environment.

14. The system as recited in claim 13, which further comprises the computing device generating progressive static representations of the virtual map based on the updated physical position of the user in the physical environment.

15. The system as recited in claim 1, which further comprises the computing device surjectively mapping each virtual scene pixel of the virtual scene map to each real scene point of the real scene map.

16. The system as recited in claim 1, which further comprises the computing device generating the virtual map associated with a pathway of navigation of a user, the pathway of navigation overlaying the virtual map to form a virtual navigation map.

17. The system as recited in claim 16, which further comprises the computing device generating a folding of the virtual navigation map into the one or more free space areas of the real scene map.

18. The system as recited in claim 17, which further comprises the computing device generating a representation associated with the virtual navigation map to the wearable communication device.

19. A method of generating a progressive representation associated with virtual and physical reality image data using a computing device, the computing device:
    receiving virtual image data associated with a virtual map of a virtual scene;
    receiving physical image data associated with a physical environment of a real scene;
    determining perimeter information of the physical environment;
    determining boundary information of an obstacle associated with the physical environment;
    using the perimeter information and boundary information to generate a real scene map associated with the physical environment including an obstacle and one or more free space areas;
    generating a corresponding virtual barrier in the real scene map, the virtual barrier associated with the boundary information of the obstacle in the real scene map;
    generating a folding of the virtual scene map into the one or more free space areas of the real scene map, the free space areas surrounding or adjacent the generated virtual barrier;
    performing a stratified sampling of delineated sample points of the virtual map; and
    generating a progressive representation to the wearable communication device, the representation associated with virtual scene pixels of the virtual map corresponding to real scene points of the real scene map in a time interval.

20. The method as recited in claim 19, further comprising adding optimization constraints to the delineated sample points of the virtual map as folded in the real scene map.

21. The method as recited in claim 20, which further comprises determining if fold-over is detected in a sampling of the virtual map.

22. The method as recited in claim 19, in which the stratified sampling further includes a stratum.

23. The method as recited in claim 22, in which the stratified sampling further includes a stratum comprising 0.025% pixels of the virtual map.

24. The method as recited in claim 23, in which the stratified sampling further includes a set of stratified samples associated in which the stratified samples are located at a distance of at least 5× an average stratified sampling distance.

25. The method as recited in claim 19, which further comprises generating a Gaussian based barrier for each obstacle associated with the physical environment.

26. The method as recited in claim 19, which further comprises generating a progressive representation that is progressively updated in a predetermined time interval.

27. The method as recited in claim 19, which further comprises adding a local bijective constraint to sample points of the virtual map.

28. The method as recited in claim 19, which further comprises determining an updated physical position of a user associated with navigation of the physical environment.

29. The method as recited in claim 28, which further comprises determining a corresponding virtual position of the user associated with the updated physical position of the user.

30. The method as recited in claim 29, which further comprises determining a next virtual position of the user based on an estimated virtual direction of the user, the estimated virtual direction of the user being based on a Jacobian relation of respective mappings of the physical position and the virtual position of the user.

31. The method as recited in claim 29, which further comprises progressively updating the virtual map based on a dynamic inverse mapping associated with the updated physical position of the user in the physical environment.

32. The method as recited in claim 31, which further comprises generating progressive static representations of the virtual map based on the updated physical position of the user in the physical environment.

33. The method as recited in claim 19, which further comprises surjectively mapping each virtual scene pixel of the virtual scene map to each real scene point of the real scene map.

34. The method as recited in claim 19, which further comprises generating the virtual map associated with a pathway of navigation of a user, the pathway of navigation overlaying the virtual map to form a virtual navigation map.

35. The method as recited in claim 34, which further comprises generating a folding of the virtual navigation map into the one or more free space areas of the real scene map.

36. The method as recited in claim 35, which further comprises generating a progressive representation associated with the virtual navigation map to the wearable communication device.

37. A non-transitory computer-readable medium storing instructions that, when executed by a processing device, perform operations comprising:

receiving virtual image data associated with a virtual scene map of a virtual scene;

receiving physical image data associated with a physical environment of a real scene;

determining perimeter information of the physical environment;

determining boundary information of an obstacle associated with the physical environment;

using the perimeter information and boundary information to generate a real scene map associated with the physical environment including an obstacle and one or more free space areas;

generating a corresponding virtual barrier in the real scene map, the virtual barrier associated with the boundary information of the obstacle in the real scene map;

generating a folding of the virtual scene map into the one or more free space areas of the real scene map, the free space areas surrounding or adjacent the generated virtual barrier;

performing a stratified sampling of delineated sample points of the virtual map; and generating a progressive representation to a wearable communication device, the representation associated with virtual scene pixels of the virtual map corresponding to real scene points of the real scene map in a time interval.

38. The non-transitory computer-readable medium of claim 37, wherein the operations further comprise surjectively mapping each virtual scene pixel of the virtual map to each real scene point of the real scene map.

39. A system for generating a progressive representation associated with virtual and physical reality image data, the system comprising:

a wearable communication device;

an image capturing device; and a computing device, the computing device:

receiving virtual image data associated with a virtual map of a virtual scene;

receiving physical image data from the image capturing device, the physical image data associated with a physical environment of a real scene;

determining perimeter information of the physical environment;

determining boundary information of an obstacle associated with the physical environment;

using the perimeter information and boundary information to generate a real scene map associated with the physical environment including an obstacle and one or more free space areas;

generating a corresponding virtual barrier in the real scene map, the virtual barrier associated with the boundary information of the obstacle in the real scene map;

generating a folding of the virtual scene map into the one or more free space areas of the real scene map, the free space areas surrounding or adjacent the generated virtual barrier;

generating a Gaussian based barrier for each obstacle associated with the physical environment; and generating a progressive representation to the wearable communication device, the representation associated with virtual scene pixels of the virtual map corresponding to real scene points of the real scene map in a time interval.

40. A system for generating a progressive representation associated with virtual and physical reality image data, the system comprising:

a wearable communication device;
an image capturing device; and
a computing device, the computing device:
- receiving virtual image data associated with a virtual map of a virtual scene;
- receiving physical image data from the image capturing device, the physical image data associated with a physical environment of a real scene;
- determining perimeter information of the physical environment;
- determining boundary information of an obstacle associated with the physical environment;
- using the perimeter information and boundary information to generate a real scene map associated with the physical environment including an obstacle and one or more free space areas;
- generating a corresponding virtual barrier in the real scene map, the virtual barrier associated with the boundary information of the obstacle in the real scene map;
- generating a folding of the virtual scene map into the one or more free space areas of the real scene map, the free space areas surrounding or adjacent the generated virtual barrier;
- adding a local bijective constraint to sample points of the virtual map; and
- generating a progressive representation to the wearable communication device, the representation associated with virtual scene pixels of the virtual map corresponding to real scene points of the real scene map in a time interval.

41. A system for generating a progressive representation associated with virtual and physical reality image data, the system comprising:
a wearable communication device;
an image capturing device; and
a computing device, the computing device:
- receiving virtual image data associated with a virtual map of a virtual scene;
- receiving physical image data from the image capturing device, the physical image data associated with a physical environment of a real scene;
- determining perimeter information of the physical environment;
- determining boundary information of an obstacle associated with the physical environment;
- using the perimeter information and boundary information to generate a real scene map associated with the physical environment including an obstacle and one or more free space areas;
- generating a corresponding virtual barrier in the real scene map, the virtual barrier associated with the boundary information of the obstacle in the real scene map;
- generating a folding of the virtual scene map into the one or more free space areas of the real scene map, the free space areas surrounding or adjacent the generated virtual barrier;
- determining a corresponding virtual position of a user associated with an updated physical position of the user;
- determining a next virtual position of the user based on an estimated virtual direction of the user, the estimated virtual direction of the user being based on a Jacobian relation of respective mappings of the physical position and the virtual position of the user; and
- generating a progressive representation to the wearable communication device, the representation associated with virtual scene pixels of the virtual map corresponding to real scene points of the real scene map in a time interval.

42. A method of generating a progressive representation associated with virtual and physical reality image data using a computing device, the computing device:
- receiving virtual image data associated with a virtual map of a virtual scene;
- receiving physical image data associated with a physical environment of a real scene;
- determining perimeter information of the physical environment;
- determining boundary information of an obstacle associated with the physical environment;
- using the perimeter information and boundary information to generate a real scene map associated with the physical environment including an obstacle and one or more free space areas;
- generating a corresponding virtual barrier in the real scene map, the virtual barrier associated with the boundary information of the obstacle in the real scene map;
- generating a folding of the virtual scene map into the one or more free space areas of the real scene map, the free space areas surrounding or adjacent the generated virtual barrier;
- generating a Gaussian based barrier for each obstacle associated with the physical environment; and
- generating a progressive representation to the wearable communication device, the representation associated with virtual scene pixels of the virtual map corresponding to real scene points of the real scene map in a time interval.

43. A method of generating a progressive representation associated with virtual and physical reality image data using a computing device, the computing device:
- receiving virtual image data associated with a virtual map of a virtual scene;
- receiving physical image data associated with a physical environment of a real scene;
- determining perimeter information of the physical environment;
- determining boundary information of an obstacle associated with the physical environment;
- using the perimeter information and boundary information to generate a real scene map associated with the physical environment including an obstacle and one or more free space areas;
- generating a corresponding virtual barrier in the real scene map, the virtual barrier associated with the boundary information of the obstacle in the real scene map;
- generating a folding of the virtual scene map into the one or more free space areas of the real scene map, the free space areas surrounding or adjacent the generated virtual barrier;
- adding a local bijective constraint to sample points of the virtual map; and
- generating a progressive representation to the wearable communication device, the representation associated with virtual scene pixels of the virtual map corresponding to real scene points of the real scene map in a time interval.

44. A method of generating a progressive representation associated with virtual and physical reality image data using a computing device, the computing device:

receiving virtual image data associated with a virtual map of a virtual scene;
receiving physical image data associated with a physical environment of a real scene;
determining perimeter information of the physical environment;
determining boundary information of an obstacle associated with the physical environment;
using the perimeter information and boundary information to generate a real scene map associated with the physical environment including an obstacle and one or more free space areas;
generating a corresponding virtual barrier in the real scene map, the virtual barrier associated with the boundary information of the obstacle in the real scene map;
generating a folding of the virtual scene map into the one or more free space areas of the real scene map, the free space areas surrounding or adjacent the generated virtual barrier;
determining an updated physical position of a user associated with navigation of the physical environment;
determining a corresponding virtual position of the user associated with the updated physical position of the user;
determining a next virtual position of the user based on an estimated virtual direction of the user, the estimated virtual direction of the user being based on a Jacobian relation of respective mappings of the physical position and the virtual position of the user; and
generating a progressive representation to the wearable communication device, the representation associated with virtual scene pixels of the virtual map corresponding to real scene points of the real scene map in a time interval.

* * * * *

UNITED STATES PATENT AND TRADEMARK OFFICE
CERTIFICATE OF CORRECTION

PATENT NO. : 10,403,043 B2
APPLICATION NO. : 15/564145
DATED : September 3, 2019
INVENTOR(S) : Kaufman et al.

Page 1 of 1

It is certified that error appears in the above-identified patent and that said Letters Patent is hereby corrected as shown below:

In the Claims

Column 18, Line 14:
Now reads: "where $S_v$ and &represent"
Should read: --where $S_v$ and $S_r$ represent--

Column 18, Line 35:
Now reads: "where $S_v$ and &represent"
Should read: --where $S_v$ and $S_r$ represent--

Signed and Sealed this
Seventh Day of April, 2020

Andrei Iancu
*Director of the United States Patent and Trademark Office*